United States Patent
Schoening et al.

(10) Patent No.: US 6,505,228 B1
(45) Date of Patent: *Jan. 7, 2003

(54) DYNAMIC DETERMINATION OF EXECUTION SEQUENCE

(75) Inventors: Charles B. Schoening, Guttenberg, NJ (US); Richard J. Smith, Jr., Danville; Stephen I. Schleimer, San Jose, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/121,010

(22) Filed: Jul. 22, 1998

(51) Int. Cl.[7] .................................................. G06F 9/00
(52) U.S. Cl. ...................................... 709/106; 709/223
(58) Field of Search ................................ 709/100, 101, 709/102, 103, 104, 106, 108, 105, 107, 223; 717/6, 7

(56) References Cited

U.S. PATENT DOCUMENTS

| | | | |
|---|---|---|---|
| 5,392,400 A | 2/1995 | Berkowitz et al. | 395/200 |
| 5,455,950 A | 10/1995 | Vasseur et al. | 395/700 |
| 5,778,184 A | 7/1998 | Brownmiller et al. | 395/200.54 |
| 5,796,965 A | 8/1998 | Hanif et al. | |
| 5,812,780 A * | 9/1998 | Chen et al. | 395/200.54 |
| 5,812,844 A | 9/1998 | Jones et al. | |
| 5,905,715 A | 5/1999 | Azami et al. | 370/244 |
| 5,913,028 A | 6/1999 | Wang et al. | 395/200.33 |
| 5,913,925 A | 6/1999 | Kahle et al. | |
| 5,944,778 A * | 8/1999 | Tokeuchi et al. | 709/100 |
| 5,968,167 A | 10/1999 | Whittaker et al. | |
| 5,978,578 A | 11/1999 | Azarya et al. | 395/701 |
| 6,041,347 A | 3/2000 | Harsham et al. | 709/220 |
| 6,094,688 A * | 7/2000 | Mellen-Garnett et al. | 709/328 |
| 6,115,646 A * | 9/2000 | Fiszman et al. | 700/181 |
| 6,134,581 A | 10/2000 | Ismael et al. | 709/202 |
| 6,145,121 A * | 11/2000 | Levy et al. | 717/4 |
| 6,205,465 B1 | 3/2001 | Schoening et al. | |

OTHER PUBLICATIONS

Chung et al., "Automatic subject indexing using an associate neural network", ACM DL, pp. 59–68, Mar. 1998.
Enfield, "Development of the AT&T personal link service on line documentation", ACM DOC, pp. 39–48, Aug. 1995.

* cited by examiner

*Primary Examiner*—Majid Banankhah
(74) *Attorney, Agent, or Firm*—Hickman Palermo Troung & Becker LLP

(57) ABSTRACT

A method and apparatus is disclosed for dynamically determining the order of execution of a plurality of computer program components. A characterization mechanism provides an annotation of each executable component. A partial order mechanism depends upon the characterization mechanism, and enables a first executable component to declare which other executable components, times, data sets, or other resources are pre-conditions to execution of the first executable component. At load time, a partial order evaluator resolves the pre-conditions and generates a final order of execution of the components based upon interdependencies and resource requirements represented in the pre-conditions. In a preferred embodiment, the pre-conditions are stored in an acyclic directed graph, and the final order is generated by making a breadth-first traversal of the graph and adding nodes of the graph to the final order in the order in which the nodes are traversed.

25 Claims, 35 Drawing Sheets

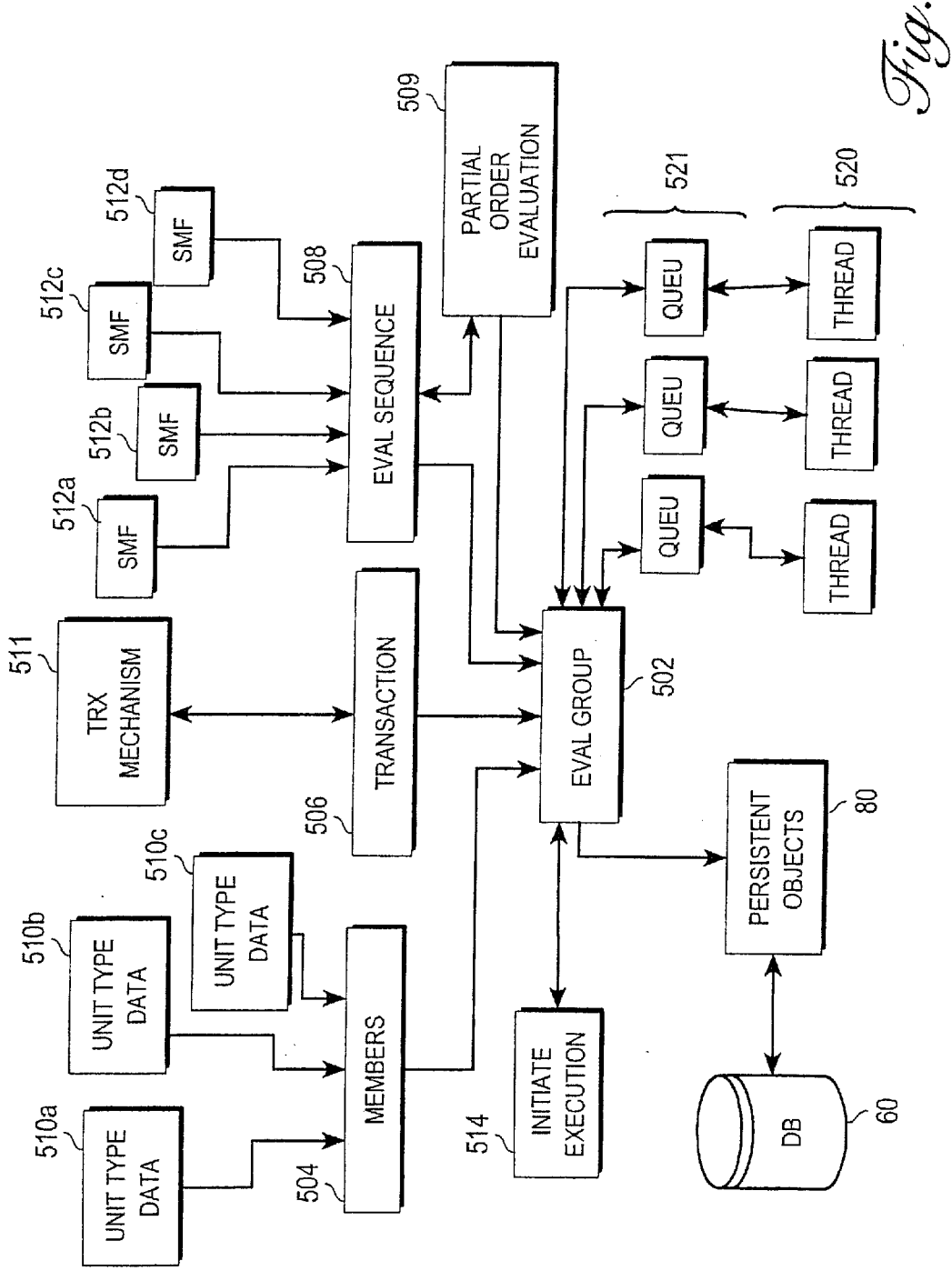

DYNAMIC DETERMINATION OF EXECUTION SEQUENCE

FIELD OF THE INVENTION

The present invention generally relates to data processing. The invention relates more specifically to a mechanism that determines the order of execution among a plurality of code modules.

BACKGROUND OF THE INVENTION

Computer networks have become ubiquitous in the home, office, and industrial environment. As computer networks have grown ever complex, automated mechanisms for organizing and managing the networks have emerged. These mechanisms are generally implemented in the form of one or more computer programs, and are generically known as network management systems or applications.

FIG. 1 is a simplified diagram of a network 100 that is managed by a network management station 10. The network 100 comprises one or more network devices 102, such as switches, routers, bridges, gateways, and other devices. Each network device 102 is coupled to another network device 102, or to one or more end stations 120. Each end station 120 is a terminal node of the network 100 at which some type of work is carried out. For example, an end station 120 is a workstation, a printer, a server, or similar device.

Each network device 102 executes a network-oriented operating system 110. An example of a network-oriented operating system is the Internetworking Operating System (IOS) commercially available from Cisco Systems, Inc. Each network device 102 also executes one or more applications 112 under control of the operating system 110. The operating system 110 supervises operation of the applications 112 and communicates over network connections 104 using an agree-upon network communication protocol, such as Simple Network Management Protocol (SNMP).

Each device 102 stores information about its current configuration, and other information, in a Management Information Base (MIB) 114. Information in the MIB 114 is organized in one or more MIB variables. The network management station 10 can send "fetch" and "set" commands to the device 102 in order to retrieve or set values of MIB variables. Examples of MIB variables include sysObjectID and sysDescr.

Preferably the network management station 10 is a general-purpose computer system of the type shown and described further herein in connection with FIG. 10. The network management station 10 executes one or more software components that carry out the functions shown in block diagram form in FIG. 1. For example, the network management station 10 executes a basic input/output system (BIOS) 20 that controls and governs interaction of upper logical layers of the software components with hardware of the network management station. An example of a suitable BIOS is the Phoenix ROM BIOS. The network management station 10 also executes an operating system 30 that supervises and controls operation of upper-level application programs. An example of a suitable operating system is the Microsoft Windows NT® operating system. The network management station 10 may also execute other operating systems that may not require a BIOS 20, such as UNIX-type operating systems, microkernel-based operating systems, etc.

The network management station 10 executes an asynchronous network interface (ANI) 50 under control of the operating system 30. The ANI 50 provides an interface to the network 100 and communicates with the network using SNMP or another agreed-upon protocol. The ANI 50 provides numerous low-level services and functions for use by higher-level applications.

The network management station 10 executes a network management system 40 that interacts with a database 60 containing information about the managed network 100. The network management system 40 is an example of a network management application. Using a network management application, a manager can monitor and control network components. For example, a network management application enables a manager to interrogate devices such as host computers, routers, switches, and bridges to determine their status, and to obtain statistics about the networks to which they attach. The network management application also enables a manager to control such devices by changing routes and configuring network interfaces. Examples network management applications are Cisco Works, CiscoWorks for Switched Internetworks (CWSI), and Cisco View, each of which is commercially available from Cisco Systems, Inc.

The ANI 50 and network management system 40 need not execute or reside on the same physical computer. They may execute on different machines.

A requirement of many network management applications is the ability to rapidly adapt to new kinds of network devices, such as switches, routers, and other hardware and software. Often, it is necessary to support a new kind of device that is introduced into the network, released or shipped by the device vendor other than when the network management application is updated, released or shipped. Thus, it is necessary to support new devices and new services when the network management application is installed in the field or running in a managed network.

Accordingly, the network management application must accept new requirements in the field. In particular, the execution environment of the network management application must be able to accommodate new processes and services to be executed. Existing processes must be adapted to new devices.

In past approaches, there has been no simple way to integrate a new process, service, or software component and its execution into the existing network management application. Generally, in past approaches, the existing network management application must be patched or updated.

Based on the foregoing, there is a clear need in this field for a network management system that can accept field updates of new executable processes or services.

There is also a need for such a system that can integrate the new executable processes or services into the existing execution flow of the network management system.

In particular, there is a need for a system that can determine, at execution time, the order of execution of a plurality of modules that represent a process or service to be executed with respect to one or more network devices.

There is also a need for such a system that can resolve the run-time execution order of a plurality of executable components based upon interdependencies of the executable components.

There is also a need for such a system that can resolve the run-time execution order of executable components based upon requirements such as time of execution, type of function to be executed, and resources that are required to be available before a particular component can execute.

SUMMARY OF THE INVENTION

The foregoing needs, and other needs and objects that will become apparent in the following description, are fulfilled in the present invention, which comprises, in one aspect, a method of dynamically determining an execution order of a plurality of executable components, the method comprising the steps of associating, with a first component of the plurality of executable components, one or more preconditions to execution of the first component; storing a partial order of execution of the plurality of executable components based on the pre-conditions; and generating a final order of execution of the plurality of executable components based on the partial order.

One aspect of this feature is that the step of associating further comprises the steps of associating a time base with the first executable component. According to another feature, the step of associating further comprises the steps of associating a precondition value that represents a category of service to be executed before the first executable component is executed. In another feature, the step of associating a precondition value further comprises the steps of associating a time of execution and a category with the first executable component.

According to another feature, the step of associating a precondition value further comprises the steps of associating, with a first service module function of an asynchronous network interface in a network management system, an execution time, a name of a second service module function, and a type of the second service module function. In another feature, the step of associating a precondition value further comprises the steps of associating a time of execution value indicating that the first executable component is to be executed during device discovery processing.

Another feature is that the step of associating a precondition value further comprises the steps of associating a time of execution value indicating that the first executable component is to be executed at a fixed pre-determined time. Still another feature is that the step of associating a precondition value further comprises the steps of associating a time of execution value indicating that the first executable component is to be executed upon request by an external process.

In another feature, the step of storing further comprises the steps of storing a directed acyclic graph in a memory, in which the directed acyclic graph comprises a plurality of nodes, each node comprising information representing one of the preconditions. Still another feature is that the step of generating a final order of execution further comprises the steps of conducting a breadth-first traversal to each of the plurality of nodes of the directed acyclic graph, and building the final order of execution based on an order in which the nodes are traversed.

Yet another feature is that each node is associated with a level of the graph, and further comprising the steps of deleting one of the nodes when such node is encountered at more than one level of the graph. Still another feature is that one of the pre-conditions is a unit value that represents a data set that is required to be available before the first executable component is executed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A is a block diagram of data structures involved in a method of parallel processing.

FIG. 5C is a diagram of processing threads executing in parallel.

DETAILED DESCRIPTION OF THE PREFERRED EMBODIMENT

Figure 1:
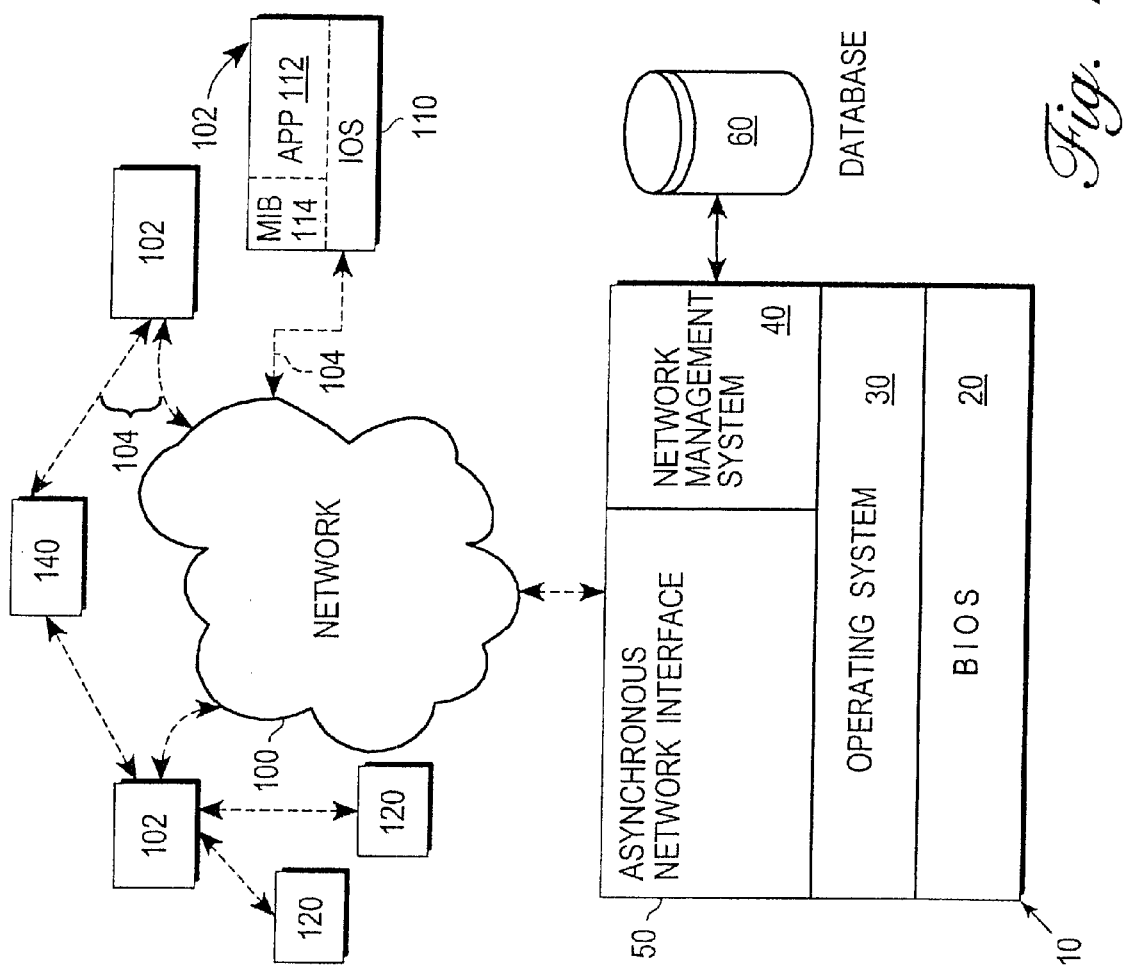
FIG. 1 is a block diagram of a managed network and a network management station.

A method and apparatus for parallel processing is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. Overview of Improved Asynchronous Network Interface

An embodiment of the invention is implemented in the context of an asynchronous network interface.

1.1 DEFINITIONS

As used in this document, the following words, acronyms, and actions have the meanings set forth below. The reader is assumed to be familiar with general terminology and technical information pertaining to contemporary computer networks and internetworking. A general introduction is provided in D. Comer, "Computer Networks and Internets" (Prentice-Hall, 1997).

"ANI" means an Asynchronous Network Interface that forms a part of a network management system.

"Network management system" means a system that manages switched and routed networks and internetworks. An example of a network management system is Cisco Works For Switched Internetworks (CWSI).

"Discovery" means periodic acquisition of sets of network data from sets of network devices in the network that is managed by the network management system.

"Frame Work" means the set of classes, in an object-oriented computer programming language, and services from which the organization and structure of a Service module is derived. In particular, a Frame work defines the structure of an API and internal dispatch mechanisms.

"FrontEnd" means that component of the ANI that implements the server side components necessary to support a client/server processing model.

"Managed Object" means an abstract data storage object that holds specific information about things being managed including the specific device mappings (if necessary), an identity, and references to Service Module Function instances appropriate to the managed thing.

"Polling" means periodic acquisition of network data from network devices. Generally, polling is carried out with a shorter period of time, with a more restrictive set of network data possible, and with fewer devices than "discovery."

"Service Module" means a set of classes derived from the Frame work and FrontEnd packages that define the API, data model, database, and abstract functions that implement network device services.

"Service Module Function" or "SMF" means overridden functions of a service module.

"SMFContainer" or "Container object" means an object that implements the behavior of a managed object. SMFContainer objects provide for mapping of Service Module Functions, collecting service module functions comprising a collected object, and handling aliases of the object.

1.2 ARCHITECTURE

An embodiment is directed to an improved ANI 50. The ANI 50 offers extensibility, so that it can be updated and revised without distribution of a new version of the network management system 40. The ANI 50 is robust and offers efficiency and high performance.

The ANI 50 has extensibility in three aspects: device type and version; data model; service provision. In the first aspect, the ANI 50 can be modified in the field to accommodate newly developed device types and device versions. Device type and version extensibility is accomplished by encapsulating device-specific behavior into subclasses of the functional components of the ANI 50. Device-specific behavior is then performed when a function is performed, through the selection of the appropriate device and version specific subclass of the function being performed.

In the second aspect, data storage, data modeling, and data acquisition processes can be updated from time to time. Data model extensibility is accomplished by embedding the knowledge of the data model into the functions which need the data model for data storage. Data model embedding includes schema verification and installation per function, and abstracted store and load mechanisms that move data model instances to and from the database.

In the third aspect, new services can be added to the ANI 50 without requiring a major revision of the network management system.

Robustness is another aspect of the ANI 50. In the preferred embodiment, the ANI 50 operates 24 hours per day, 7 days per week, in the form of a software daemon that constantly monitors the state of the managed network 100. It is not acceptable to require rebooting of the ANI 50 to recover resources, synchronize with the database, or carry out other tasks. Further, the extensible nature of the ANI 50 requires that it is tolerant of failures of subsystems, failure of clients, and failure of devices that are managed or supported. Tracing of failures, recording of recovery, and explanation of recovery actions are necessary to maintain robustness of the system.

Efficiency and high performance are other characteristics of the ANI. Preferably, the ANI 50 and the network management system 40 support and manage a network 100 of over one thousand devices 102. To successfully manage networks of this size, in the absence of substantial distribution of services, efficient services are required. In particular, it is necessary to perform discovery, polling, and configuration in parallel operations.

In the preferred embodiment, ANI 50 functions as a server to clients, such as processes or functions of the network management system 40. Clients request services, the ANI 50 provides them, and returns replies containing status and results. A single request may have a number of replies.

Figure 2A:
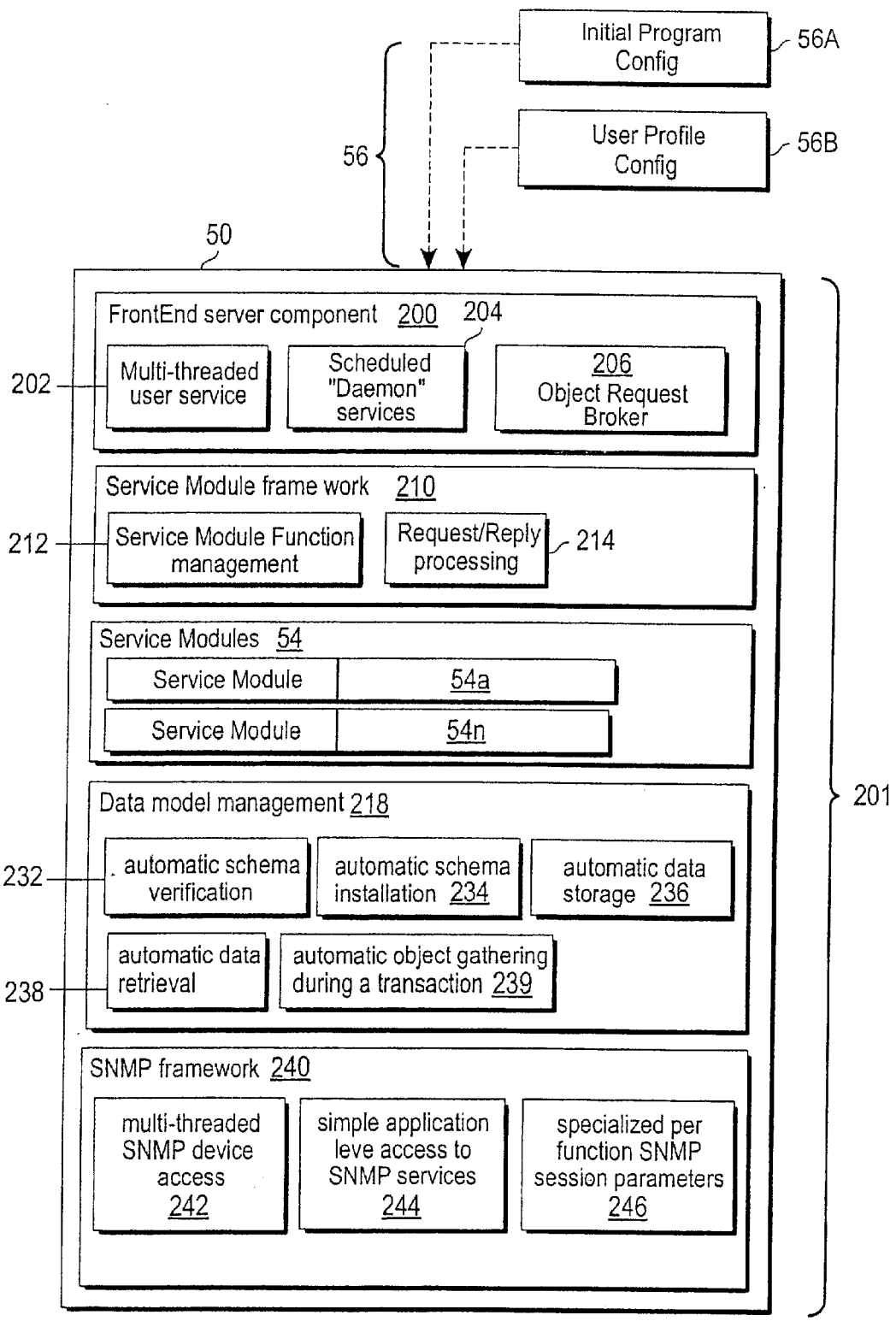
FIG. 2A is a block diagram of an asynchronous network interface (ANI).

FIG. 2A is a block diagram of major subsystems of a preferred embodiment of an asynchronous network interface, and their components. In the preferred embodiment, the ANI 50 comprises two major parts, a framework 201 and a set of service modules 54a–54n. Framework 201 is preferably implemented as a set of classes in an object-oriented programming language, such as the JAVA® language, and provides libraries and superclasses to carry out supervisory functions and support services. Service modules 54a–54n implement device and data functions required by clients of ANI 50.

Preferably, framework 201 comprises a FrontEnd subsystem 200, Service Module framework 210, Data model management subsystem 230, and SNMP framework 240. Each of the foregoing subsystems is preferably implemented as one or more classes in an object-oriented programming language, such as JAVA®. However, such implementation is not required, and any other implementation that provides the functions described herein may be used.

The FrontEnd subsystem 200 acts as a server and includes a multi-threaded user service 202 and scheduled "Daemon" services 204. The FrontEnd subsystem 200 provides overall management of the ANI 50, providing a multi-threaded user service, the management of client/server request/response processing, and the scheduling of actual time based or Daemon services.

The Service Module framework 210 includes mechanisms that provide Service Module Function management 212 and Request/Reply processing 214. The Data model management subsystem 230 includes an automatic schema verification mechanism 232, an automatic schema installation mechanism 234, an automatic data storage mechanism 236, an automatic data retrieval mechanism 238, and a mechanism 239 providing automatic object gathering during a transaction. The SNMP framework 240 includes a multi-threaded SNMP device access mechanism 242, a simple application level access mechanism 244, and a set of specialized per function SNMP session parameters 246. The simple application level access mechanism 244 provides, to an application program, the illusion of synchronous SNMP data getting and setting.

In the preferred embodiment, the foregoing mechanisms use definitions that ensure that evaluation order dependencies are automatically handled. The definitions enable the ANI 50 to operate as a self-organizing system that can manage itself by operating on metadata provided by each of its components. For example, components of the ANI provide metadata permitting ANI to automatically manage loading from and storing to the database 60, automatically manage creation of a schema for the database by creating tables, columns, stored procedures, triggers, and indexing, automatically create various time bases, automatically associate daemon partially ordered functions according to their data requirements, and automatically organizes data objects for function data storage. The organizational components are managed during system initialization by a Load Configuration function.

1.3 MULTI-THREADING

Preferably, the ANI 50 is implemented using coordinating independent threads of control. There are four classes of threads: the Login Service; Service Module Object Creation; Parallel service provision; and Parallel SNMP processing.

Figure 4A:
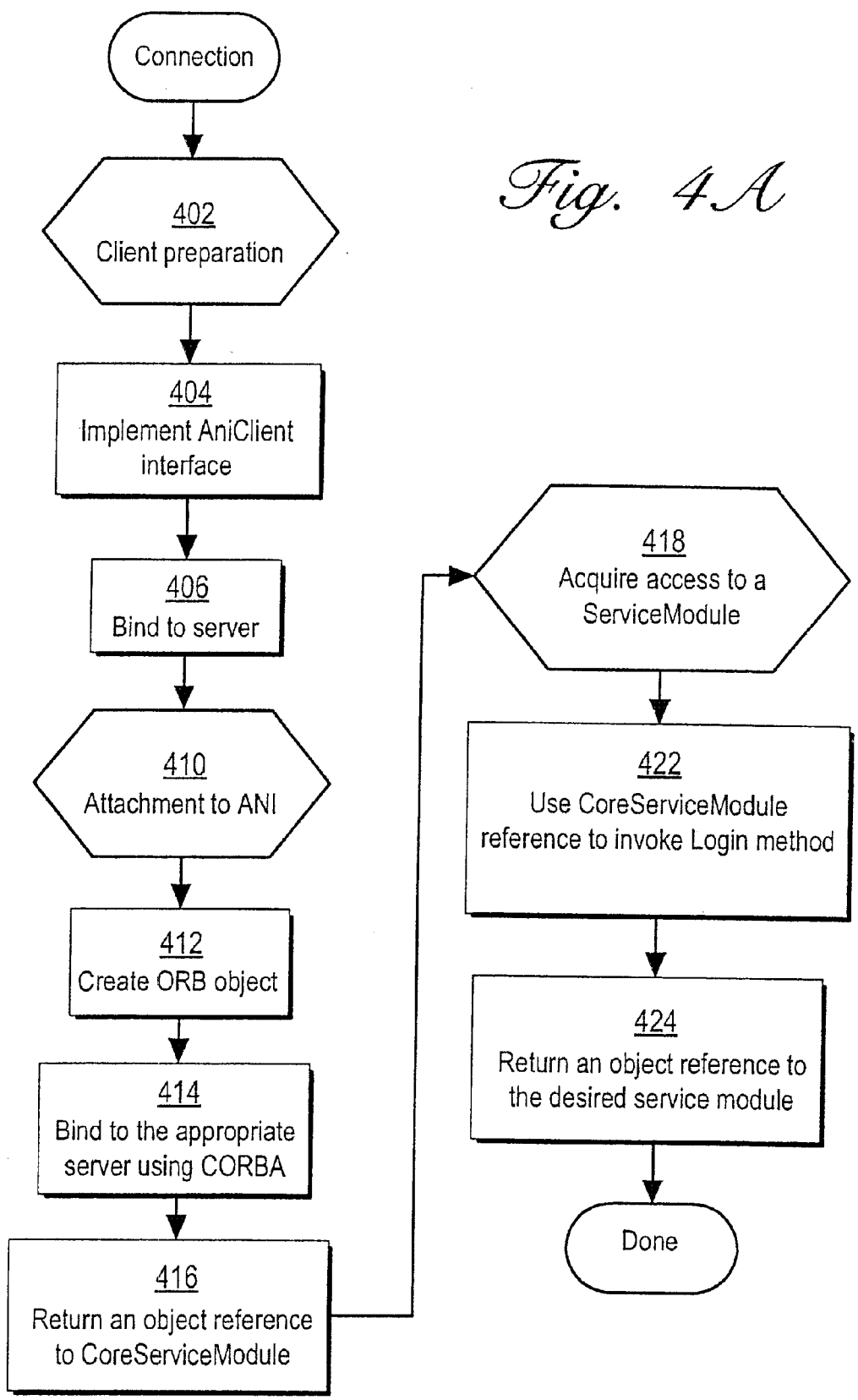
FIG. 4A is a flow diagram of an initialization method.

1.3.1 LOGIN SERVICE. FIG. 4A is a flow diagram of a preferred embodiment of a Login Service. Clients acquire ANI services establishing connectivity to an AniCoreService object. Connectivity between Clients and ANI is handled by an object request broker (ORB) that is preferably compliant with Common Object Request Broker Architecture (CORBA). In general, connectivity is established by creating a CORBA object for the client, and using a "Login Helper" method to bind the client to the ANI 50. The result of these steps is a handle to the AniCoreService module. In the preferred embodiment, all interfaces to the ANI 50 (and to service modules of the ANI) are defined using Interface Definition Language (IDL).

As indicated by block 402, the steps of blocks 404–406 generally involve preparation of the client process for subsequent steps. For example, in block 404, the client implements an AniClient interface. The AniClient interface provides the call back services required to implement the client side of the ANI. In particular, AniClient provides the services of Confirmation, Progress reporting, Asynchronous completion notification, and Event handling. In block 406, the client process is bound to the server. As indicated in block 410, the steps of blocks 412–414 generally involve attachment to ANI. In block 412, a CORBA object for the client is created. In block 414, the object is bound to the appropriate server using the CORBA mechanisms. In response, as shown by block 416, an object reference to the CoreServiceModule is returned.

1.3.2 SERVICE MODULE OBJECT CREATION. As indicated by block 418, the steps of blocks 422 to 424 generally relate to acquiring access to a Service Module. In block 422, the client uses a CoreServiceModule reference to invoke an aniServiceLogin method. The latter method returns an object reference to the desired service module. In particular, whenever a logged in client wants to use the services of a Service Module, it must first acquire (or have acquired) a handle to an instance of the desired service module. In the preferred embodiment, the handle is obtained by a call from the client to the aniServiceLogin method. The client passes the name of the desired service, a reference to its own CORBA service object and a login profile. If the call is successful, it returns a handle or reference to the instantiated Service Module. The handle is then used to send methods to the instantiated service module.

1.3.3. PARALLEL SERVICE PROVISION. Use of parallel processing in Service Modules is described in detail below in the section entitled "Parallel Processing."

1.3.4. PARALLEL SNMP PROCESSING. Parallel SNMP processing is also carried out in the preferred embodiment. Independently of other services of ANI, the SNMP framework 240 organizes requests for parallel execution. No single device may have more than a single request outstanding regardless of the number of requesters. However, there may be many devices for which there are outstanding requests. The outstanding requests on multiple devices can be simultaneously sent to the devices 102 of the network 100.

1.4 DATA MODEL SUPPORT

The data model management mechanism 230 preferably includes functional elements that provide data support functions. For example, in the preferred embodiment, automatic schema verification 232 is provided by the Persistent Object subsystem. There is an automatic schema installation mechanism 234 that ensures the current database definitions are consistent with the current requirements of the Persistent Object metadata corresponding to the elements of the Database. Further, an automatic data storage mechanism 236 provides a way to ensure that the database image of the data model is kept up to date. An automatic data retrieval mechanism 238 is available for initial loading of the data model at ANI startup time and access to data during ANI's normal execution.

2. Overview of User Interaction and Top-Level Control Flow

Figure 6A:
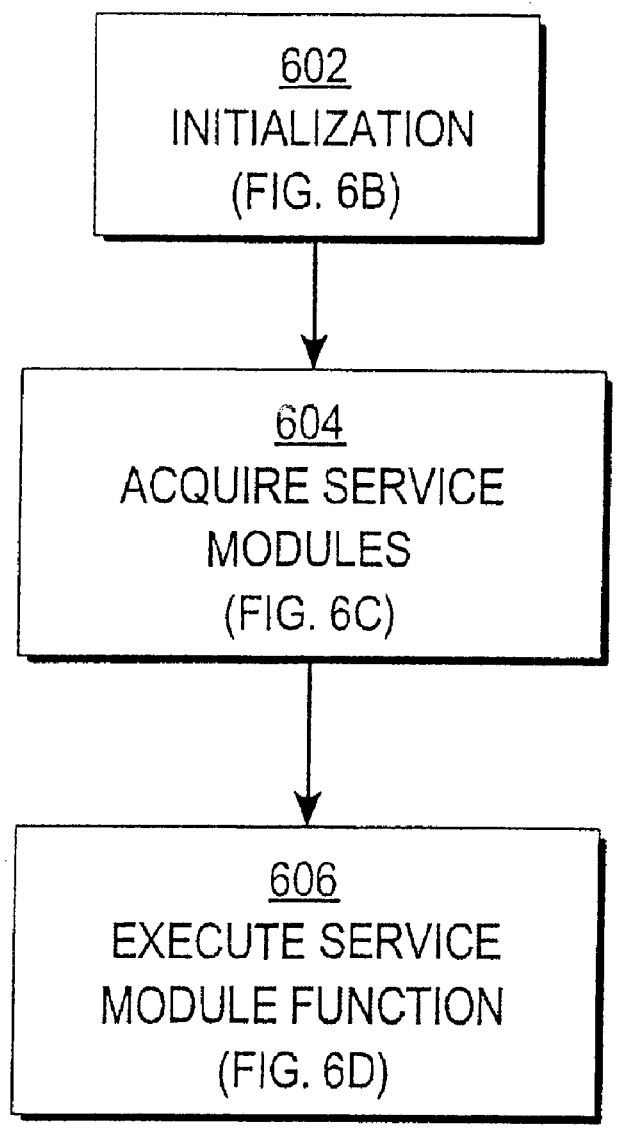
FIG. 6A is a flow diagram of a method of initializing and executing service modules.

FIG. 6A is a flow diagram of the general logical flow of execution of the asynchronous network interface. In general, operation of the ANI comprises initialization, as indicated by block 602, service module acquisition as shown by block 604, and execution of service module functional components, as shown by block 606. In the preferred embodiment, block 606 involves a resource assurance step in which resources needed by a service module are gathered, and an evaluation cycle in which the order of execution of service module functions is evaluated. The foregoing general steps will now be described in detail.

Figure 6B:
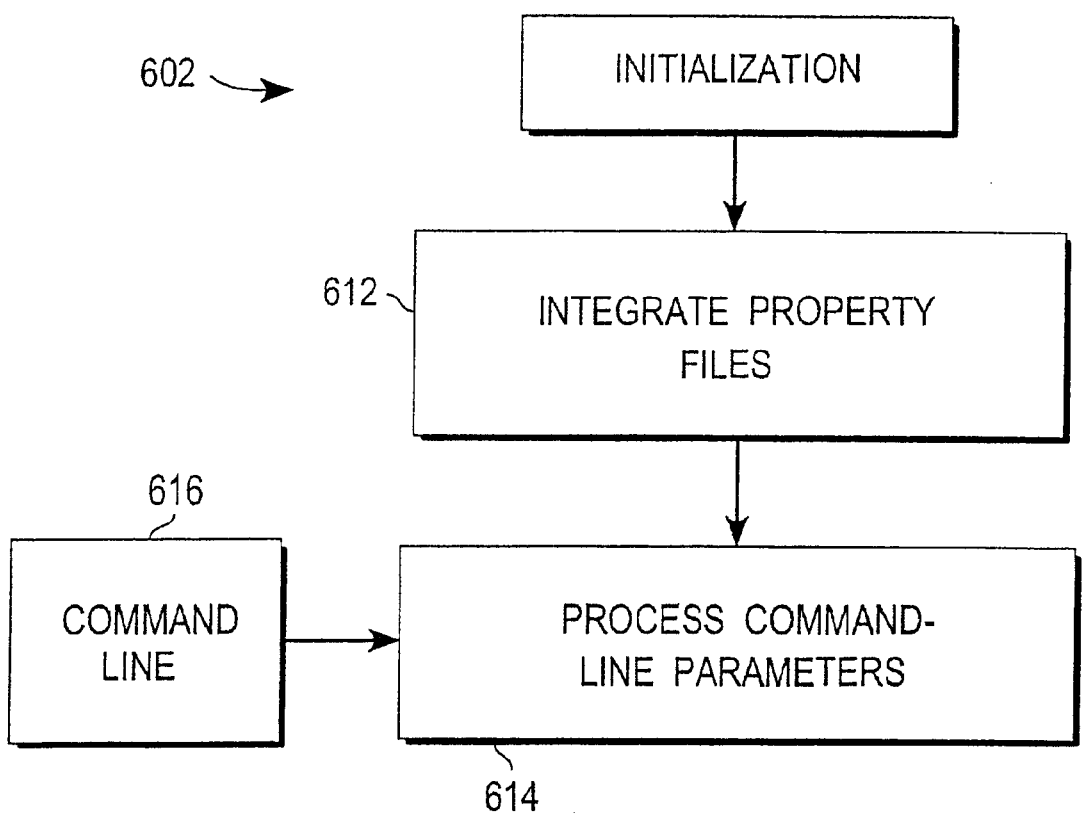
FIG. 6B is a flow diagram of a method of initialization.

FIG. 6B is a flow diagram of steps involved in initialization as shown by block 602 of FIG. 6A.

In block 612, one or more stored properties files 56 are read, and the properties in the properties files are integrated. In the preferred embodiment, each properties file identifies one or more Service Modules. The properties files 56 comprise an initial program configuration file 56a, a user profile configuration file 56b, and an installed parameters configuration file 56c.

Preferably, the Initial Program Configuration File 56a stores the following types of information: a) the set of service modules which the current instance of the ANI supports; b) information identifying where the device mappings are found (for example, a root of a directory tree); c) full mappings to class structure defining each service module; d) parameters defining the parallel evaluation model; e) parameters supporting access to the database; and f) other parameters as required.

The User Profile Configuration File 56b stores a profile of each user of the ANI 50. In particular, it contains a list of users permitted access to the services of ANI and, by extension, the clients that make use of ANI. The specific contents of the user profile configuration file 56b are not critical and can be configured in several different ways. For example, the file can have no contents so that any user is able to log in.

In an alternative embodiment, security privileges are defined using a matrix that maps each user to ANI Service Module IDL definitions and objects of the managed network indicating which the user (or class of user) is permitted access to and what kind of access is permitted. For example, an entry in the file has the form jeff: VLAD/Core/Logon ok; VLAD/Core/Discover no in which "jeff" is a user name, "VLAD/Core/Logon" is the name of a Service Module IDL definition and "ok" indicates that "jeff" is authorized to use that service module IDL definition. "VLAD/Core/Discover" is another Service Module IDL Definition and "no" indicates that "jeff" is not authorized to use that service module IDL Definition.

As described below in the section entitled End User Interface, in the preferred embodiment the ANI examines the command lines 616. In block 614, parameters contained in the command line are processed. In the preferred embodiment, the steps of blocks 610, 612, and 614 are implemented in the form of a JAVA® class called AniMain.

Figure 2B:
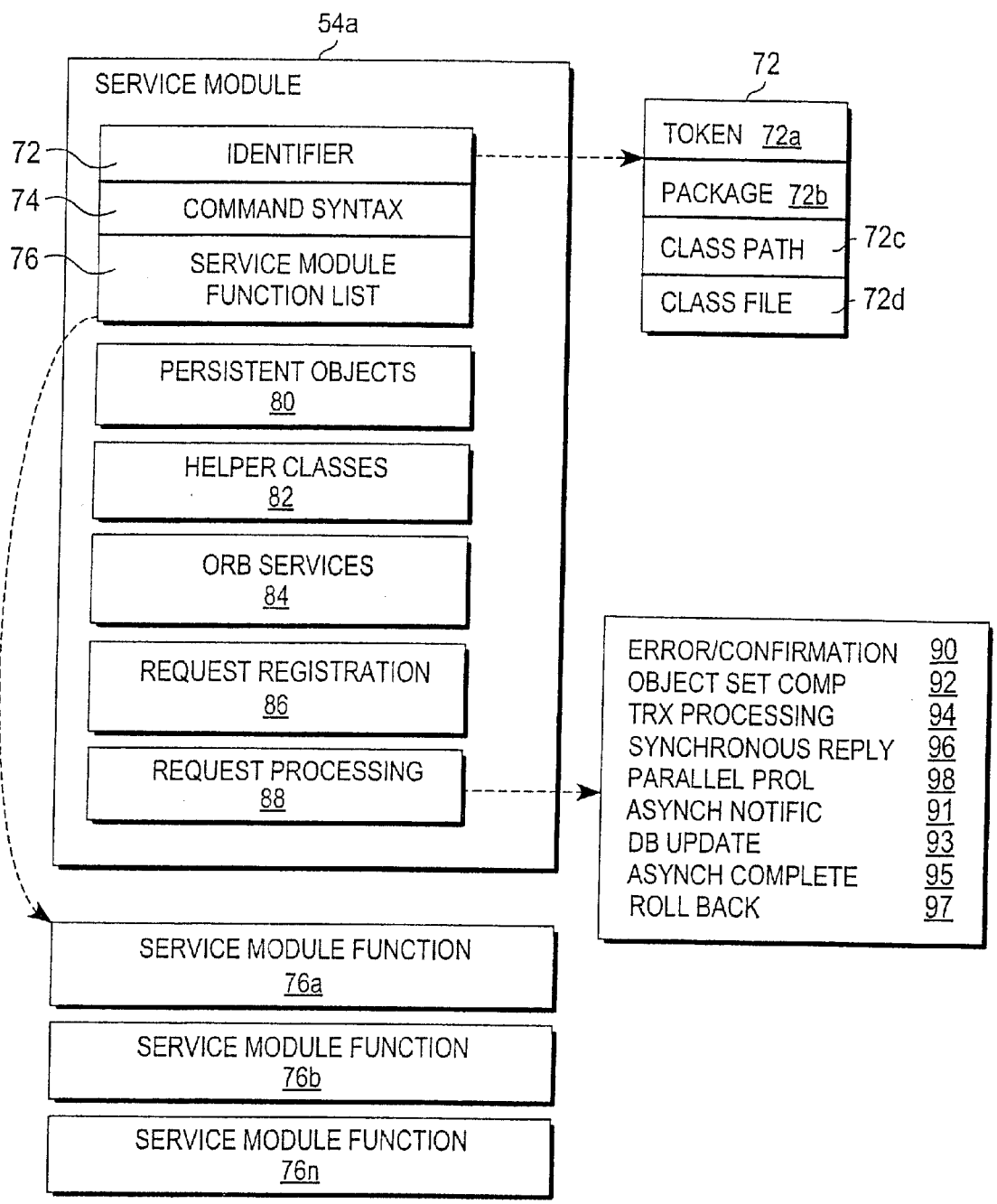
FIG. 2B is a block diagram of a Service Module of the ANI of FIG. 2A.
Figure 6C:
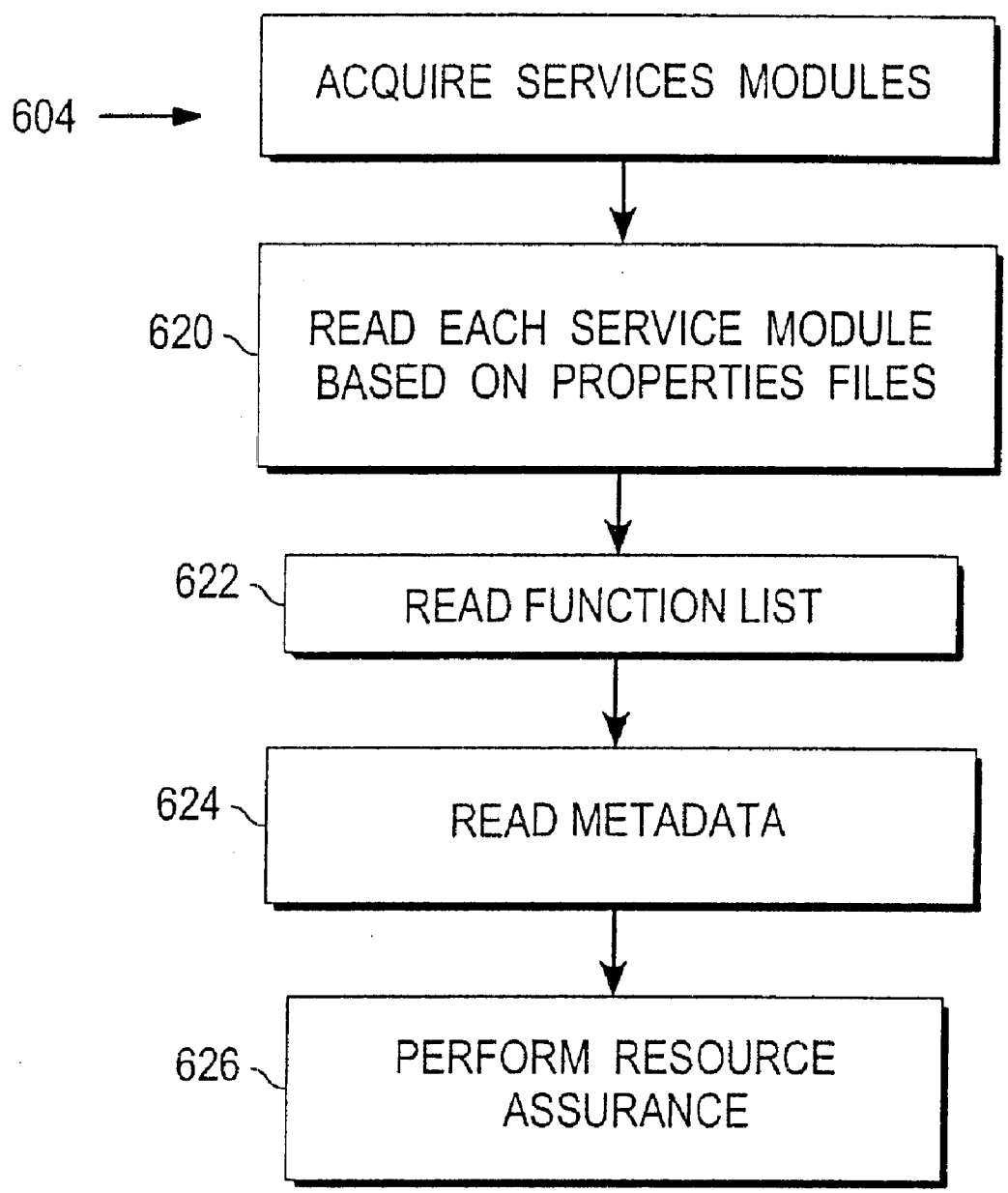
FIG. 6C is a flow diagram of a method of acquiring service module information.

FIG. 6C is a flow diagram of a preferred method of carrying out service module acquisition as shown in block 604. FIG. 2B is a block diagram of an exemplary service module. One or more Service Modules 54 are the basic units of service provision and extension of ANI. The service modules are introduced into ANI via properties files 56, as stated above in connection with block 612. The process of introducing one or more service modules into the ANI is described in more detail below in the section entitled Extensibility Components.

At system start-up, the current configuration of ANI is determined through the definitions provided in properties files 56, the function lists provided by the Service Modules and the metadata contained in each Service Module function. As shown in block 612, during an initialization phase, properties files 56 are read and values identifying service modules are retrieved. Further, as shown in block 620, the step of acquiring service modules shown in block 604 of FIG. 6A involves reading each service module based on properties files 56. In block 622, a function list is read from each service module 54a–54n. In one embodiment, block 622 involves reading a list stored in a service module 54a that identifies all functions provided by the service module. In an alternate embodiment, block 622 involves reading each function 76a–76n and building a list of the functions.

In block 624, the ANI reads metadata 78 from each service module function 76a–76n of a service module 54a. The metadata 78 of each service module 54a includes a mapping of service module tokens 72 to service module function identifiers. The mapping is used by the FrontEnd subsystem 200 to correlate a request generated by a client with a particular service module. This function is described further in the section entitled Extensibility Components.

As shown in block 626, ANI then carries out resource assurance, which is the process of verifying that all resources required by components of a service module exist and are available. In the preferred embodiment, block 626 involves determining that a TimeBase object exists for the current service module, determining that a PreCondition object exists. For each resource in the foregoing list, ANI determines whether all required components of the resource exist. For database resources, if the needed resource does not exist, the ANI 50 creates it. Further description of these functions is provided elsewhere herein.

The ANI 50 acts as a server that interacts with human end users through clients that connect to the ANI. Examples of clients are the VLANDirector ("VLAD") application of CWSI, VMPSAdmin, both of which are commercially available from Cisco Systems, Inc., and other network management applications or processes. In the preferred embodiment, all client connection and communication services are provided by the CORBA-compliant ORB commercially available from Visigenic, for example.

Dispatching to service modules is accomplished by CORBA. Preferably, OrbxxxService modules are constructed to implement CORBA-defined interfaces. The OrbxxxService modules perform the Registry.request functions for security. If security fails, the function immediately returns. Otherwise, an instance of the Service Module is created and the appropriate function as requested by the client is invoked.

Synchronous Reply Processing is provided using the following mechanism. When an instance of a Service Module created to service a user request completes executing, though processing of the request may not be complete, a synchronous reply is created. A client must invoke a service module function in an object-oriented manner, by sending the function to the instance of the Service Module that the client received from the Login Service. This method invocation returns the value that the service returns as its Synchronous Reply. Asynchronous Reply Processing is provided in the preferred embodiment. Preferably, four asynchronous reply messages are defined. A groupConfirmation message provides a confirmation of intended changes. A progressReport message provides the state of the current (identified) asynchronous process. An operationCompleted message provides a final state of the requested asynchronous process. An aniDisconnected message indicates that ANI is disconnected.

Figure 6D:
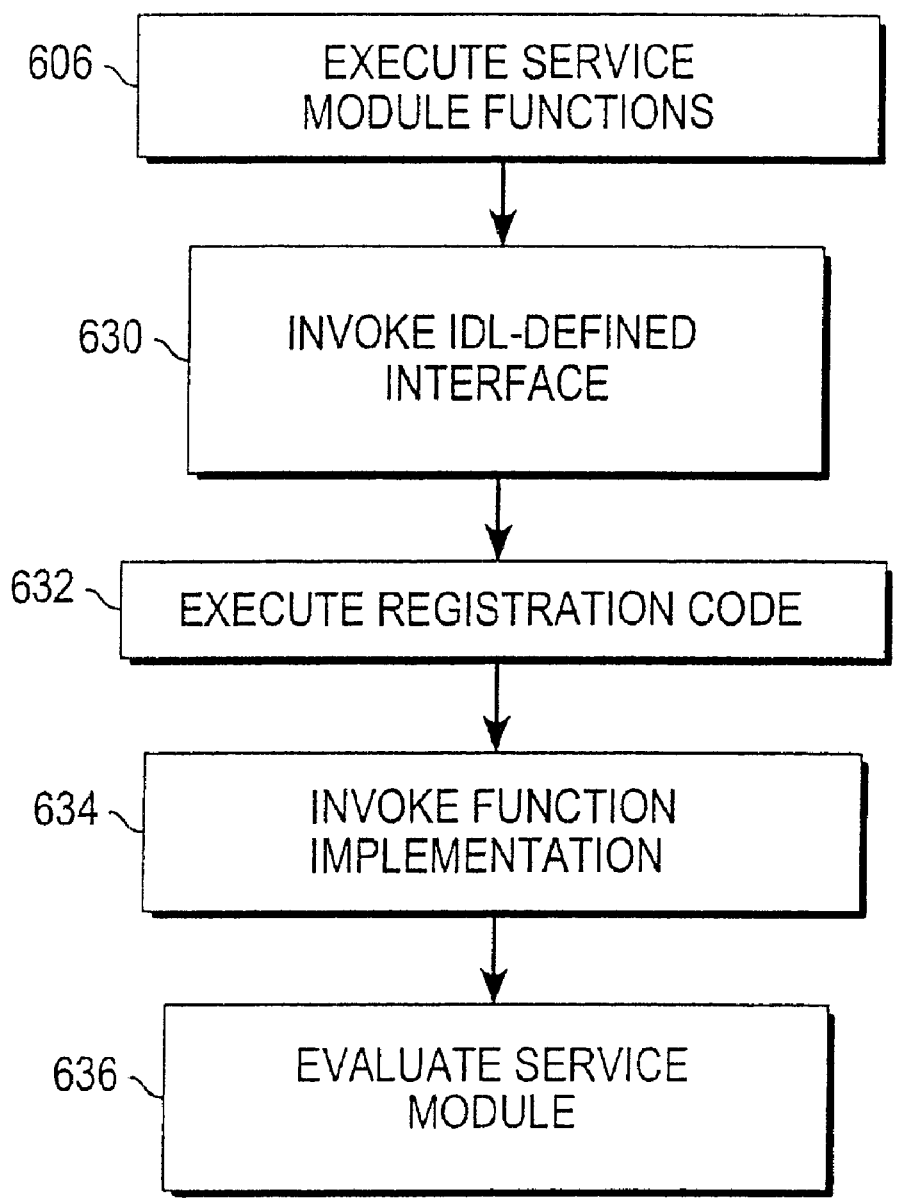
FIG. 6D is a flow diagram of a method of executing service module functions.

FIG. 6D is a flow diagram that shows preferred steps involved in carrying out block 606 of FIG. 6A. As indicated in FIG. 6D, block 630, execution of service module functions involves invoking an IDL defined interface. The method invoked determines which function 76a–76n of the service module is needed. Command execution is handled by each of the IDL function implementations using standard registration code followed by dispatch to the implementation of a particular function. In block 632, the registration code is executed. In block 634, a particular function is invoked.

3. End User Interface

In the preferred embodiment, the ANI 50 interacts with end users through the service modules 54a–54n. The ANI 50 does not generate a graphical user interface or other user-oriented display interface; preferably, any such GUI is provided by the network management system 40. In the preferred embodiment, the ANI 50 has an Interface Definition Language interface. A user or client sends an IDL defined method to the Service Module object that was obtained via a call to CoreServiceModule.aniServiceLogin. The OrbxxxService then selects one of a plurality of mechanisms that respond to the commands.

In addition to the CORBA DL defined interface, there is a command line interface to ANI, which provides a number of services and initial state controls. For Example, a trace interface permits the user to specify a file and a set of functional traces. An analyze interface presents a report on the organization of the current version of ANI, including the Service Modules, the Service Module functions, the dependence relationships among the Service Module functions, the defined time bases, the defined data objects (SMFUnits), and other elements. This report is useful in the field for debugging problems adding new service modules. A test interface provides a unit test support mechanism.

In the preferred embodiment, the ANI responds to the commands and parameters in the manner set forth below in Table 1:

TABLE 1

COMMAND LINE FUNCTIONS OF ANI

| COMMAND | PARAMETERS | MEANING OF COMMAND |
|---|---|---|
| -trace | ani package | Enable tracing for the named package. For example, the command -trace framework enables tracing for all classes contained in the FrameWork package |
| -debug | ani package | enable debugging for the named package. For example, the command -debug framework enables debugging for all classes contained in the FrameWork package. Debugging provides more detailed information than tracing. All tracing for a package is enabled when debugging is enabled for a package. |
| -analyze | none | Puts the ANI in analysis mode. In this mode, the ANI examines and loads its environment as it does during normal initiation, prints a configuration report and terminates. |

4. Extensibility Mechanisms

The ANI 50 can adapt, when installed in a live managed network 100, to changes in the devices 102 managed by the ANI. In the preferred embodiment, services of the ANI are defined in abstract data structures called Service Modules. The service module framework 210 of ANI 50 includes a mechanism providing automatic determination of currently supported devices 102 at start-up time, and automatic integration of device-specific overrides of Service Module Functions 76a–76n at system start-up time. Further, there is automatic selection of device/version specific Service Module Functions 76a–76n at instantiation time. The mechanism comprises, in one embodiment, an identification mechanism, a mapping mechanism, an inheritance mechanism, and an activation mechanism.

The identification mechanism generally involves obtaining the system variables (as defined in RFC 1213) including sysObjectID of a device 102, acquiring a Service Module Function 76a–76n that is specific to the sysObjectID, computing an identifier of a mapping mechanism, and selecting the mapping mechanism.

The mapping mechanism selects which Service Module Function 76a–76n to particularize for the device 102 being managed. The selection is carried out using a mapper associated with the type of the device 102. Each type of device has an associated mapper stored in a directory of a file system of the operating system 30.

The directory structure in which the mappers are stored defines the sequence of inheritance of classes taken from Service Module Functions 76a–76n. For example, device families have common directory roots. Members of a family, that is, specific device types, may be commonly treated in the family directory, or there may be more specialized directories contained in the family directories. Versions of devices usually lie within a family directory. The directory structure is traversed when the ANI 50 is launched. Accordingly, new device types and new device families can be added to management when the network management system 40 is installed, merely by installing a mapper and the Service Module Functions 76a–76n applicable to the new family or device type. Using these mechanisms, the ANI 50 is said to be extensible to handle previously not specifically supported device types.

FIG. 2B is a block diagram of a preferred embodiment of a Service Module 54a. The functions provided by a Service Module 54a are implemented in one or more Service Module Functions 76a–76n. Each Service module 54a declares the Service Module Functions 76a–76n that it implements. Preferably, each Service Module Function 76a–76n is a JAVA® class.

Figure 2C:
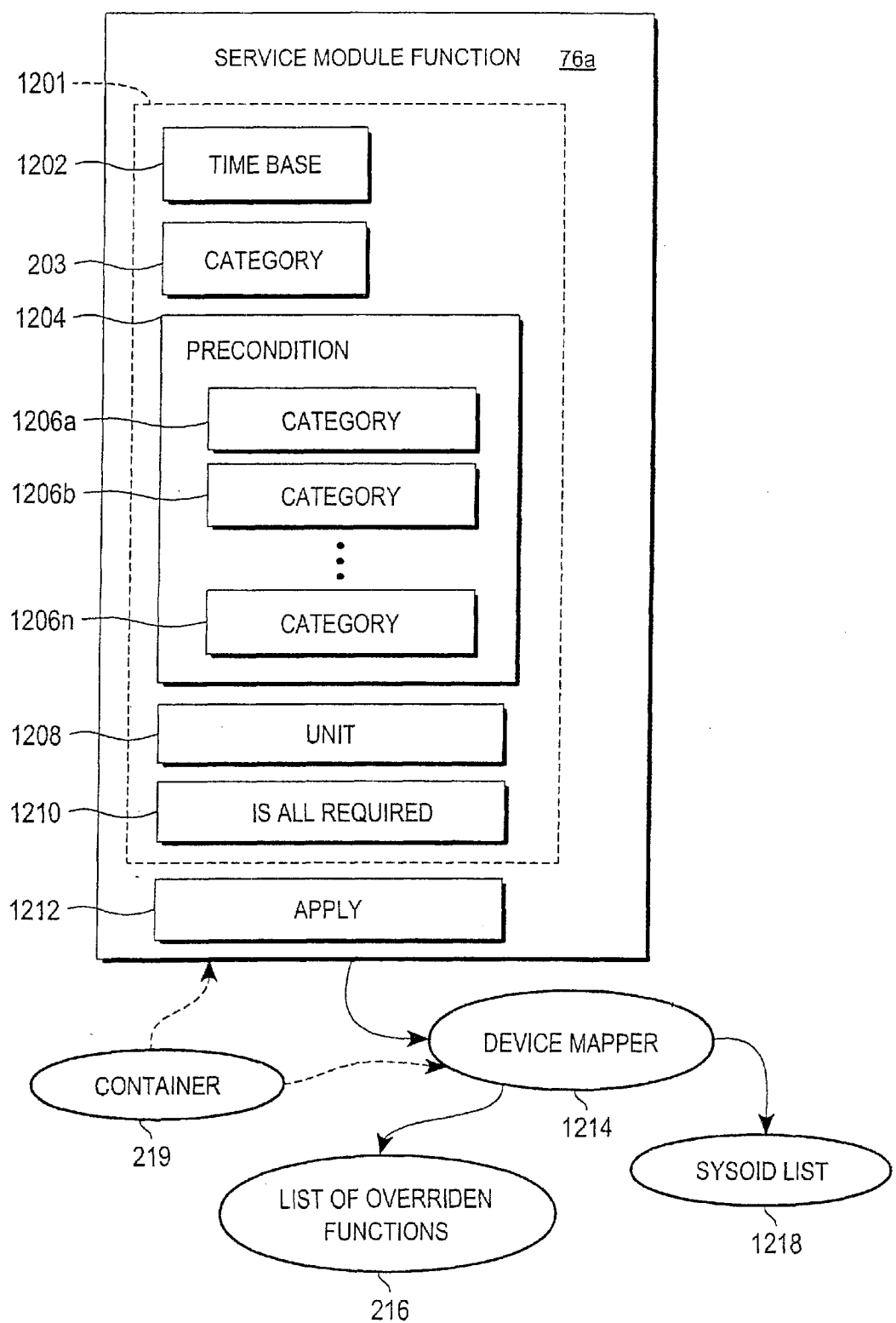
FIG. 2C is a block diagram of a Service Module Function.

FIG. 2C is a block diagram of a preferred embodiment of a Service Module Function 76a. An application programmer decides how to partition functions provided by a Service Module 54a into one or more Service Module Functions 76a–76n based upon various criteria, such as attributes of the service. The programmer isolates abstract processing concepts into Service Module Functions 76a–76n so that when the Service Module Functions are adapted to a particular device, less effort is required to construct the adaptation. For example, a Service Module 54a implements the abstract service of initial discovery of devices 102 in the managed network 100. Initial discovery may comprise component operations such as finding device identity information, device type information, and device module information. The Service Module 54a declares a Service Module Function 76a–76n for each component operation.

In the preferred embodiment, extensibility is managed by configuring each service module to extend the definitions of pre-defined JAVA® classes. For example, in the preferred embodiment, Service Modules 54a–54n extend classes in the Frame work 210, which is named com.cisco.mn.ani.framework. The classes that are extended are com.cisco.nm.ani.framework.ServiceModule and com.cisco.nm.ani.framework.SMFunction. Similarly, all device definitions are rooted in the package structure in the package com.cisco.mn.ani.devices.

As shown in FIG. 2C, a Device Mapper 1214 is associated with each device 102 or device type. Each Device Mapper 1214 is associated with a list 216 of overridden functions. Each entry in the list 216 identifies a Service Module Function 76a–76n that is overridden by the Device Mapper 1214 for its associated device or device type. Each Device Mapper 1214 is also associated with a list 1218 of identifiers of devices that are managed by the Device Mapper. In the preferred embodiment, the list 1218 is a list of sysObjectIDs, each of which references a unique type of device 102. In a preferred implementation, each Device Mapper 1214 is a class in an object-oriented programming language that extends a "devicemapper" class.

Since there may be many Device Mappers 1214, naming conventions are used to organize Mappers and express their relationship. In one embodiment, Mappers are named and stored in a directory structure of an operating system. For example, in the preferred embodiment, the operating system 30 is the Microsoft Windows® NT operating system, and Mappers are stored in the Windows directory tree structure. In other embodiments, Mappers are stored in the directory tree structure of the Solaris operating system, or other operating systems derived from UNIX, such as AIX, and HPUX.

Preferably, adaptation of the ANI 50 to new devices 102 is handled in an initialization phase of the ANI. FIG. 2F is a diagram of an Initialize method 250 and methods included in it. The Initialize method 250 includes a Discover All Devices method 252, a Load Configuration method 254, an Integrate Device Versions method 256, and a Device Mapping method 258. During execution of the Initialize method 250, in a startup or initialization load phase of the ANI 50, the Discover All Devices method 258 is invoked, which establishes certain data structures used in device mapping. Thereafter, the instantiation of one or more device-specific Service Module Function classes is carried out when an application program requests a service of a Service Module.

Specifically, ANI handles a particular device 102 in response to a client request or an internal request, such as the discovery of a new object in the network, by creating a Container Object 219, associating default mapping code with that container, instantiating certain Service Module Functions that carry an initial state for that Container object. ANI then initiates discovery of that device 102. In the course of discovery of that device 102, Service Module Functions particularize the handling of the device as the various attributes of the device are acquired. Specifically, as the sysObjectID of the device is acquired, a particular class of Device Mapper is associated with the Container object. If necessary, further refinement of the Device Mapper is done when version information describing the device is acquired.

Figure 3A:
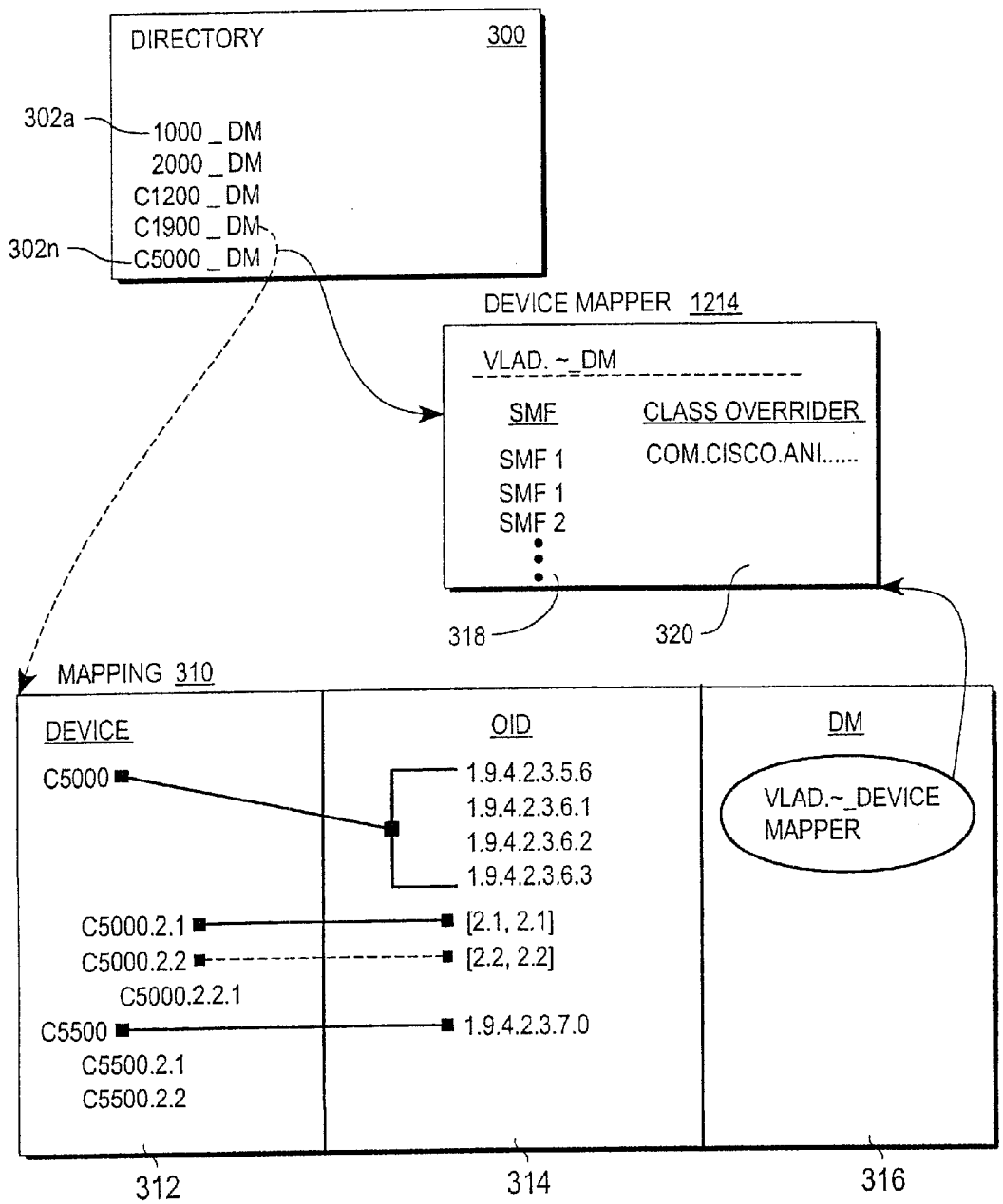
FIG. 3A is a diagram of data structures involved in device mapping.

FIG. 3A is a block diagram of exemplary data structures of the mechanism. A directory 300, managed by the operating system 30 of the network management station 10, stores subdirectory entries 302a–302n. Each entry 302a–302n is a subdirectory name identifying a subdirectory that contains a Device Mapper 1214. Each entry 302a–302n is associated with a type of a device 102. For example, in FIG. 3A, the directory 300 contains subdirectory entries associated with the Cisco 1000 router, 2000 router, Catalyst® 1200 switch ("C1200"), Catalyst 1900 switch ("C1900"), and Catalyst 5000 ("C5000") switch. Each subdirectory entry contains a single device mapper, which is preferably a JAVA class file. Each subdirectory entry generally also contains the class of the overriding Service Module Functions. It may also contain other directories containing device mappers.

The Cisco C5000 is presently commercially available in approximately a dozen versions or more. Accordingly, a mapping 310 is associated with the C5000 entry 302n of directory 300. The mapping 310 has a device type column 312 that stores device type identifiers. Each device type identifier names a device type. The mapping 310 also has an OID column 314 that stores SysObjectId values associated with C5000 class devices. The mapping 310 also has a device mapper name column 316. Each entry in the device mapper name column 316 is a name of a Device Mapper 1214. Thus, the mapping 310 associates a device type and its SysObjectId value with a Device Mapper 1214. When a device has more than one version, the versions are handled by subclasses of the parent class with implicit application to the sysObjectIds of the parent class. As a result, the mapping can automatically distribute software version sensitive mappings across a complete line of derived types. For example, the C55XX line of systems derive from the C5000 line of systems. Software versions that apply to C5000 systems generally also apply to C55XX systems. The automatic mechanism described herein applies the version sensitive mappers of the C5000 to the C55XX.

Each Device Mapper 1214 comprises a list, for all Service Module Functions 76a–76n defined in the ANI 50, of classes of the Service Module Functions that are overridden for the device associated with the Device Mapper. In an embodiment, the Device Mapper 1214 stores a plurality of entries, each entry comprising a value in a Service Module Function name column 318 and a class column 320 indicating the class of that function that is overridden. Using the list in the Device Mapper 1214, the ANI 50 can determine, when a particular device matching the OID is encountered, that a particular Service Module Function class should be overridden by a class listed in the Device Mapper list. Thus, the Device Mapper 1214 enables an application programmer to declare classes, the behavior and data of which are to be used when dealing with a particular service abstraction for a particular kind of device.

In the preferred embodiment, the Device Mapper 1214 associated with a particular device type need only contain overrides for the specific behavior of the device type that differs from other device types to which the particular device type is related in a hierarchy. For example, consider a device 102 of type C5500.2.2 that is related to earlier devices of type C5500.2.1, C5500, and C5000, as shown by the hierarchy of device type identifiers in column 312 of the mapping 310. The Device Mapper 1214 that is associated with device type C5500.2.2 need not include overrides for behavior that is overridden in the Device Mapper 1214 associated with device types C5500.2.1, C5500, or C5000. In the preferred embodiment, an automated mechanism incorporates the overrides of such related devices into classes that are instantiated for Service Module Functions applicable to the C5500.2.2 device.

Figure 2D:
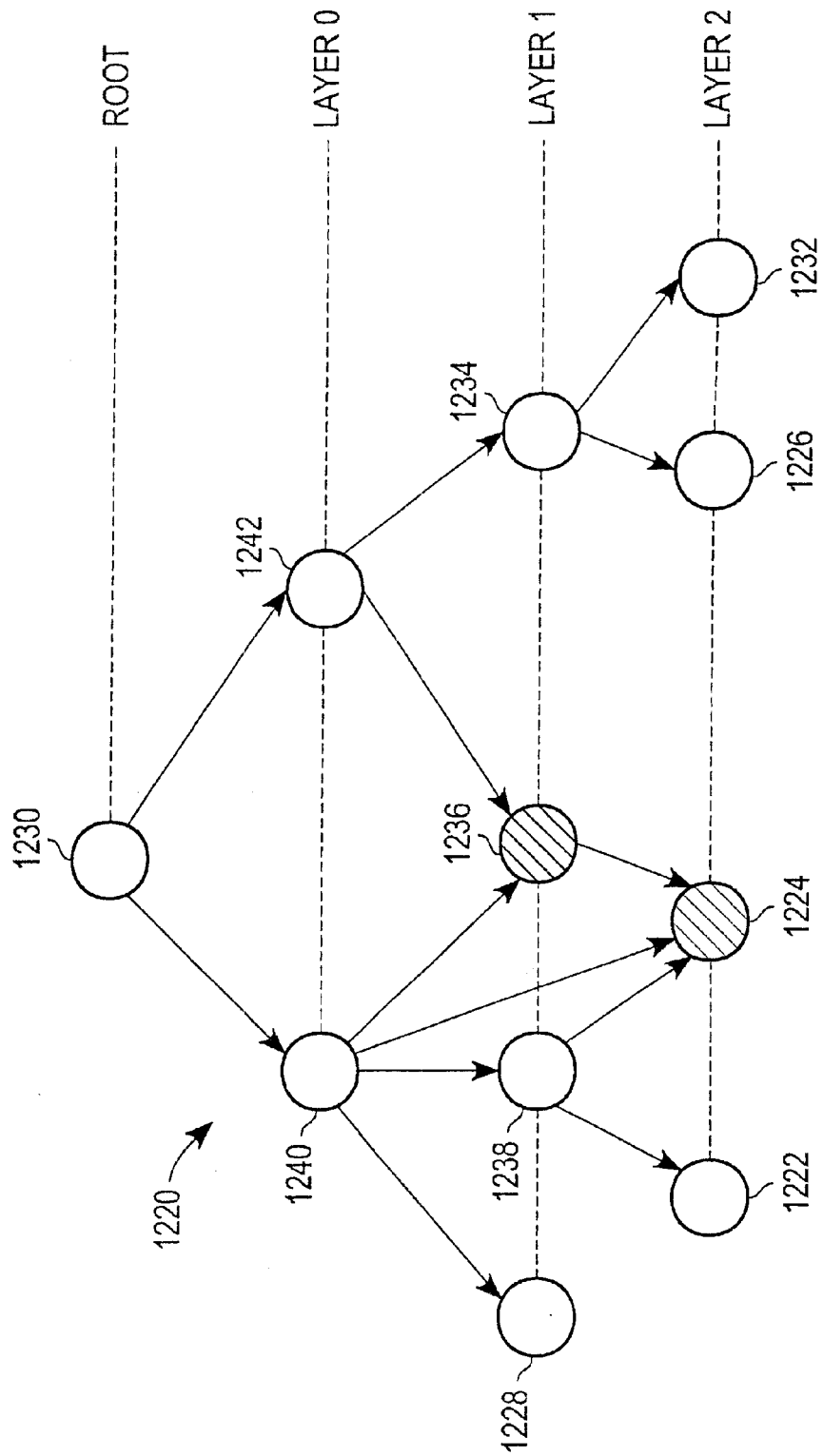
FIG. 2D is a diagram of an acyclic graph of Service Module Functions.
Figure 2E:
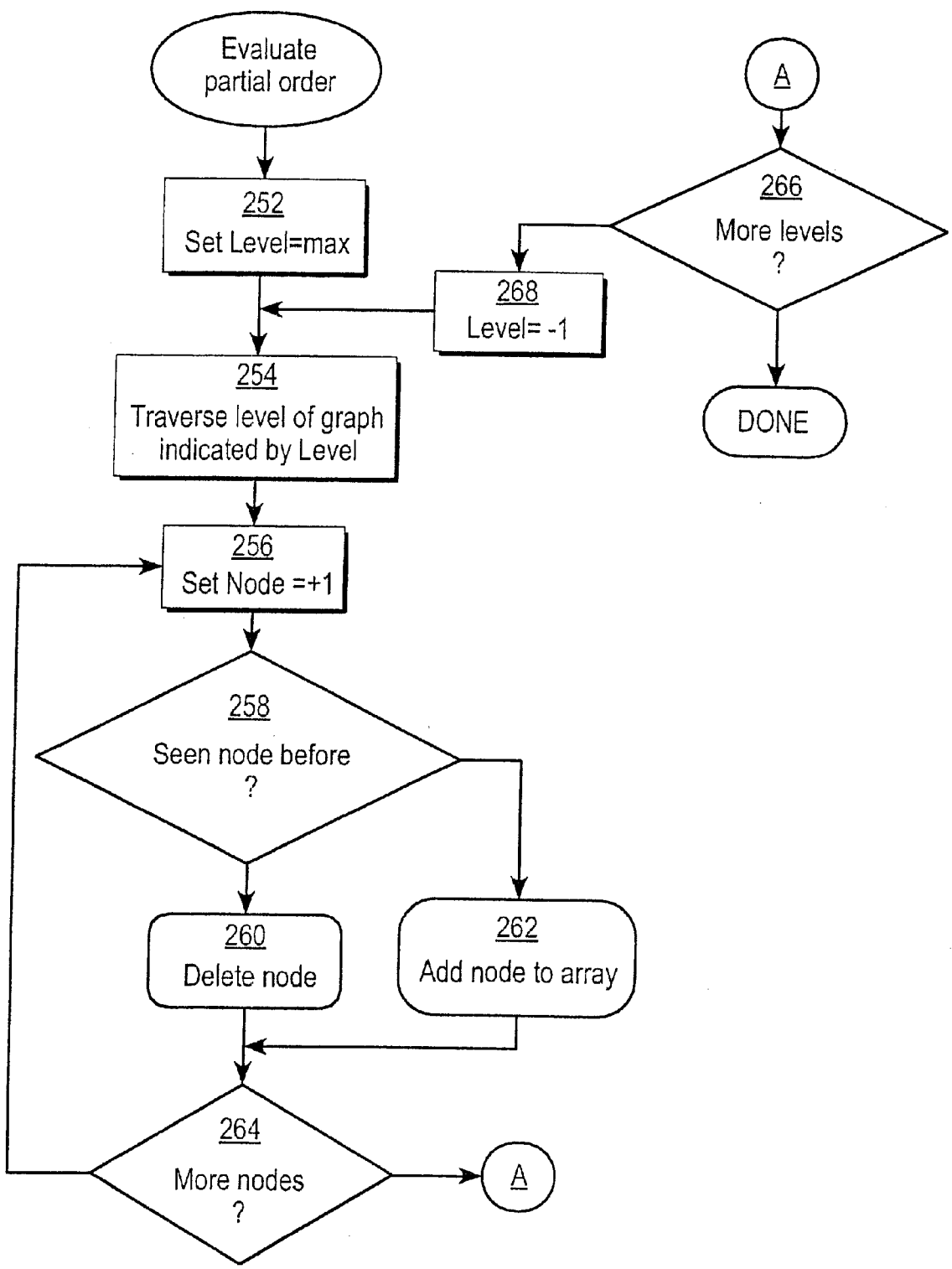
FIG. 2E is a flow diagram of a preferred method of partial order evaluation.
Figure 2F:
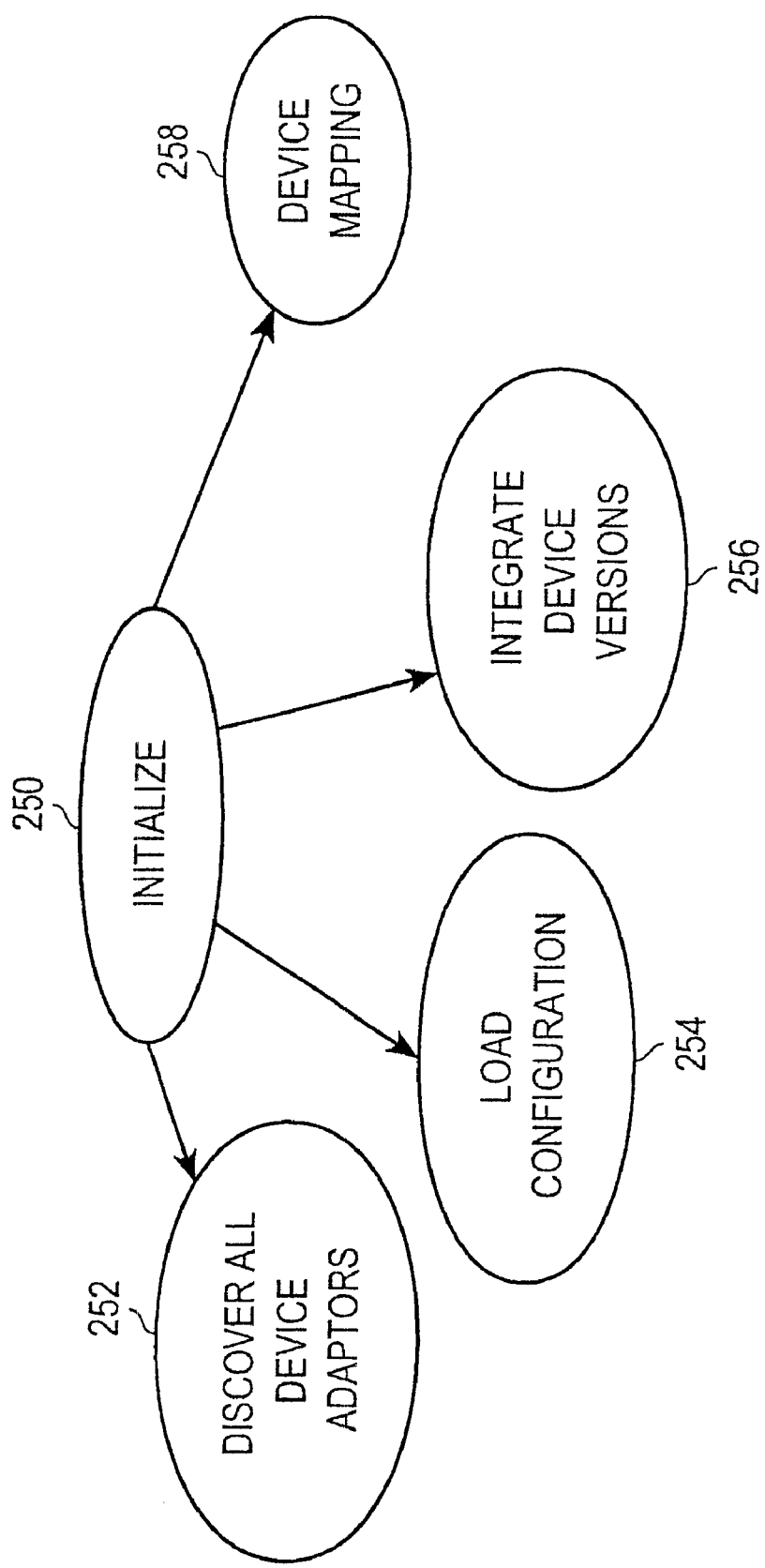
FIG. 2F is a diagram of an Initialize method and related methods.
Figure 3B:
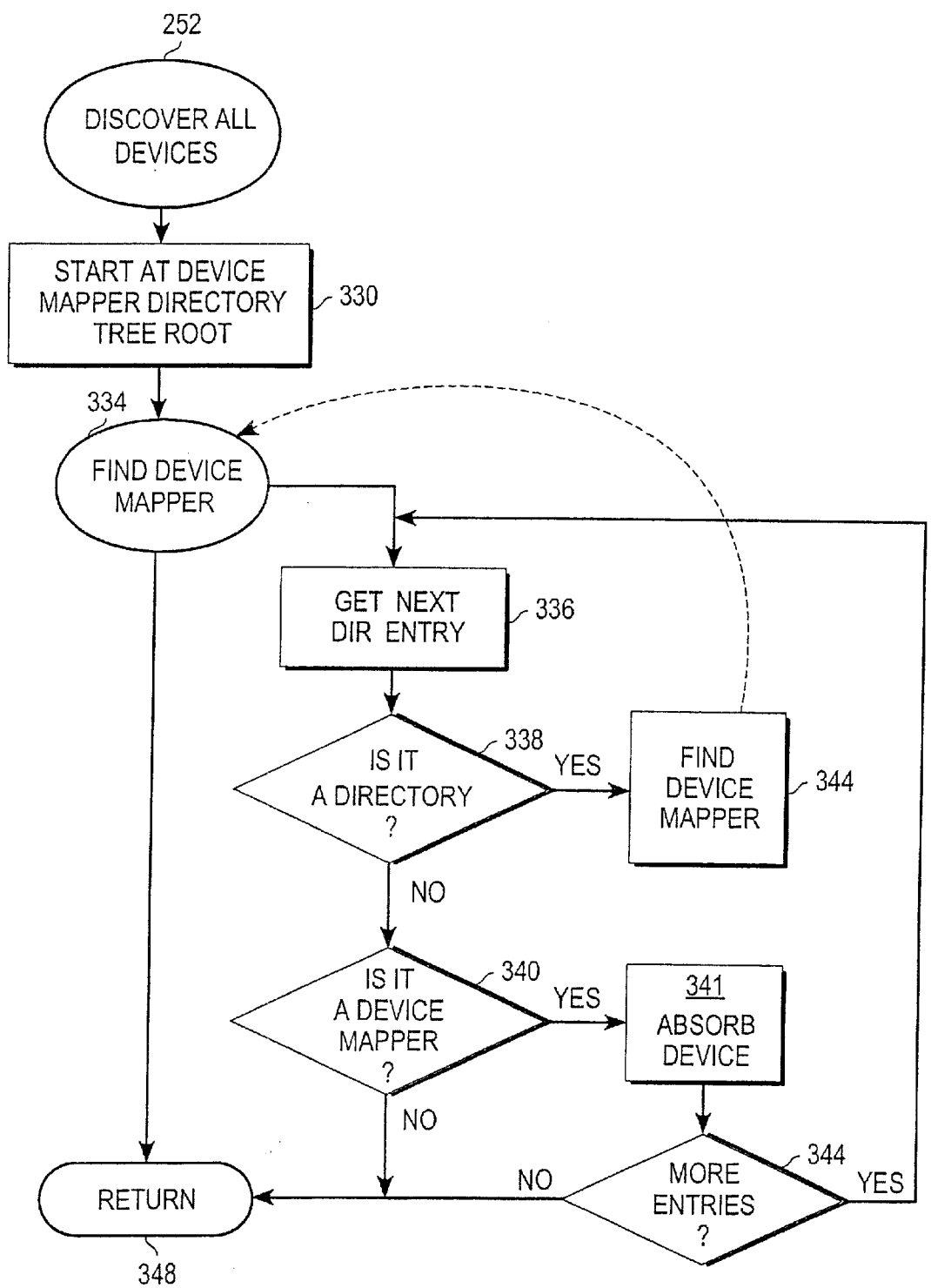
FIG. 3B is a flow diagram of a Discover All Devices method.

FIG. 3B is a flow diagram of a portion of the Discover All Devices method 252 shown in FIG. 2F that is executed in the Initialize method 250 of the ANI 50. The portion of the Discover All Devices method 252 shown in FIG. 3B constructs the mapping 310.

In block 330, the ANI 50 starts at the root of the device mapper directory tree by reading the root path from the properties file 56. In block 334, the ANI 50 locates a Device Mapper 1214 in the next available directory after the root. Blocks 336—344, inclusive, involve a recursive walk of the directory tree. Thus, blocks 336–344 may be implemented as a separate method that is recursively called. In block 336, the next entry in the directory 300 is read and examined. If the entry is another directory or subdirectory, as tested in block 338, then in block 344 a recursive call is made to block 334 so as to continue the search of the directory tree.

If the entry is not another directory or subdirectory, then the ANI 50 tests whether the entry is a device mapper, as shown by block 340. If the entry is a device mapper, then the device mapper is absorbed in an Absorb Device process, as shown by block 341. Generally, blocks 338–340 involve looking for directory entries named <something>DeviceMapper.class, in which <something> is a directory name and "DeviceMapper.class" identifies a Device Mapper 1214. For example, in the directory named "C1200," a Device Mapper is stored in the file "com.cisco.nm.ani.devices.C1200.C1200DeviceMapper".

As shown in block 344, if the entry is not a device mapper, then the search continues in any other entries of the directory. The steps of block 336, block 338, block 340, and block 344 are repeated for each device type supported by the ANI 50.

Figure 3C:
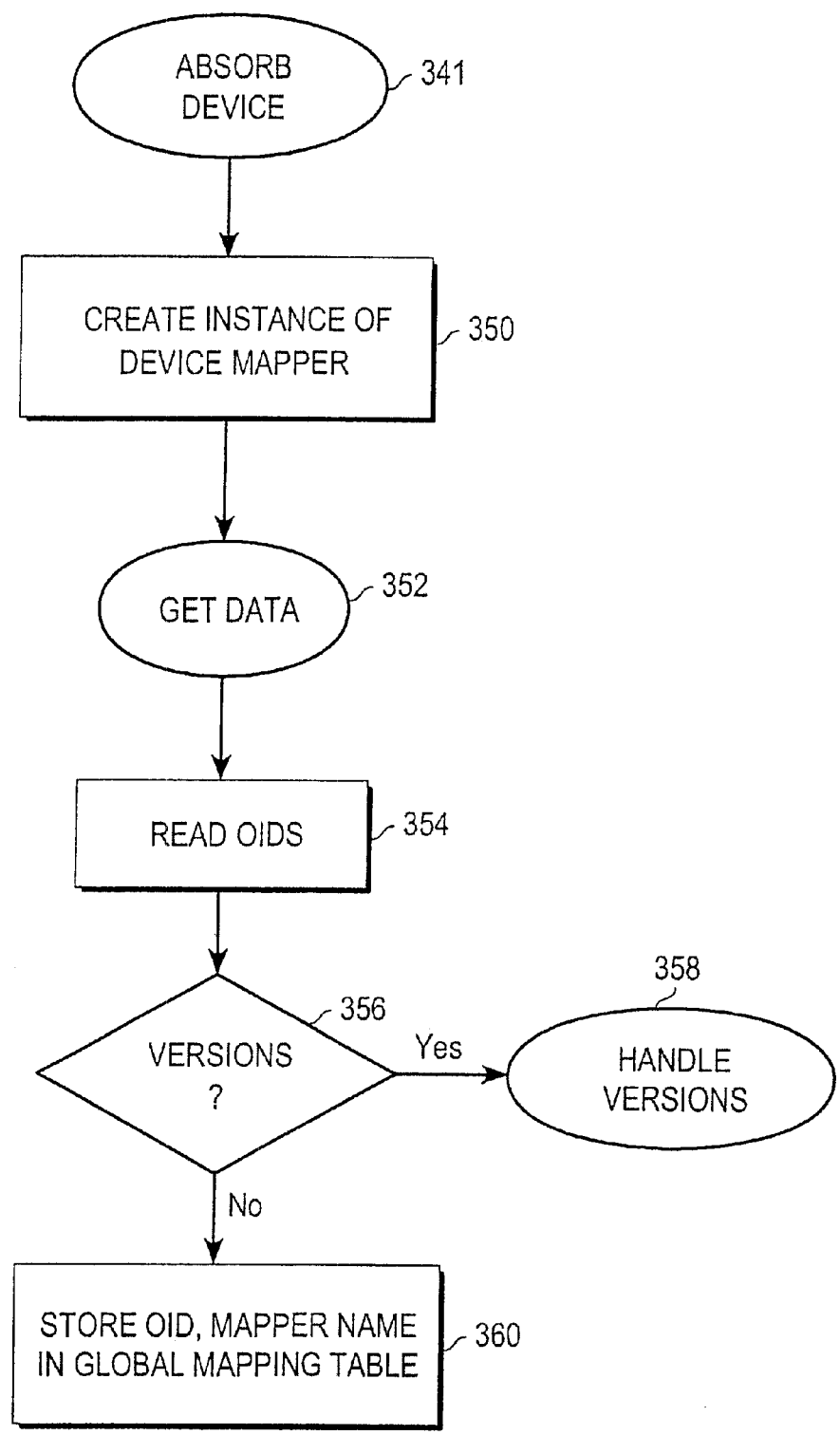
FIG. 3C is a flow diagram of an Absorb Device method.

FIG. 3C is a flow diagram of a preferred method of absorbing a device as indicated in block 341. In block 350, an instance of the Device Mapper found in block 334 is created, using its long class, e.g., "com.cisco.ani.devices.C1200. C1200DeviceMapper." In block 352, data stored in association with the Device Mapper is obtained. In particular, block 352 involves obtaining the information stored in the list 216 and the list 1218 associated with the Device Mapper. In block 354, the list 1218 is read in order to determine the device OIDs that are handled by the Device Mapper. In block 356, a determination is made as to whether the Device Mapper deals with a particular device software version. If so, then a special handling method is called in block 358, as described in more detail herein. Otherwise, in block 360, the OIDs in the list 216 and the name of the Device Mapper are added to the mapping 310. Preferably, the mapping 310 is a database table or a global variable that is accessible throughout the ANI 50.

Individual Device Mapping

Figure 3D:
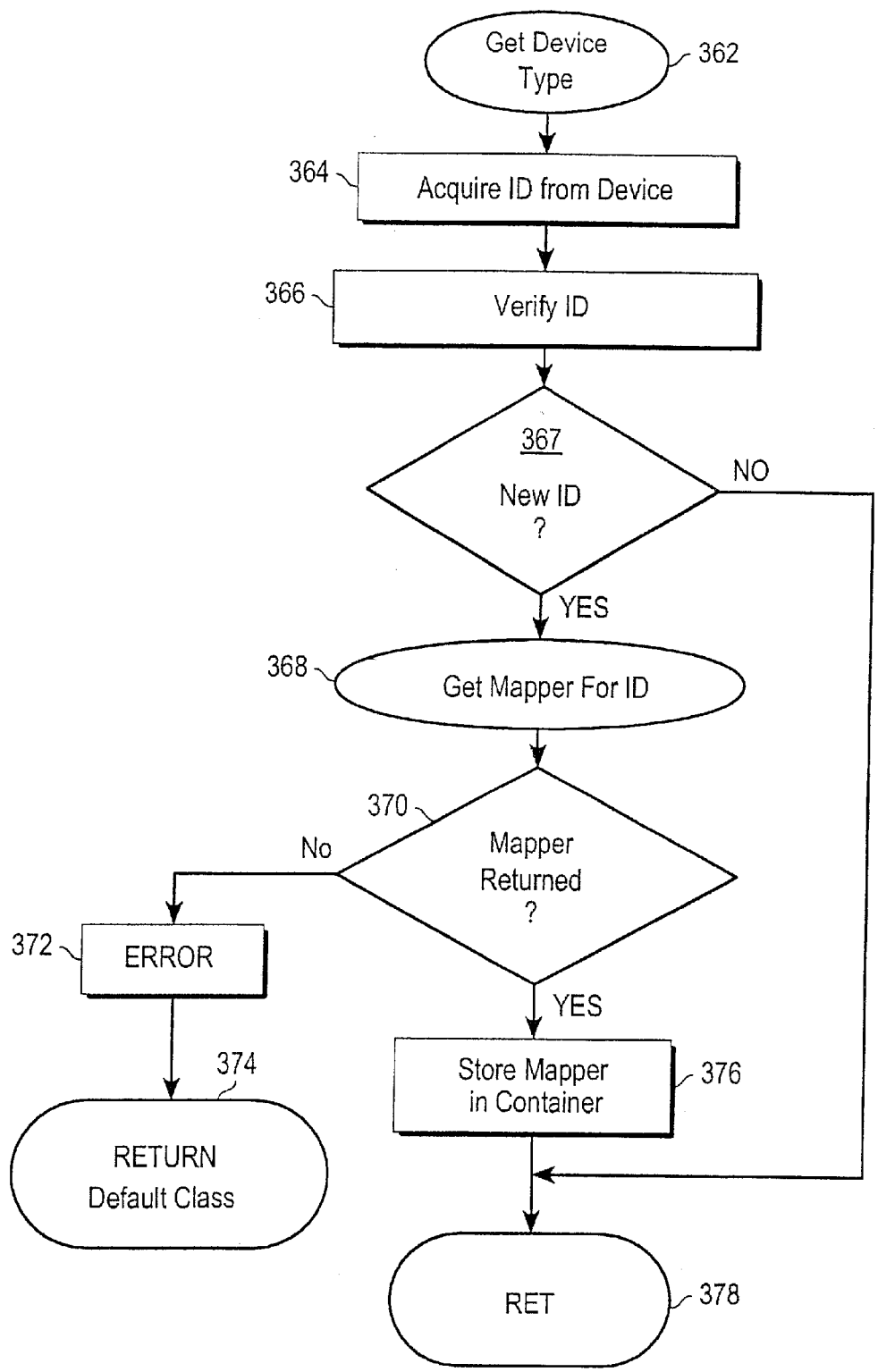
FIG. 3D is a flow diagram of a Get Device Type method.

FIG. 3D is a flow diagram of a preferred process for a GetDeviceType method 362. In block 364, the method acquires a value of a sysObjectID MIB variable from a device 102 that is of interest, by calling appropriate SNMP functions to obtain the value over the network 100. In block 366, the sysObjectID value is subjected to a validation process. If the sysObjectID is a new identifier not currently in the data model, as tested in block 367, then in block 368, a Device Mapper 1214 is obtained for the current sysObjectID value. In the preferred embodiment, block 368 involves invoking a GetMapperForID method, from a master Device Mapper class, and passing it the current sysObjectID value.

In block 370, a determination is made as to whether the GetMapperForID method returned a Device Mapper object. If not, in block 372 an error is thrown, and the Device Mapper base class or default class is returned in block 374. If a Device Mapper is returned, then in block 376, an identifier or name of the returned class is stored in the current Container object.

Figure 3E:
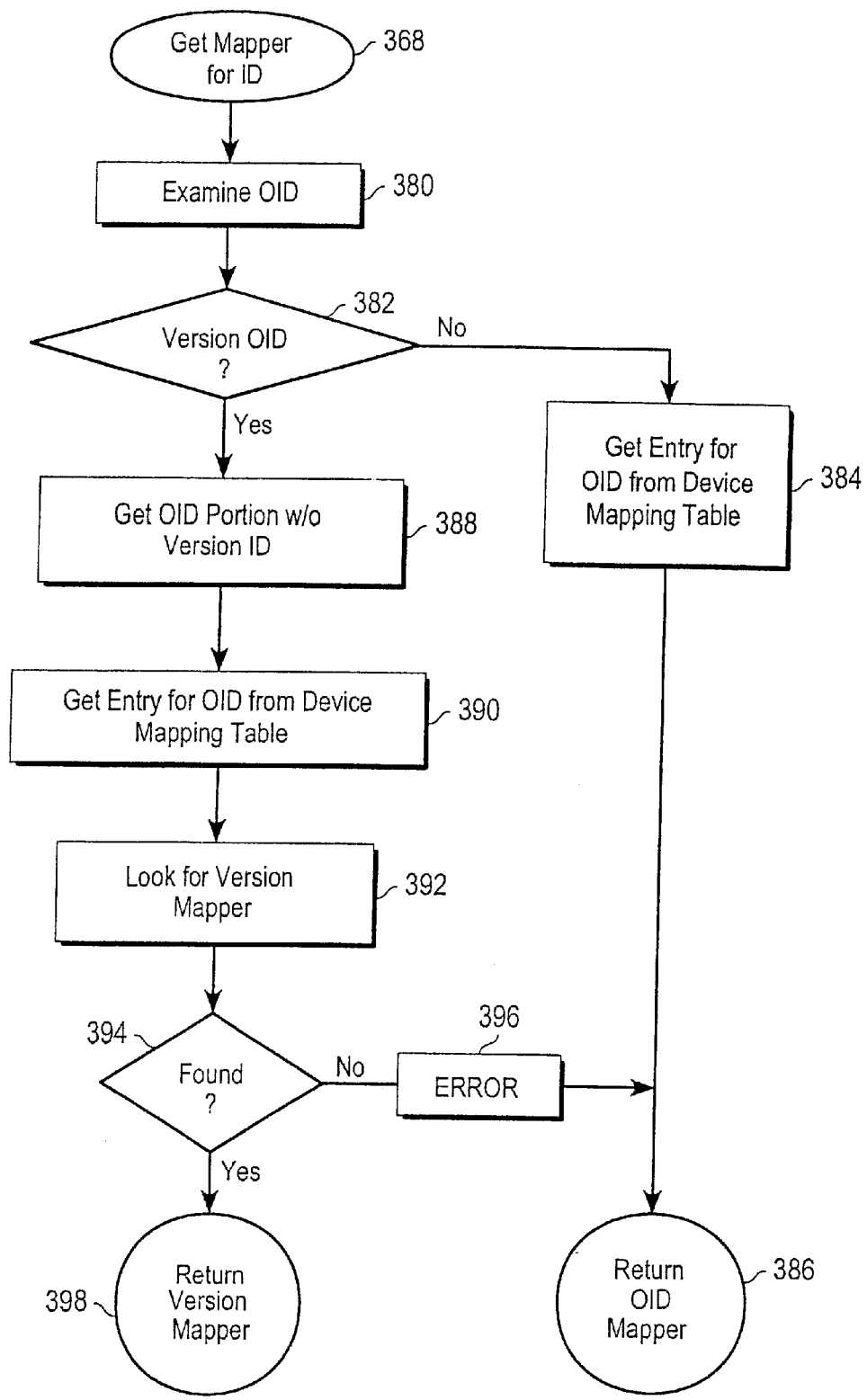
FIG. 3E is a flow diagram of a Get Mapper For ID method.

FIG. 3E is a block diagram of a preferred implementation of the GetMapperForID method 368. Generally, the GetMapperForID method 368 receives an OID, maps the OID to a device-specific Device Mapper, and returns the Device Mapper class name. In block 380, the OID passed to the method is scanned to determine whether it is a version OID, as tested in block 382. In a preferred embodiment, the colon character (":") in an OID is a version separator, and block 380 involves scanning the OID for a colon character.

If the OID is not a version OID, then in block 384 a Device OID table is scanned and an entry corresponding to the OID is read. As a result, a mapper for the OID is obtained. In block 386, the name of the Device Mapper found in the Device OID table is returned to the calling method.

If the OID is a version OID, then in block 388 a portion of the OID that excludes the version information following the colon character is extracted, and used in subsequent blocks as the OID. In block 390, a Device Mapper is located that is appropriate to the OID portion. Preferably, the steps of block 390 involve the same steps as block 384; the same function call or subroutine can be used. In block 392, a Device Mapper is located for the version portion of the OID. If the version Device Mapper is found, as tested in block 394, then it is returned in block 398. If not an error message is issued, as shown in block 396, and the Device Mapper for the OID stored into the Container object. If no device mapper is found, either for the OID or for the Version OID, then the default DeviceMapper is stored in the Container object.

Thereafter, references to Service Module classes of the Container object will be appropriately mapped into the appropriate device-adapted class.

The Handle Versions method 358 provides a mechanism to locate a Device Mapper based not only on OID but also on a version identifier. In standard MIB variables, software version information is not included. Therefore, a separate mechanism is required to enable the ANI 50 to match a particular version of hardware, software, or firmware of a device 102 to a Device Mapper. Preferably, entries in a Device Mapper may include information that specifies a range of versions over to which the Device Mapper applies. For example, the entries may provide version brackets indicating that a particular Device Mapper is chosen only within a particular range of versions, or from a particular version and all subsequent versions, etc.

The format of a version range, as specified as part of an OID when registering a DeviceMapper, is as follows:

<openingBracket> <lowerBound>, <upperBound> <closingBracket>

If there is a <lowerBound>, but no <upperBound> then:

1. if <openingBracket> is a left parenthesis ("("), then the entry applies to versions whose version string is greater than <lowerBound>.
2. If <openingBracket> is a left bracket ("["), then the entry applies to versions whose version string is greater or equal to <lowerBound>

If there is <lowerBound> and an <upperBound> then:

1. If <closingBracket> is a right parenthesis (")"), then the entry applies to versions whose version string is treated as above for the <lowerBound> but which is less than <upperBound>
2. if <closingBracket> is a right bracket ("]"), then the entry applies to versions whose version string is string is treated as above for the <lowerBound> but which is less than or equal to <upperBound>

If there is no <lowerBound>, but only an <upperBound>, the entry applies to versions with no lower bound but which is treated for <upperBound> as in the case for <lowerBound> and <upperBound>.

Using Device Mappings to Particularize for a Specific Device

Using the data structures and mappings established by the foregoing mechanisms, Service Module Functions may be instantiated in a device-specific manner at runtime when a service is needed by an application. Generally, the process resulting in such instantiation is called invocation. In operation, in general, an application such as network management system 40 requests a service of a Service Module 54a by sending a message to the Service Module requesting the service. The Service Module may gather a collection of Containers representing devices, for example. When a particular service is requested of a particular device in a particular Container, by using a Service Module Function, the Device Mapper object associated with the Container object mediates the reference to the method, finds the appropriate method, instantiates it, and makes it available as the code to be used for the current managed device 102 for the current Container object.

Figure 3F:
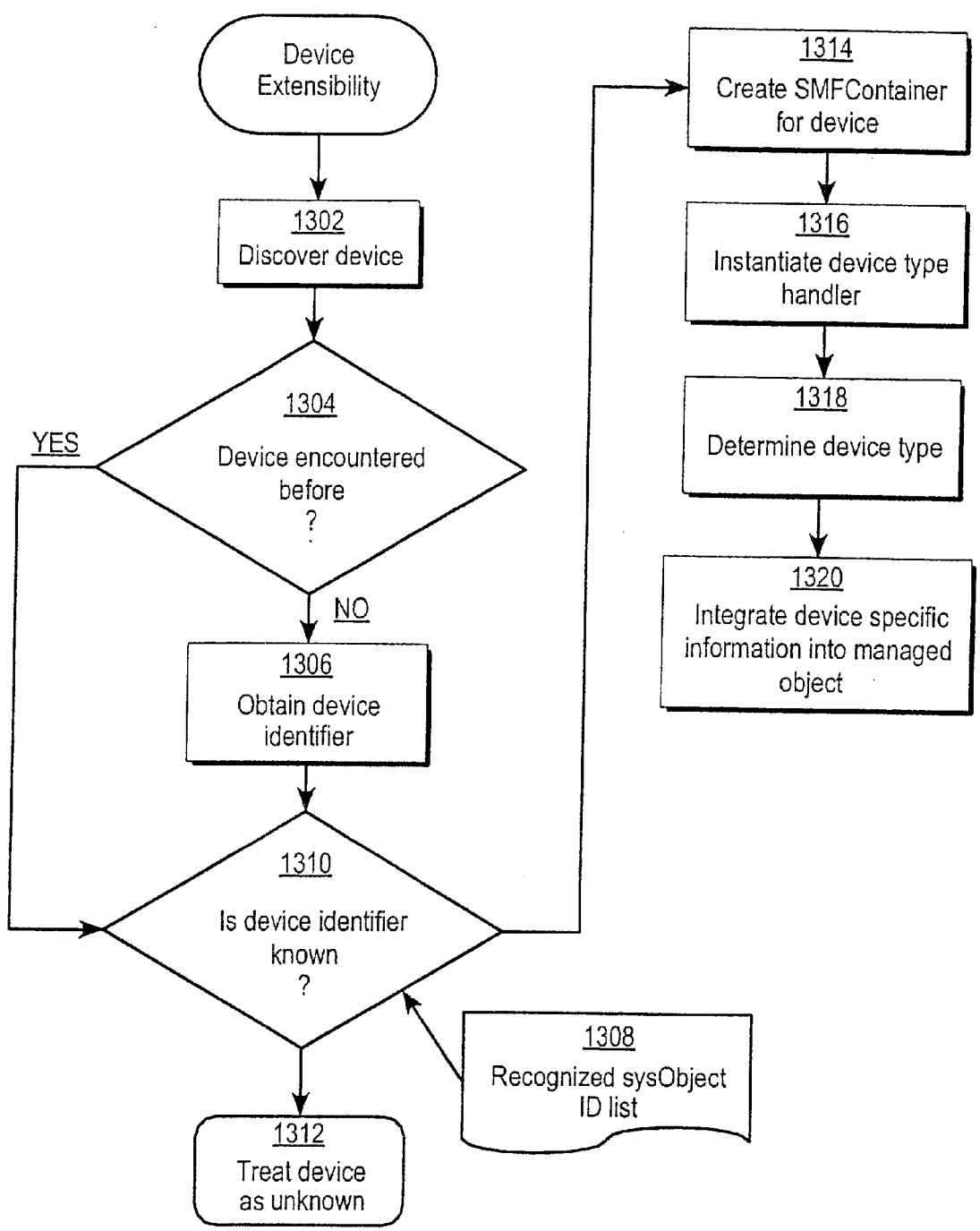
FIG. 3F is a flow diagram of a device extensibility method.

FIG. 3F is a top-level flow diagram of one embodiment of an invocation process. In block 1302, one or more devices are discovered in the network 100. Block 1302 is executed, for example, in response to a request by an application program to carry out some function relating to devices 102 in the network 100. When a device is encountered in the network 100 for the first time, as tested in block 1304, then in block 1306 an identifier of the device indicating its type is obtained. For example, a unique value called a sysObjectID is obtained from the device.

When the ANI 50 is initialized, it constructs a list 1308 of sysObjectIDs that it recognizes and can manage. In block 1310, the ANI tests whether the acquired sysObjectID matches one of those loaded by ANI at start-up time. If so, then in block 1314 a Container object is created for the device, and in block 1316 an appropriate device type handler (a device mapper 1214) can be instantiated. If the sysObjectiD is not recognized in the test of block 1310, then in block 1312 the device is treated as unknown, and UnknownDeviceMapper is used.

In block 1318, the version of the device is determined. The determination of block 1318 is done in a device type specific manner. In block 1320, the device specific information is integrated into the Container object. Preferably, as a consequence of ANI 50 determining a device's type and version, an instance of a Device Mapper is stored in the Container object. Thereafter, the Service Module Functions used to perform services for that Container are selected to be appropriate to the selected device and version.

Figure 3G:
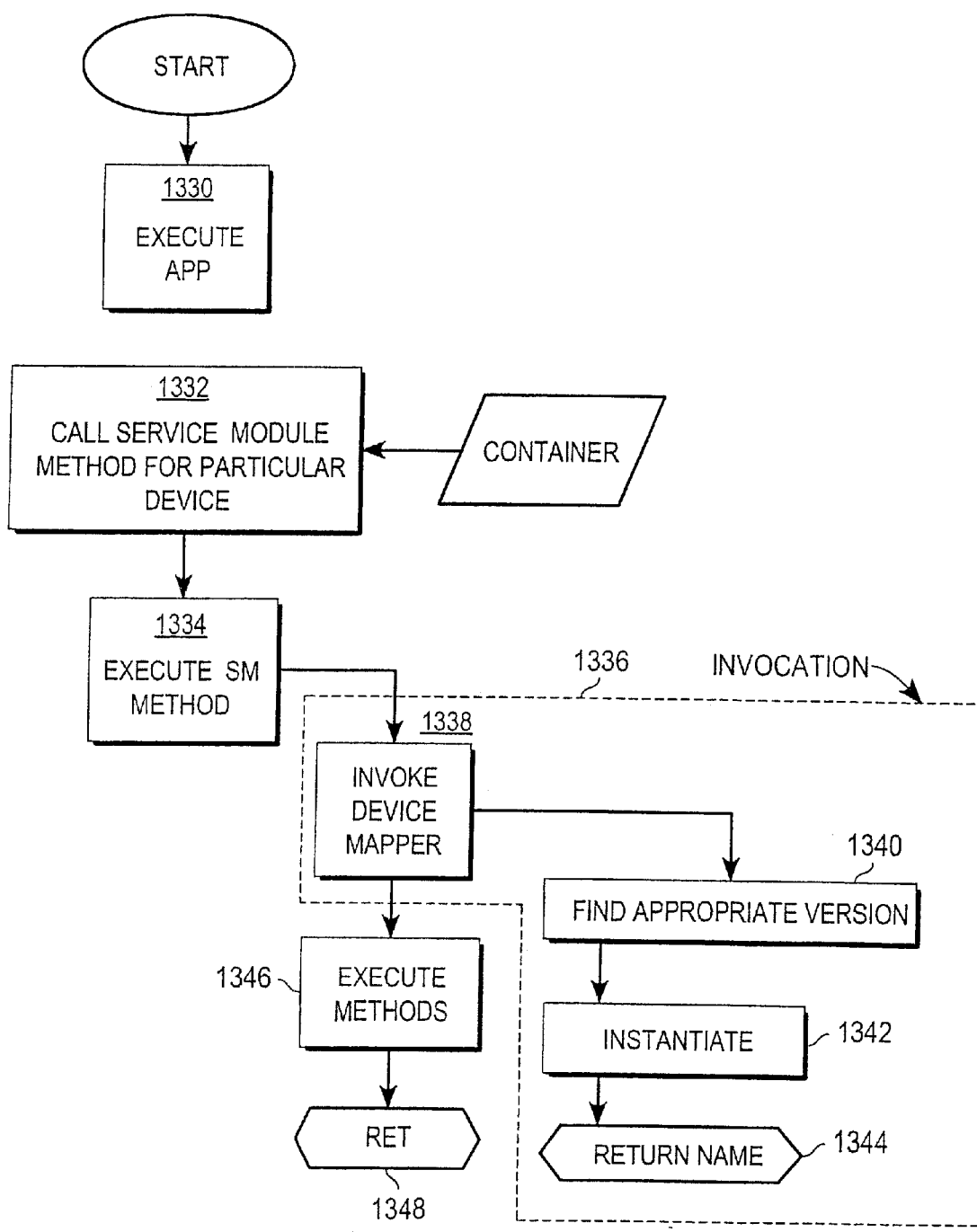
FIG. 3G is a flow diagram of a service module execution method.

FIG. 3G is a flow diagram of another embodiment of an invocation process. In block 1330, an application such as network management system 40 is executed. In block 1332, the application calls a method of a Service Module passing it some kind of device identifier, for example, an IP address. In block 1334, the Service Module method is executed. Part of the execution of the Service Module method is the translation of the device identifier into a reference to a Container object.

Box 1336 shows invocation processes. In block 1338, a Device Mapper 1214 associated with the Container object is invoked. In block 1340, a version of the Service Module Function called in block 1332 and that is appropriate for the current device type is located. In block 1342, the device-specific Service Module Function is instantiated or retrieved. In block 1344, the reference to the device-specific Service Module Function is returned to block 1338. In block 1346, methods of the device-specific Service Module Function are executed, and the application thereby is serviced. In block 1348, control returns to block 1334 or subsequent processes.

Figure 3H:
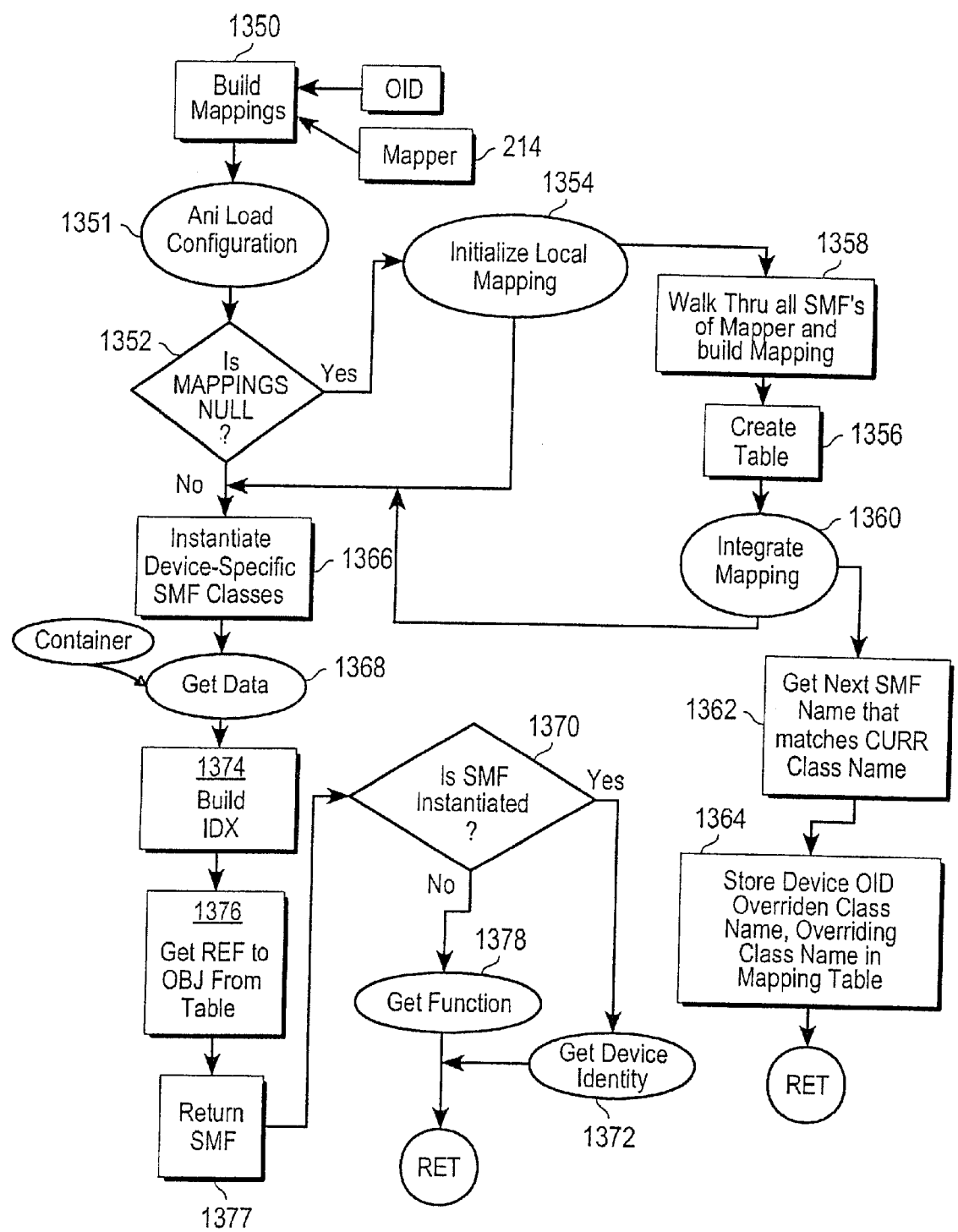
FIG. 3H is a flow diagram of a method of building mapping information.
Figure 3J:
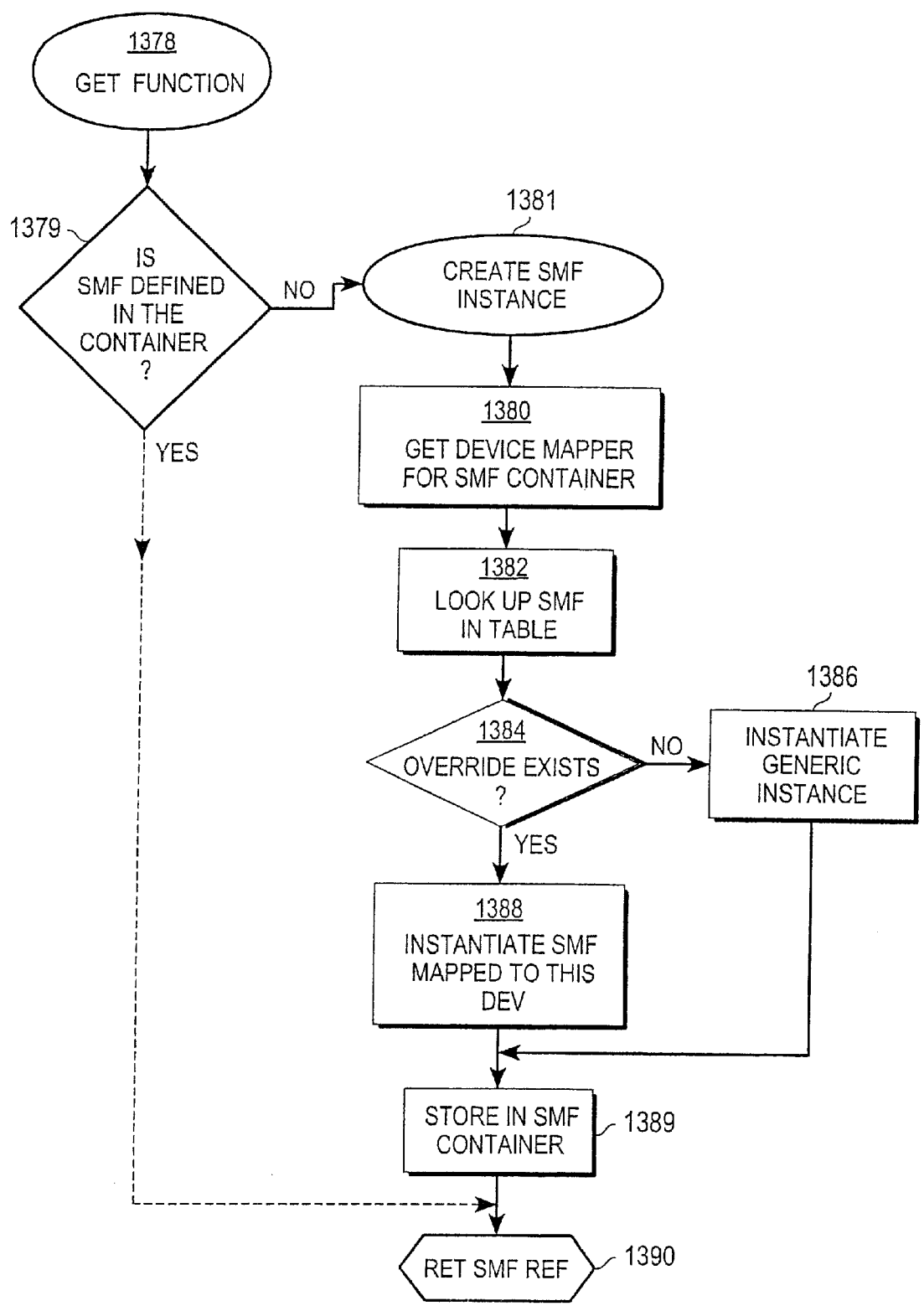
FIG. 3I is a flow diagram of a Get Function method.

FIG. 3H is a flow diagram of a preferred process for finding and instantiating a device-specific Service Module Function as indicated in block 1340 and block 1342. Block 1350 generally refers to the initialization process that is shown in FIG. 3B, FIG. 3C, FIG. 3D, and FIG. 3E. Generally, the process of FIG. 3H involves receiving a device OID and a corresponding Device Mapper, and then instantiating device-specific classes that implement the requested Service Module Function.

Each Device Mapper 1214 includes an initialization method named InitializeLocalMappingTable and a Boolean instance variable __SMFMappings. The instance variable __SMFMappings is structured as a hash table that stores a mapping of classes that are needed for the current Service Module Function for the current device. Initially, __SMFMappings is set to a null value, and it is filled with mapping values the first time that a particular device invokes the current Device Mapper 1214. Accordingly, in block 1352, the value of __SMFMappings is tested, and if it is null, then an InitializeLocalMapping method 1354 is executed.

In the preferred embodiment, each Device Mapper 1214 includes a InitializeLocalMapping method that does mapping for the Device Mapper. However, this embodiment is used only due to certain inheritance restrictions of the JAVA® language. In an alternative embodiment, there is one InitializeLocalMapping method for all Device Mappers.

According to the InitializeLocalMapping method 1354, in block 1356 the __SMFMappings instance variable is initialized as a hash table. The InitializeLocalMapping method 1354 scans through all the Service Module Functions that are listed in the Service Module Function name column 318 of the current Device Mapper 1214, as indicated in block 1358. For each Service Module Function named in the Device Mapper 1214, in block 1360, a method is called to integrate overrides of that Service Module Function into the __SMFMappings hash table. Preferably, an Integrate Method is called in block 1360 and is passed the hash table and the Service Module Function name.

In the IntegrateMapping method, as shown in block 1362, in the override list 320 of the Device Mapper 1214, the ANI 50 finds the next Service Module Function name that matches the current class name. For example, consider a situation in which the current directory name associated with the device type is "C5000", and the Service Module Function named in column 318 of the current Device Mapper 1214 is "VLADSMFGetDeviceDetails". In block 1362, the Service Module Function name is concatenated with the current directory name to yield an overriding Service Module Function name. The overriding Service Module Function must be named <directoryname> <genericname>. Thus, for device C5000 and Service Module Function VLADSMFGetDeviceDetails, the overriding Service Module Function name would be "C5000VLADSMFGetDeviceDetails." The foregoing implementation is known to be required due to limitations on class name duplication inherent in the JAVA® language. In an alternative embodiment, names of overriding classes are the same as overridden class names, but are located in a sub-directory named after the device. For example, an overriding class would be com.cisco.nm.ani.devices.c5000.VLADSMFGetDeviceDetails.

In block 1364, the device OID, overridden class name, and the corresponding overriding class name are stored in the hash table. In an embodiment, the values are stored in the __SMFMappings instance variable local to the current Device Mapper.

The designation of the hash table __SMFMappings as a local instance variable is an important aspect of this embodiment. Consider the foregoing example in which the method C5000.C5500DeviceMapper is the Device Mapper 1214 for a C5500 device. It is a subclass of the method C5000DeviceMapper, which is the Device Mapper for C5000 devices. Consequently, when the JAVA® operation super is executed in the C5500 DeviceMapper, it causes the C5000 device mapper to be executed in the current local context. Therefore, the __SMFMappings hash table of the C5500 device mapper is used by the C5000 device mapper. Accordingly, the C5500 hash table is populated with overrides associated with the C5000 device mapper. Then the C5500 Device Mapper executes and populates the hash table with its device-specific overrides.

As a result, if the C5500 Device Mapper overrides a class that the C5000 device mapper also overrides, the C5500 Device Mapper will predominate, because it will overwrite the conflicting entry previously stored in the hash table by the C5000 device mapper. In contrast, if the C5000 device mapper stores a hash table entry that the C5500 Device Mapper doesn't override, then the hash table contains only the C5000 override. If neither Device Mapper stores an override for a particular Service Module Function, then the default class is eventually instantiated.

Thus, using an instance variable in the Device Mapper, but invoking each superclass and letting it fill the local variable itself, results in a general inheritance model for device-specific class adaptation. Using inheritance mechanisms of an object-oriented programming language, classes that define Service Module Function behavior are incrementally added to an override mapping.

Once the hash table is initialized and filled, one or more device-specific Service Module Function classes may be instantiated, as shown in FIG. 3H, in block 1366. For example a device specific GetDeviceDetails Service Module Function class is instantiated during device discovery. The GetDeviceDetails SMF implements methods that carry out detailed device discovery functions such as fetching modules.

In block 1368 and subsequent blocks, overrides are handled. Preferably, in block 1368, the current Container object is passed to a GetData method, details of which are shown in FIG. 3I which is described elsewhere herein. A function is called in order to retrieve an index into the hash table that identifies the device-specific Service Module Function instance. As shown in block 1374, processing occurs to determine which instance is needed, and the result is an index value. The index value references an entry in an ordered sequence that is particular to the current device. The ordered sequence contains references to instantiated Service Module Functions, as shown in block 1376. In block 1377, the instance is returned.

Using the steps of block 1368, block 1374, and block 1376, and block 1377, a particular instantiated object that implements a Service Module Function is obtained based on a device mapper and the name of the generic Service Module Functions. Consider an example in which the generic Service Module Function name is VladSMFGetDeviceDetails. There may be dozens of such functions defined, each for a particular device type. Based on the device mapper in the current Container object, the GetData method computes the proper index and gets the particular instance from the ordered sequence of Service Module Functions contained in the Container object.

In block 1370, a determination is made as to whether an overriding Service Module Function is already instantiated. If the test of block 1370 indicates that the Service Module Function has been instantiated before, then in block 1372, a device identity is obtained.

If the test of block 1370 indicates that an instance has not been created, then control is passed to a Get Function method 1378 in order to create such an instance.

FIG. 3I is a flow diagram of a preferred embodiment of a GetFunction method 1378. Generally, the purpose of the GetFunction method 1378 is to create an instance of a Service Module Function, taking into account device-specific mapping. Based on a Container object and its device mapper, a device-specific class is retrieved. Preferably, a parameter to the GetFunction method 1378 is a generic instance of the Service Module Function that contains identification information. In the preferred embodiment, the identification information is an index into the Containers Service Module Function list 76.

In block 1379, a determination is made as to whether Container contains a device-specific service module function instance as defined by the passed generic instance. If so, then in block 1390 the Service Module Function instance is returned to the caller.

If the test of block 1379 is negative, then control is passed to block 1381, in which a Service Module Function object is instantiated. In block 1380, the Device Mapper 1214 associated with current Container object is retrieved. In block 1382, the requested Service Module Function is looked up using the Device Mapper 1214. If an override exists, as tested in block 1384, then the overriding Service Module Function is instantiated in block 1388 and stored in the Container object in block 1389. As a result, in block 1390, the mapped Service Module Function version appropriate to the particular Device Mapper associated with the current device is returned.

If there is no override, then the generic version of the SMF is instantiated in block 1386 and processing continues in block 1389.

At this point, the device-specific Service Module Function is available for passing back in the GetData method.

Consider an example in which a Service Module defines a generic service module function class VLADSMFGetDeviceDetails that defines a particular abstract behavior. The directory 300 also contains a class C5000VLADSMFGetDeviceDetails that defines overriding behavior for a C5000 type device. Generally, there are far more methods in the generic class than the specific class; accordingly, the specific class for device C5000 only overrides specific behavior that is inappropriate for the C5000 device. Indeed, for a given device type, there may be only one overriding class and, perhaps, only one overriding method.

In this example, block 1380 involves identifying the class name of the generic function that was passed in, e.g., com.cisco.mn.cwsi.ani.VLADSMFGetDeviceDetails. A function name segment of the full class name is extracted, e.g., VLADSMFGetDeviceDetails. The Device Mapper known to the SMFContainer in which the properly overridden version instance of VLADSMFGetDeviceDetails is to be stored Device Mapper is consulted, and its mappings are examined to identify a function associated with the function name. If there is none, then in block 1390 an instance of the prototype function is returned. If there is a function found, an instance of it is returned in block 1390. Preferably, block 1388 involves getting the device-specific class and instantiating it. Block 1389 stores it in the Container object.

Thus, after the mappings shown in FIG. 3A are established, a reference to a generic Service Module Function will cause the function to instantiated in a form that is appropriate and customized for the current device. The customized class is selected based on the OID and version of the current device. Moreover, the mapping mechanism described herein is not dependent upon the content of the identifiers that are used in mapping. For example, the mapping need not use a SysObjectId or OID; it may use any other identifier.

Using the foregoing mechanisms, the ANI 50 integrates with itself, service modules and device definitions. As part of the foregoing mechanisms, information about a new device is integrated with the ANI 50 through simple steps. A programmer determines the operational differences between the new device and prior devices. A new directory 300 is created for the new device within the current directory structure, below the most closely related device. A Device Mapper 1214 is created. OIDs for the new device are declared in the Device Mapper. One or more Service Module Functions are written to implement those attributes of the new device that are different from its most closely related device. The Device Mapper and Service Module Functions are distributed, for example, by download to users of the ANI 50. A user of ANI 50 downloads classes for the Device Mapper and Service Module Functions into the user's directory tree. The user restarts the ANI 50 and the new information is automatically integrated.

This mechanism is highly advantageous. Some network devices vary in subtle ways from other devices, but also run the same software in general. For example, some new device types represent refinements of device hardware only, whereas some new device types represent new versions of software executed by the device. In prior approaches, an application programmer is required to hand replicate processing common to an existing device into a class that governs.interaction with a related but slightly different device. In the preferred embodiment, such hand replication is eliminated, thereby greatly reducing application development time and lessening the likelihood that bugs are introduced.

5. Evaluation of the Order of Execution of Service Module functions

In the preferred embodiment, the ANI has a mechanism providing dynamic determination of the execution sequence of processes. The mechanism comprises a set of executable components, a characterization mechanism, a partial order mechanism that depends on the characterization mechanism, and a partial order execution mechanism.

The set of executable components completely describes the processing to be performed for some component of, for example, the managed devices at a particular time. If a new requirement must be satisfied by additional executable components, the additional executable components are added to the set. In the preferred embodiment, the executable components are Service Module Functions, and the dynamic determination of execution sequence involves evaluation of partially ordered Service Module Functions. The characterization mechanism provides an annotation of each executable component, permitting reference to each component in other parts of the mechanism.

The partial order mechanism establishes order among a set of Service Module Functions 76a–76n. Each Service Module Function declares "preconditions" that represent one or more dependencies of the Service Module Function on another Service Module Function. During the startup phase of the ANI 50, all Service Modules and all Service Module Functions are subject to several types of evaluation. One evaluation determines execution order. Execution order is determined by grouping Service Module Functions into execution equivalence classes. An execution equivalence class is determined by the TimeBase of each Service Module Function. A Service Module Function may have several timebases and, thus, be a member of several equivalence classes. Within each equivalence class, each Service Module Function is placed in relation to each other Service Module Function of the equivalence class through an examination of the "pre-conditions" belonging to the Service Module Function in the equivalence class.

The partial order mechanism depends upon the characterization mechanism. The partial order mechanism enables a first executable component to declare which other components are "pre-conditions" to the first executable component. In this context, a component that is a "pre-condition" to a first executable component means that the other components must be executed before the first executable component. Each pre-condition comprises one or more characterizations.

The partial order execution mechanism schedules or orders the executable components into a final execution order, by evaluating the characterizations and pre-conditions. Newly introduced components are added to the execution order when the partial order execution mechanism runs. In the preferred embodiment, the executable components are Service Module Functions. FIG. 2C is a block diagram of a preferred structure of a Service Module Function 76a. Service Module Functions 76a–76n are self-describing using metadata that describes the needs and the services provided by the Service Module Function. The ANI 50 uses the metadata to determine when a Service Module Function must be invoked, the kind of data it requires, and whether resources it requires are available in the system. Preferably, the metadata comprises a TimeBase value 1202, a PreCondition value 1204, a Unit value 208, an isAllRequired value 1210, and an Apply method 1212.

Each TimeBase method 1202 returns a value indicating when the current Service Module Function is performed. In the preferred embodiment, each TimeBase method 1202 may return a value of Periodic, Fixed, or Demand. The Periodic value means that the Service Module Function is executed periodically when the system does, for example, device discovery. The Fixed value means that the Service Module Function is executed at a fixed time. The Demand value means that the Service Module Function is executed immediately, upon request by the user. Use of these values in partial order evaluation and execution is described below.

The PreCondition value 1204 identifies preconditions for the current Service Module Function 76a, i.e., Service Module Functions that must be executed before the current Service Module Function module. In the preferred embodiment, a PreCondition value 1204 is a set of Category names 1206a, 1206b–1206n. In the preferred embodiment, each Category name 1206a–1206n of a precondition refers to a category name 203 in an SMFDescription 1201 of some Service Module Function. A category name 203 is unstructured. By convention, category names are a series of words separated by periods ("."). Generally, the words, in order, include the name of the TimeBase, the name of a phase of computation, and an abbreviation of the SMF name. For example, a Category name might be the following: "Discovery.Acquire.GetIdentity". Conventionally, this means that the named SMF is intended to run in the Discovery timebase during the Acquire phase and it is the GetIdentity Service Module Function.

The Category name 1206a–1206n may comprise either a set of names that explicitly correspond to names of SMF objects, or one name that contains a wildcard character. An example of a name having a wildcard character is "Discovery.Acquire.*". When a name containing a wildcard character is specified, the name signifies that all modules characterized by the wildcard must be executed before the current module. However, all the modules characterized by the wildcard may be executed in any order among themselves.

Preferably, each execution equivalence class is organized in a partial order graph with a linear execution order. For example, in the preferred embodiment, the ANI maintains one or more node objects, called SMFDefinitionPONode objects, in a data structure having the form of a directed acyclic graph. Each SMFDefinitionPONode object stores a name and a set of SMFDefinitionPONode objects. The name is the category of the node. Pre-conditions are category names and category name patterns. The set of SMFDefinitionPONode objects identifies successors of the SMFDefinitionPONode object. Each successor represents a module that must be executed after the module identified by the name.

Also preferably, the partial order mechanism provides methods by which SMFDefinitionPONode objects may be inserted into or removed from a tree of SMFDefinitionPONode objects.

Each Unit value 208 identifies an object type that is to be used by the current Service Module Function 76a when that module is to be executed. For example, a Unit method 208 may return the value "Topology", which indicates that current Service Module Function 76*a* operates on objects of type "Topology". Also, in the preferred embodiment, each Service Module Function 76*a* contains a isAllRequired value 1210 that is a Boolean value TRUE or FALSE depending on whether the Service Module Function operates on a single object of its Unit type or all objects of its Unit type. For example, if a Service Module Function operates with the information of a single device, then isAllRequired value 1210 for that Service Module Function would be FALSE.

Thus, each PreCondition method 1204 and TimeBase value 1202 defines a location in a partial order of execution of the Service Module Function. Before a Service Module Function can be executed, it must be placed in its proper position in the partial order and a complete ordering must be generated. A Service Module Function is then executed depending upon the schedule of its timeBase (on a periodic schedule, at fixed times, or on demand)

In the preferred embodiment, during system start-up, all Service Module Functions are examined by the partial order mechanism. Based on the partial order information provided in the TimeBase value 1202 and PreCondition value the partial order mechanism constructs a memory representation of the partial order of execution of all the Service Module Functions.

FIG. 2D is a diagram of a preferred memory representation, structured as a directed acyclic graph 1220. Each node 1222–230 of the graph 1220 is a SMFDefinitionPONode object. Each node 1222–230 represents a Service Module Function. The structure of the graph 1220 represents the pre-conditional relationships of the Service Module Functions. For example, node 1226 and node 1232 both have node 1234 as a pre-condition. Node 1234, node 1236, and node 1238 are all preconditions to execution of node 1230. Nodes 1240, 1238, and 1236 are all preconditions of node 1224. The graph 1220 is constructed by scanning each Service Module Function and examining each TimeBase value 1202 and PreCondition value. Based on these values, an SMFDefinitionPONode object is instantiated and inserted into graph 1220 using an appropriate insert method.

All graphs 1220 have a root node 1230. A root node is not a pre-condition of any node and has no preconditions. The root node serves as a starting point for the graph. A node "a" is at "layer n" just in case there are "n" nodes between the root of the partial order tree and node "a". A node "a" is "higher in the partial order tree than" a node "b" just in case "a" is on layer k and "b" is on layer "j" and "k" is less than "j" numerically. "layerSet n" in the partial order tree is the set of all nodes whose layer is n. The depth of a partial order tree is the value "n" which is the index of the layerSet none of whose nodes has successors.

Figure 2G:
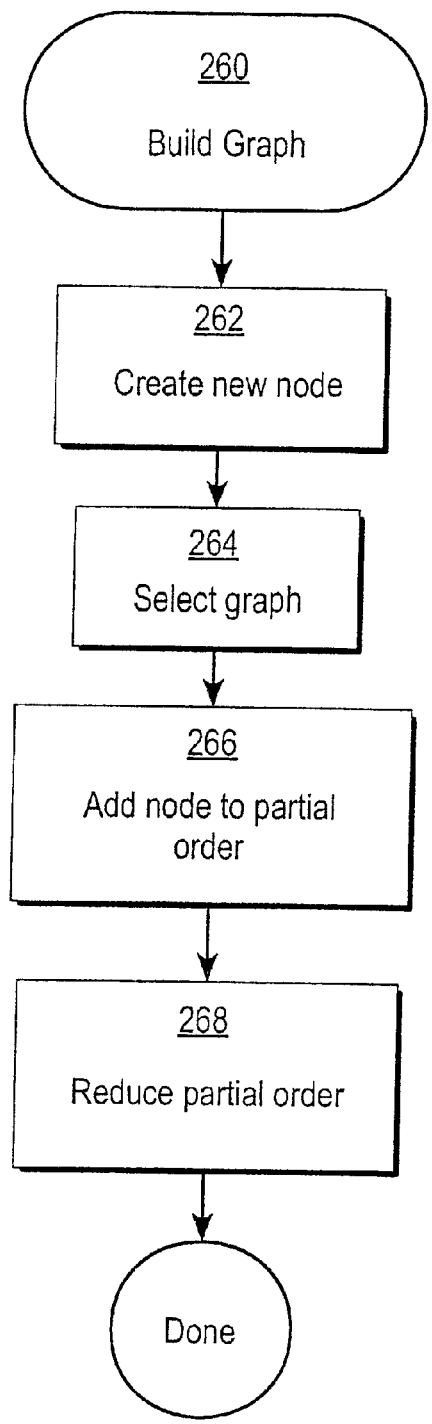

FIG. 2G is a flow diagram of an exemplary method for building the graph. In block 262, a new node is created. In block 264, the graph into which the new node is to be inserted is selected, based on the TimeBase value. There are two phases of insertion: adding nodes to the partial order; and reducing the partial order, as indicated by block 266 and block 268, respectively.

Figure 2H:
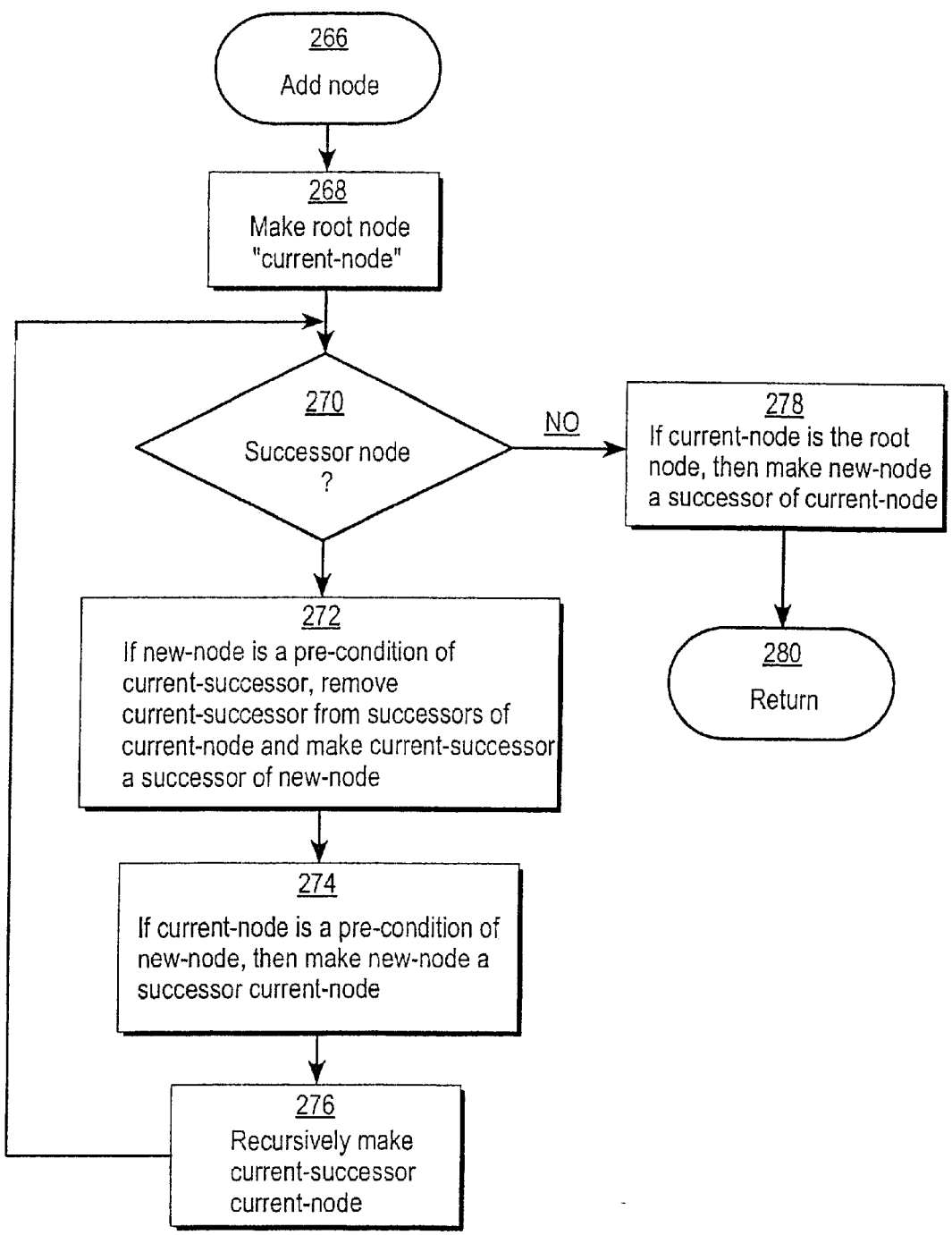

FIG. 2H is a flow diagram of an exemplary method for adding a new node called "new-node" to the partial order tree. In block 268, the root node is made as the "current-node". In block 270, each of the successors of the current-node is examined in turn, making them "current-successor" in turn. When there are no more successors, control passes to the step of block 278 that is described below.

As indicated in block 272, if the new-node is a precondition of the current-successor node, then the current-successor node is removed from the set of successors of current-node, and current-successor is made a successor of new-node.

As shown by block 274, if the current-node is a precondition of the new-node, then the new-node is made a successor of the current-node.

As shown by block 276, the next step is to recursively make current-successor current-node and proceed with the step of block 270.

When all successors have been processed, the test of block 270 is false, and control passes to block 278. There, if the current-node is the root node, then new-node is made a successor of current-node. In block 280, the process is complete and a return occurs.

Cleaning up the tree proceeds as follows. First, all nodes of the partial order tree are unmarked. Next, the process proceeds through all layerSets of the partial order tree, one layer at a time, marking each node of the layerSet with the node of which it is a successor. For example, at the end of this phase node 1224 will be marked with node 1238 or node 1236. Since node 1238 and node 1236 are equivalent because they are in the same layerSet, it does not matter which has node 1224 as its successor. The process then proceeds through all layerSets of the partial order tree, one layer at a time, removing from each "current-node" successor set any "successor-node" of a "current-node" whose mark is not "current-node". For example, at the end of this phase, node 1240's successor set will no longer contain node 1224; node 1238's successor set will contain node 1224.

Then, if the root node has more than one successor, the tree is not well formed; otherwise it is well formed and cleaned.

After the partial order tree for a given timeBase has been cleaned, the linear order of execution of the Service Module Functions of the tree is computed. Because the structure of a partial order tree does not change after it has been initially built, it is permissible to construct the linear order as soon as the tree has been cleaned. The linear order preserves the pre-condition constraints but guarantees nothing about any other ordering of execution. For example, when the partial order graph 1220 is linearized, the following will be true: node 1238 will be earlier in the order than any of node 1222, node 1224, node 1226, or node 1232; nothing is said about the position of node 1238 with respect to nodes 1236 or 234—node 1238 could be before, between, or after nodes 1236 and 234.

Linearization is done as follows. First, the node-number is initialized to zero ("0"). Then, the process traverses each layerSet, starting with layerSet 0 and proceeding to layerSet n in which n is the depth of the partial order tree. For each node in the current layerSet, the current node-number is assigned, and the node number is incremented after each assignment. For example, if there are seven nodes in the current layerset and the current value of the node-number is "11" then the first node is assigned number "11"; the next is assigned "12"; and so forth until the last node of this layer set is assigned the number "16".

Thereafter, the linearized order of the nodes of the partial order tree is the order that results from selecting the nodes in the order of their node numbers.

In the preferred embodiment, the timeBase execution mechanism is carried out at several different times during execution of ANI, as indicated by the TimeBase values. For example, ANI periodically carries out a general discovery of all devices in the managed network 100, and a linearized order evaluation is carried out upon such discovery. The name of the TimeBase that carries out discovery is Discovery and it is a periodic timeBase. Generally, the periodic general discovery is carried out every 30 minutes. Also, ANI periodically carries out a "major sweep" operation. For example, several times during a day at fixed times, ANI "sweeps" the managed network 100 to retrieve information that identifies users, hosts, and other networking information. Each time a "sweep" is performed, the Service Module Functions are invoked in linearized order. For example, in one embodiment, there are two timeBases which carry out "sweeps": MajorSweep which is a fixed time base typically set to run at 10:00 AM and 2:00 PM; MinorSweep which is a periodic time base typically set to run at an interval of 10 minutes. Further, ANI provides demand operations in response to unscheduled, non-periodic requests. For example, certain applications, such as the VLAN Director application commercially available from Cisco Systems, Inc., explicitly change the configuration of devices. When such explicit changes are performed, a Demand type timeBase is used and its linearized execution is performed as in block 636 of FIG. 6D. In the preferred embodiment, a separate graph 1220 is maintained for each of TimeBase.

At each of these times, the linearized execution mechanism is carried out. In an embodiment, a linearized evaluator is invoked and is passed a set of things to evaluate and a partial order tree of service module functions that are to be applied to the sets. In the preferred embodiment, a partial order execution method EvalGroup is executed and is passed an object representing a graph 1220.

6. Persistent Object Storage

In the following discussion, the use of persistent object storage mechanisms in various ANI 50 mechanisms is described, and then the internal operation of the persistent object mechanisms is described.

In the preferred embodiment, each programmatic object and its contents that are used in Service Modules 54 and the other mechanisms described herein may be stored persistently in the database 60. Also in the preferred embodiment, each programmatic object is a JAVA® language object A single declarative mechanism is provided that permits all definitions of internal to external mappings to be specified as part of the class to be stored itself. The mechanism automatically schedules the loading and storing of information to and from the external database without intervention by the programmer.

In a preferred embodiment, the mechanism has five (5) components:

1. A metadata definition that describes all aspects of the persistent data, including table definitions, constraint definitions, notification definitions and a revision history that defines upgrades from version to version.
2. A Write Object method that provides a mapping between the elements of program objects and the columns of the database table that are declared in the metadata definition.
3. A Read Object method that provides a mapping between the columns of the database table that are declared in the metadata definition and the elements of program objects.
4. A Resolve method that binds a first object to other objects of the system that are referenced as elements of the first object, or from which the first object inherits properties and behavior.
5. A set of state-setting methods that enable objects to be marked for deletion and updating.

Each component is defined using a semi-declarative mechanism. In this context, "semi-declarative mechanism" means that each component comprises program structures that consist almost exclusively of method calls that construct static or dynamic data structures.

Preferably, the mechanism operates in conjunction with a primary store and a secondary store. The secondary store is a direct mirror or backup of the primary store rather than an extension thereof. In this context, "extension" means that not all objects are in the primary store, and the secondary store is queried when an object is not available in the primary store. In contrast, in the preferred embodiment there are no requests for objects from the secondary after an initial load. When a request for an object is made, the primary store is accessed only. When primary store is changed, secondary store is automatically update to ensure that it is synchronized with primary store. A partial order is specified for updating the secondary store in which foreign key constraints of the secondary store are preserved. When the secondary store is to be updated, a closure operation is carried out before the secondary store is modified. In particular, all modified objects referenced by a first object must be included in any update to the first object. The identity of objects referenced by a first object is stored in the metadata definition.

Generally, it is preferred to use main memory of a computer system as the primary store and a database stored in a persistent storage device as the secondary store. The database is, for example, SQL Anywhere, the Sybase® SQL Server, or an Oracle® relational database system. However, a specific database is not required as the secondary store; any other data storage mechanism is suitable. The reader is presumed to be familiar with structures, functions, and terminology relating to relational database systems, such as tables, stored procedures, indexes, triggers, and referential constraints. The database 60 implements these structures and functions and responds to statements issued in the Structured Query Language (SQL).

6.1 PERSISTENT OBJECTS

In the preferred embodiment, a Persistent Object class is the root class of all persistently stored objects. In one embodiment, all classes in an application program that require persistent storage in the database must inherit from the class PersistentObject. The behavior of Persistent Objects is defined in the class PersistentObject. In particular, the class makes use of metadata definitions. Therefore, every persistent object must define metadata that is used to manage it. In an alternate embodiment, a class that uses persistent storage inherits persistence behavior from a plurality of classes that implement components of persistence behavior.

Figure 7A:
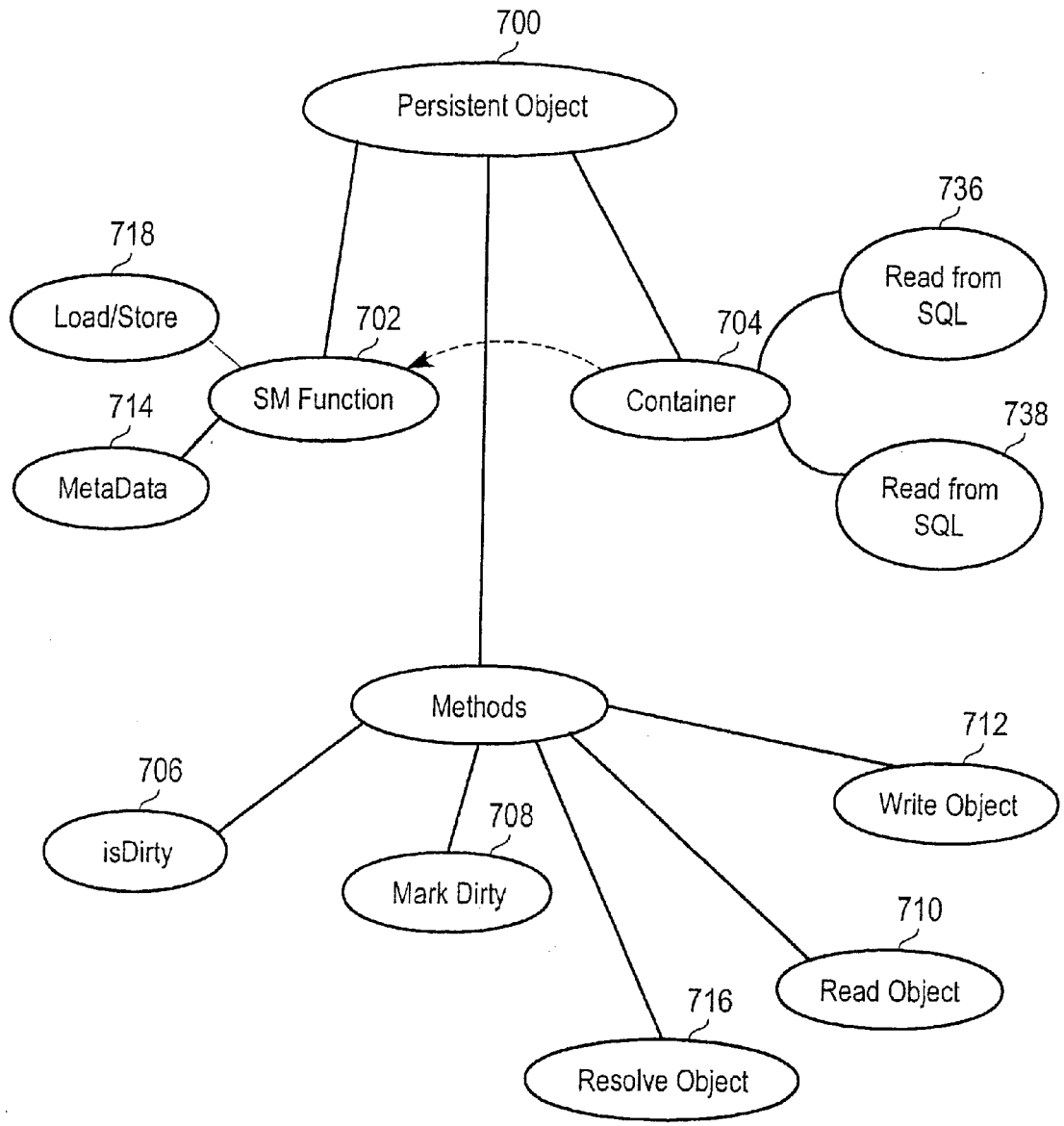
FIG. 7A is a block diagram of relationships among a persistent object and related objects.

For example, to store an object persistently in the ANI 50, a programmer configures an object to inherit properties of the Persistent Object class. FIG. 7A is a diagram of a Persistent Object class 700 and its relationships to other elements of the ANI 50. The Persistent Object class 700 is a superclass of a Service Module Function (SMFunction) class 702 and of the Container class 704 and other support classes. The Persistent Object class 700 contains methods Dirty 706, markDirty 708, writeObject 712, and readObject 710.

Preferably, in the ANI 50, one or more Persistent Objects are integrated with the Service Module Functions 76a–76n. In particular, the writer of a Service Module Function 76a–76n configures the Service Module Function object or helper object to declare its metadata as a POMetaData object 715. When each Service Module Function 76a–76n sets values of persistent data objects, it invokes the markDirty method 708 to indicate that the values of the objects have changed. Each Persistent Object 80 has a metaData( ) method 714 that returns the POMetaData object 715, and implements a writeObject method 712 and readObject method 712 to write and read the persistent data.

In the preferred embodiment, the Dirty method 706 returns a Boolean value. The Boolean value is TRUE when the persistent data in the object has changed since the last load or store operation, and FALSE when persistent data in the object has not changed since the last load or store.

The Mark Dirty method 708 sets an object's "dirty" state to TRUE, indicating that persistent data in this class has changed. Preferably, in each persistent object, a Dirty instance variable indicates the current state of the object's persistent data objects. When object values are initially loaded from the database, each associated persistent object is marked "clean" by setting Dirty FALSE. Similarly, when the persistent data objects are stored to the database, the persistent object is also marked "clean".

The "dirty" state determines whether to actually store the contents of an object to the database 60 when the Write Object method 712 is invoked for that object. In the preferred embodiment, when it is time to update secondary storage all objects which were marked dirty are written to the database 60.

Persistent Objects operate within a set of constraints. The data of a subclass of the PersistentObject class are stored in a single table, if they are stored at all. If an object is a hierarchy of subclasses of PersistentObject, then each of the intermediate classes stores its data in a table specific to that class. Thus, although an object may be stored in several tables, a class only stores its data in a single table. If there is an object that stores its data is several tables, then identity of the stored object is the highest class in the hierarchy below the PersistentObject class that stores data. That identity, which is a unique object identifier, is stored in each of the tables storing the object with each row of those tables comprising the object's data. This relationship is automatically determined by the Persistent Object method at runtime.

Preferably, the mechanism includes other methods for marking the state of an object in the database and in association with each object. The possible states of each object are NEVER WRITTEN; MODIFIED ("dirty"); TO BE DELETED; and TRANSIENT. In this context, "Transient" means that an object is created and exists in main memory, but is not stored in the database.

6.2 DATABASE SCHEMA

FIG. 7F is a block diagram of inter-related persistent objects in a hierarchical relationship. An LS1010VLADInterface object class 774 is declared in ANI to represent a port of an LS1010 device. The LS1010VLADInterface object class 774 inherits from VLADPort class 772, which represents ports for the purposes of a VLANDirector application. The VLADPort class 772 inherits from a VLADInterface class 770 that generically represents device interfaces for the purposes of the VLANDirector application.

FIG. 7G is a block diagram of a portion of a schema of tables in database 60 used in the persistent object storage mechanisms. Each class 770, 772, 774 is associated with a table 776, 778, 780 of the database 60. Each table 776–780 stores data values of an object instantiated from the class associated with that table. For example, a first table 776 named "WBULS1010Port" stores data values for objects of class LS1010VLADInterface. A second table 778 named "WBUPort" stores data values for objects of class VLADPort. A third table 780 named "WBUInterface" stores data for objects of class VLADInterface.

Each row of the tables 776–780 stores information identifying an object instance and its class, and values of fields of the object. In particular, each table 776–780 has columns that store an object identifier and a class identifier. An object identifier, called a DBID, uniquely identifies an instance of an object used by the ANI 50 at any time during its execution. A class identifier, called a Class DBID, uniquely identifies a class existing in the system. For example, the WBULS1010Port table 776 has a DBID column 782 and a Class DBID column 784. The WBUPort table 778 has a DBID column 788 and a Class DBID column 790. The WBUInterface table 780 has a DBID column 794 and a Class DBID column 796.

Each table also has one or more columns that store object data. For example, the WBULS1010Port table 776 has a plurality of data columns 785, each of which stores a value of a particular field of an object instance. The data columns 785 may store scalar values, such as integers, strings, and floats, in which case the actual data value is stored in the column, and the type of the column matches the type of data stored therein. Alternatively, the data columns 785 may store references to other objects, in which case the data columns are of type DBID.

Each table stores data only for instances of the class with which it is associated. Accordingly, data of an object instantiated from a class having more than one superclass, of which more than one class definition includes persistent object metadata, is stored in multiple tables. For example, class LS1010VLADInterface 774 inherits from two parent classes, as shown in FIG. 7F. Row 798 of table 780, row 792 of table 778, and row 786 of table 776 each represent data for the same instance of class LS1010VLADInterface 774 when it is stored in the database 60. Each of rows 798, 792, and 786 has a DBID value "89" stored in its DBID column, which indicates that the rows hold data for the same instance. However, table 780 stores only data for fields of the LS1010VLADInterface object that are defined by class VLADInterface. Table 778 stores only data for fields of the LS1010VLADInterface object that are defined by class VLADPort. Table 774 stores only data for fields of the LS1010VLADInterface object that are defined by class LS1010VLADInterface.

Thus, a key aspect of the preferred embodiment is that hierarchical objects are decomposed into component parts, and the data that comprises the object is stored without redundancy in class-specific tables. This is a unique contribution to the management of objects into a secondary store.

Each of rows 798, 792, and 786 also stores the same Class DBID value, "46", in its Class DBID column. A Class Table 1700 maps Class DBID values to classpaths. As shown in FIG. 7G, the Class Table 1700 has a Class DBID column 1702 that stores Class DBID values. Corresponding classpaths are stored in a classpath column 1704. Using the Class Table 1700, ANI 50 can locate a class definition based on a Class DBID value. The term "classpath" is used in the customary sense of the JAVA® language. The Class Table contributes to extensibility of the system, because new classes can be supported by adding new rows for the new classes added to the Class Table.

In the preferred embodiment, the Class Table 1700 is dynamically built during execution of the WriteToSQL method. When WriteObject executes, it obtains the appropriate class list dbId for the class of the object being written. If no such dbId exists, a new ClassList object is created for this class and its dbId is used.

Preferably, the ClassList object itself is stored in the database 60 as a persistent object. Special bootstrap methods handle creation of ClassList instances at system startup time and when new ClassList instances are created.

6.2 PERSISTENT OBJECT METADATA

Each persistent object 80 uses the persistent storage mechanism based on a metadata description 714, a set of data accessor methods, and data base load and store methods 718. The metadata description, accessor methods, and load and store methods are declared in persistent object, or inherited by it.

To store and load persistent data using the database 60, a class must create metadata. The metadata describes all aspects of the persistent data, including table definitions, constraint definitions, notification definitions and a revision history that defines upgrades from version to version. The metadata defines the structure of data stored in the external database. In particular, the metadata defines relationships between fields of an object class and columns of tables in the database; thus, the metadata definition defines the table structure used by a class. The rationale of the metadata definition is that it is important for each class to contain all information needed to instantiate the class in the database, including the metadata that the database requires.

Information in the metadata definition is used, among other things, to ensure the consistency of the secondary store, and to create for insertion or update, rows, and to create the data necessary to read from a table; it also defines references to other objects. During the load process, metadata declarations for all persistent object classes are analyzed and an error check analysis is carried out. The analysis is done statically, and the result is maintained within the ANI 50 for reference throughout the load and store process. During this analysis internal consistency is verified.

Figure 7B:
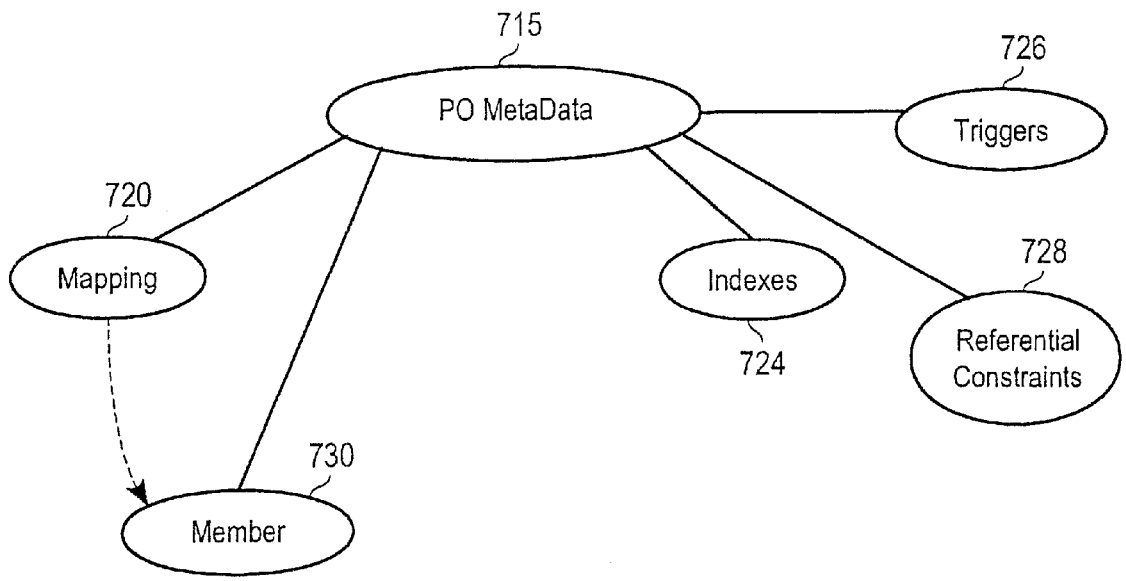
FIG. 7B is a diagram of a metadata object for use in conjunction with a persistent object.

In the preferred embodiment, as shown in FIG. 7B, a POMetaData object 715 comprises a mapping 720, indexes 724, triggers 726, and referential constraints 728. In addition, the class must provide a Metadata method 714 that returns the POMetadata object 715. The Metadata method 714 is supplied by the programmer who prepares one or more persistent objects 80. A Persistent Object that takes part in an inheritance hierarchy and stores data other than that stored by the inherited classes must also implement metadata, which enables the ANI 50 to keep track of the necessary tables and data attributes that are written.

The mapping 720 correlates class's persistent objects to database items. The block labeled Indexes 724 is a list of the indexes required by this class. The block labeled Triggers 726 is a list of the triggers required by this class. The block labeled Referential constraints 728 is a set of referential constraints applicable to the class.

In the preferred embodiment, the POMetaData object 715 is defined in the Frame work 210 of the ANI 50. The POMetaData object has helper objects called POMember, POStoredProcedure, POIndex, POTrigger and POConstraints that respectively implement mapping 720, indexes 724, triggers 726, and referential constraints 728.

Preferably, a POMetaData object 715 also identifies a table of the database 60 that its Persistent Object data is stored to and loaded from. In the preferred embodiment, a Persistent Object creates a POMetaData object 715 to operate on a specific table by issuing a method call having the form:

POMetaData myMetaData=new POMetaData (<className>, <tableName>);

in which <className> is the name of the persistent object class, and <tableName> is the name of a table of the database 60. When a POMetaData object 715 is instantiated, code in the Persistent Object class 700 creates empty instances of each of its helper objects and defines the local table name. The Persistent Object class 700 then populates the POMetaData object 715 as described below.

Mapping 720 describes how to store and retrieve a persistent object's persistent data, by defining a POMember object 730 in the POMetaData object 715. In the preferred embodiment, the Mapping 720 is invoked using one of several methods generally of the form myMetaData.addMember(<columnName>, <dataType>, <comment>);

in which <columnName> is the name of a database column, <dataType> is the type of the data of the object that is to be stored in the database 60, and <comment> is a comment. Thus, the Mapping 720 maps persistent instance objects to columns in tables of the database 60. In the database 60, each persistent object has a table. Each row of the table represents an object instance. Each column of the table represents a data type of the object or an element of the object's abstract data type.

To indicate a referential constraint between a column of one table and a column of another table in the database 60, a persistent object class adds a constraint clause to the referential constraints 728 of a POMetadata object 715. In the preferred embodiment, an addConstraint method is called using a function call of the form myMetaData.addConstraint(<foreignTable>, <foreignColumn>, <localColumn>, <comment>);

in which <foreignTable> is a table associated with a foreign key constraint, <foreignColumn> is a column of that table associated with the foreign key constraint, <localColumn> is the constrained column, and <comment> is a user-supplied comment. The addConstraint adds this information to referential constraints 728 and associates it with referential constraint information in the database 60.

In similar manner, stored procedures list 722, indexes 724, and triggers 726 are specified using method calls respectively having the form myMetaData.addStoredProcedure(<procedureName>, <procedureBodyDefinition>);

myMetaData.addIndex(<indexName>, <indexDefinition>);

myMetaData.addTrigger(<triggerName>, <triggerDefinition>);

For example, a class VLAD declares a static variable VLADInterfaceMetadata of type POMetaData. The declaration includes a name, such as "W BUInterface," of the table of database 60 into which data for instances of this class will be stored. Thus, the POMetaData object defines the table structure that will be used by the VLADInterface class to store its data. This enables the class itself to contain all information needed to instantiate itself and set up the table. Further, VLADInterfaceMetadata declares the table size, primary key constraints, definitions for scalar columns, comments, and references to other objects.

Preferably, the Persistent Object class 700 has a method that integrates metadata 714 for all classes into the database 60. In an embodiment, an IntegrateMetadata method examines all metadata from all objects and verifies that the database has the appropriate tables for each object. If not, appropriate tables are created. In the preferred embodiment, IntegrateMetadata is called with a database connection and an exemplar persistent object as parameters. The IntegrateMetadata method verifies that the database connection is valid. It then extracts metadata from the persistent object parameter, by calling its POMetadata method. The IntegrateMetadata method then reads, from database 60, the database metadata that corresponds to the table name returned by the POMetadata method. The database 60 is self-describing and can return metadata describing itself. The IntegrateMetadata method compares the database metadata to the object metadata and searches for corresponding columns in the POMetadata object column descriptions. The IntegrateMetadata method also compares and checks the column types and lengths to ensure that they match. Errors are raised if non-matches occur. A complementary check is then carried out; columns that the persistent object class requires are compared to the database. If a column is missing, it is added.

6.3 ACCESSOR METHODS

In general, fields of persistent objects in a class cannot be read, written, or otherwise accessed in a public fashion by other program elements or processes. Accordingly, each the Persistent Object class 700 includes accessor methods that (a) receive data values read from the data base and set the corresponding instance object values and (b) get instance object values and deliver them for storage in the data base. In the preferred embodiment, the accessor methods are the readObject method 710, writeObject method 712, and resolveObject method 716. The accessor methods are respectively called using method calls of the following form:

public Object readObject (String table, HashMap hm)
   public void writeObject (HashMap hm)
   public void resolveObject (String table, Object obj)

A Persistent Object can store persistent data in only one table of the database 60 at most. The table and the columns in that table are identified in the object's metadata 714, specifically in the mapping 720 and member object 730. A mapping between columns of tables in database 60 and instance objects is performed by the writeObject method 712 and readObject method 710. A writer of a persistent object prepares methods 710, 712. Each of the writeObject method 712 and readObject method 710 is passed a HashMap containing one or more key, value pairs. Each key comprises a column name for a column in the database 60, and an object value.

When the writeObject method 712 is invoked for a persistent object, the persistent object adds its field values to the HashMap with the corresponding column in the data base table as the key. When the readObject method 710 is invoked for a particular object, the PersistentObject class creates the HashMap with column name, value pairs for the data read from the database.

Every persistent object must implement a Write Object method 712. The Write Object method 712 provides a mapping between the current values of elements of objects, and columns of a database table that are declared in a persistent object metadata definition. In particular, the Write Object method 712 provides a way for an application program to write fields of an object class to the database, without explicit intervention by a programmer. Preferably, the output of the Write Object method 712 is a modification of a data structure that is passed into it. The particular data structure used to implement the mapping is not critical. In the preferred embodiment, the data structure is a HashMap comprising one or more pairs of the form (column name, value).

The Write Object method 712 is used recursively. If a class that implements the Write Object method 712 inherits from a containing object that is also persistent, for which there is another Write Object implementation, then an invocation of Write Object will cause it to call super and pass control to its superclass. Data of the superclass will be added along with appropriate labels into the mapping. Thus, a single call to Write Object for an object having inheritance causes all parent objects to provide their data.

An example of a writeObject( ) method is shown in Table 1, and an example of a complete Service Module Function including persistent objects is presented in an Appendix to this document.

TABLE 1

EXAMPLE OF WRITEOBJECT METHOD

```
public void writeObject (HashMap hm) {
    /* get current values of objects prior to data base store */
    hm.add ("WbuTable1:colName1", object1);
    ...
    hm.add ("WbuTable1:colNameN", objectN);
    super.writeObject (hm);
}
```

The Read Object method 710 provides a mapping between the columns of the database table that are declared in persistent object metadata 714 and fields or elements of objects. In particular, the ReadObject method provides a way for an application program to restore the state of an object class from the database 60, without explicit intervention by a programmer of the application program. The ReadObject method is used when data has been received from the database 60 and is ready to be put into fields of an object that will use it.

In a preferred embodiment, a Read Object method 710 tests the table name passed to it, to determine whether it matches the table that the method deals with. If not, control is passed up to a parent object using the super operation. This operation is carried out, for example, when several tables carry data for an object having several inheritance relationships or multiple superclasses.

TABLE 2

EXAMPLE OF READOBJECT METHOD

```
public void readObject (String table, HashMap hm) {
    /* set new object values */
    if (table.equals(myTable) {
        Object1 = (Object1Type) hm.get("colName1"):
        ...
        ObjectN = (ObjectNType) hm.get("colNameN");
    } else {
        super.readObject(hm);
    }
}
```

The ANI data model is loaded at system startup using the static populateDataModel method of PersistentObject. populateDataModel reads rows from the database. As each row is read, its ClassDbId is read and the class of the object for which the read row provides data is determined. At the same time, the dbId of the row is read. If an object of the proper class with the needed dbId has already been created, then that object is used for further processing. If no such object has already been created, then it is created and used for further processing. In particular, it is this object to which the Read Object method is sent with its corresponding table name and HashMap. Alternatively, objects may be read on demand using the mechanisms described here.

The Resolve Object method 716 resolves references from objects to other objects. In particular, the Resolve method provides a way for an application program to restore the inter-object state of multiple application program objects based upon the database 60, without explicit intervention by a programmer of the application program. In this context, "resolve" means that for a particular object, all dependent objects and relationships have been read from the database and stored in memory, but have not been connected or bound to other objects, nor have references been resolved.

The need for a reference resolution method will become apparent from considering the process of absorbing object data in a read operation carried out at startup or initialization of ANI 50. Scalar objects, such as strings, integers, and floats, are easily absorbed, as they are complete in themselves. References to other objects require further work. When an object table, such as table 776, contains an object reference in one of its data columns 785, the object reference is a DBID stored in the form of a 32-bit integer or 64-bit integer. Such a DBID cannot be converted into an object reference in the ReadObject method, because at system startup time it is unknown whether the referenced object has been instantiated. No order of object loading is defined. Further, circular references are possible and can't be resolved at the ReadObject stage.

The Resolve Object method 716 resolves the object references. In the preferred embodiment, the Resolve Object method 716 is called at system startup after the populateDataModel method 732 has completed execution. At that time, the entire data model has been read, and all objects are available. Therefore, resolution can be done.

Preferably, each Read Object method 710 has a method that creates objects that hold contextual information about objects being read, for resolution later. In the preferred embodiment, a Read Object method 710 creates a resolveArray object. The ResolveObject method 716 is passed a table and a resolveArray object. Functions are invoked to translate the references. In particular, back pointers from a contained object to a containing object are found, by extracting the foreign key of the containing object, and issuing a findByDbId( ) method call. The findByDbId( ) method receives the foreign key value as a parameter, locates the object instance in the data model based on the key value, and stores the reference to the foreign object into the appropriate field of the object for which resolution is being performed.

6.4 DATABASE LOAD AND STORE

At system startup time, a metadata verification and update step is carried out in which the secondary store metadata is compared to the primary store metadata, and the secondary store metadata is updated if it does not match the primary store metadata. Following metadata verification and update, a series of read steps are carried out. In the read steps, the data model of an application program is populated by moving data from the database into corresponding program objects of the application program. This step re-establishes, in main memory, the state of the data as it existed before a system crash, program termination, or other action that resulted in restart. Preferably, the populating step is carried out by loading an entire database table into main memory; instantiating objects for each row of the table in main memory; and storing data from the database table in the objects.

In this way, the database operates as a backing store for main memory. In fact, the preferred embodiment will operate when the database is unavailable. In such a case, it is possible that environment-specific information acquired and stored in the database, and not available in memory, will be unavailable.

In the preferred embodiment, the startup phase involves calling ReadObject and ResolveObject methods. A star query is issued for each pertinent database table. In response, the database provides a set of result rows. For each row read, the class of the object to be instantiated for that row is determined by passing the ClassDbId of the row to the ClassList object. In order that the ClassList object instances are available during data model load, a special initial load phase is executed using a special bootstrap ClassList object.

For each row read, the ReadObject method is then called to cause the value of the mapping to be moved into the object instance. While this works for scalar values, it does not and cannot result in resolution of object references. It cannot resolve such object references because it is possible that a referenced object has not yet been read. Accordingly, while executing, populateDataModel builds a table that comprises pairs consisting of object references of instantiated objects, and context objects (such as the ResolveArrays previously discussed). For each table entry, the ResolveObject method is called with the column values as parameters.

Figure 7C:
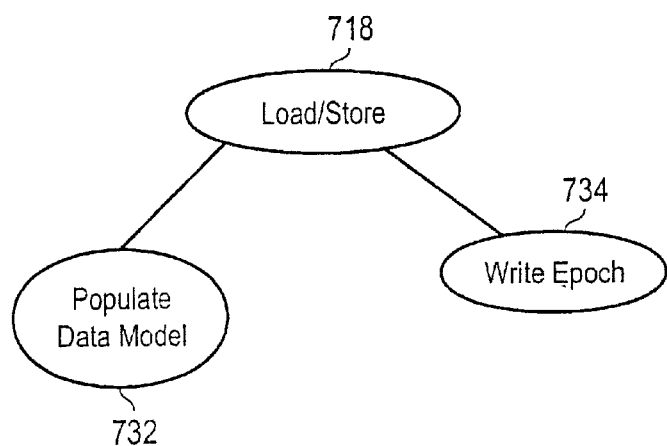
FIG. 7C is a diagram of load and store operations.

As shown in FIG. 7C, in the preferred embodiment, database load and store methods 718 comprise a populateDataModel method 732 and a writeEpoch method 734. The populateDataModel method 732 is invoked by the ANI 50 in the Initialize phase when the ANI restarts. The populateDataModel method 732 causes all data in the database 60 related to the ANI 50 to be loaded from the database into objects in main memory; it creates objects as appropriate; it calls Read Object to load the objects with values; and it calls the Resolve Object method 716 as needed to resolve object references. The Persistent Object class 700 has a method called AllPersistentObjects that returns a list of all classes that generate persistent data. Preferably, the order in which tables are read by PopulateDataModel is determined by the order of classes returned by AllPersistentObjects. Alternatively, a partial ordering mechanism is used. In the alternative, each class declares other classes on which it is dependent, resulting in a partial ordering of the classes. A partial order evaluator resolves the partial order into a final order.

As the populateDataModel method 732 reads each table, it computes a DBID value to use for subsequent instantiation of objects of the class represented by the table. In an embodiment, the populateDataModel method 732 acquires the current maximum DBID value in each table, increments it by one, and uses the incremented value as the next DBID. Preferably, a single stream of DBID values is maintained. Alternatively, a separate stream of DBID values is maintained for each table.

When the populateDataModel method 732 reads a row from a table, it cannot determine whether the row represents a complete object or an inherited component of a hierarchical object. To determine what class to instantiate, populateDataModel reads the Class List DBID from the row. The populateDataModel method 732 maps the Class List DBID to a classpath using the Class Table. The populateDataModel method 732 also reads the DBID from the row, and determines whether an object matching that DBID has been instantiated, by looking up the DBID in a mapping of objects and existing DBIDs. If none is found, then the populateDataModel 732 method instantiates an object of the class named in the classpath. The JAVA® language provides constructs that create an instance of an object based on a class path name. Otherwise, the existing object is used in subsequent operations.

The populateDataModel method 732 reads each data value of the row of the database table. It also reads metadata maintained by the database that describes the structure of the table, including its column names. It builds a HashMap comprising pairs of column names and values. The populateDataModel method 732 then sends a message to the ReadObject method of the object that was just instantiated, passing it the Class List DBID and the HashMap. The ReadObject method stores the values in the fields of the object.

The foregoing mechanism automatically handles classes having several inheritance levels or multiple superclasses. Consider an example using the LS1010VLADInterface class 774 of FIG. 7F and FIG. 7G. When row 798 of the WBUInterface table is read, the Class dbId value ("46") maps to the LS1010VLADInterface class 774. When the ReadObject message is sent to that class, the ReadObject method of the LS1010VLADInterface object executes, because that object matches the Class DBID. However, the ReadObject message is passed the name of the VLADInterface class table, "WBUInterface". The ReadObject method of the LS1010VLADInterface class declares "WBULS1010Port" as the table it handles. Thus, the LS1010VLADInterface ReadObject method will not recognize the table name "WBUInterface". Therefore, the LS1010VLADInterface ReadObject method carries out the "super" operation, storing no values in the object and forcing its parent class to populate the object.

The foregoing steps are repeated for each table, that is, for each PersistentObject subclass defined in the system.

When all rows of all tables have been handled as above, the populateDataModel method 732 then calls the ResolveObject method 716 for each row and object, thereby resolving any references to other objects in the data columns 785 of the table.

The writeEpoch method 734 is invoked when a major series of changes to information objects, called a change epoch, is completed. For example, after general device information discovery is completed using the Discovery partial ordering of Service Module Functions, all changes to data are stored to the database 60 by invoking the writeEpoch 734 method. Preferably, the persistent object mechanisms operate in a transactional environment in which data processing work is organized into discrete transactions. The writeEpoch method is called at transaction commit time to capture changes in the state of objects that occur within a transaction.

A set of objects to be written is passed to the writeEpoch method 734. The writeEpoch method 734 tests whether its object set is empty. If not, then a WriteToSQL method is invoked for each object in the set.

As shown in FIG. 7A, each Container object carries out database load and store operations using a Read From SQL method 736 and a Write To SQL method 738. The rationale is that a Container object acts as a container for itself and a group of Service Module Functions, each of which, or all of which, may have persistent data objects to be loaded from and stored to the database 60. It is efficient to handle database load and store operations for a complete set of persistent data that is defined by a group of Service Module Functions associated with a Container object 704. Accordingly, each Container object 704 has load and store methods readFromSQL( ) and writeToSQL( ).

Figure 7D:
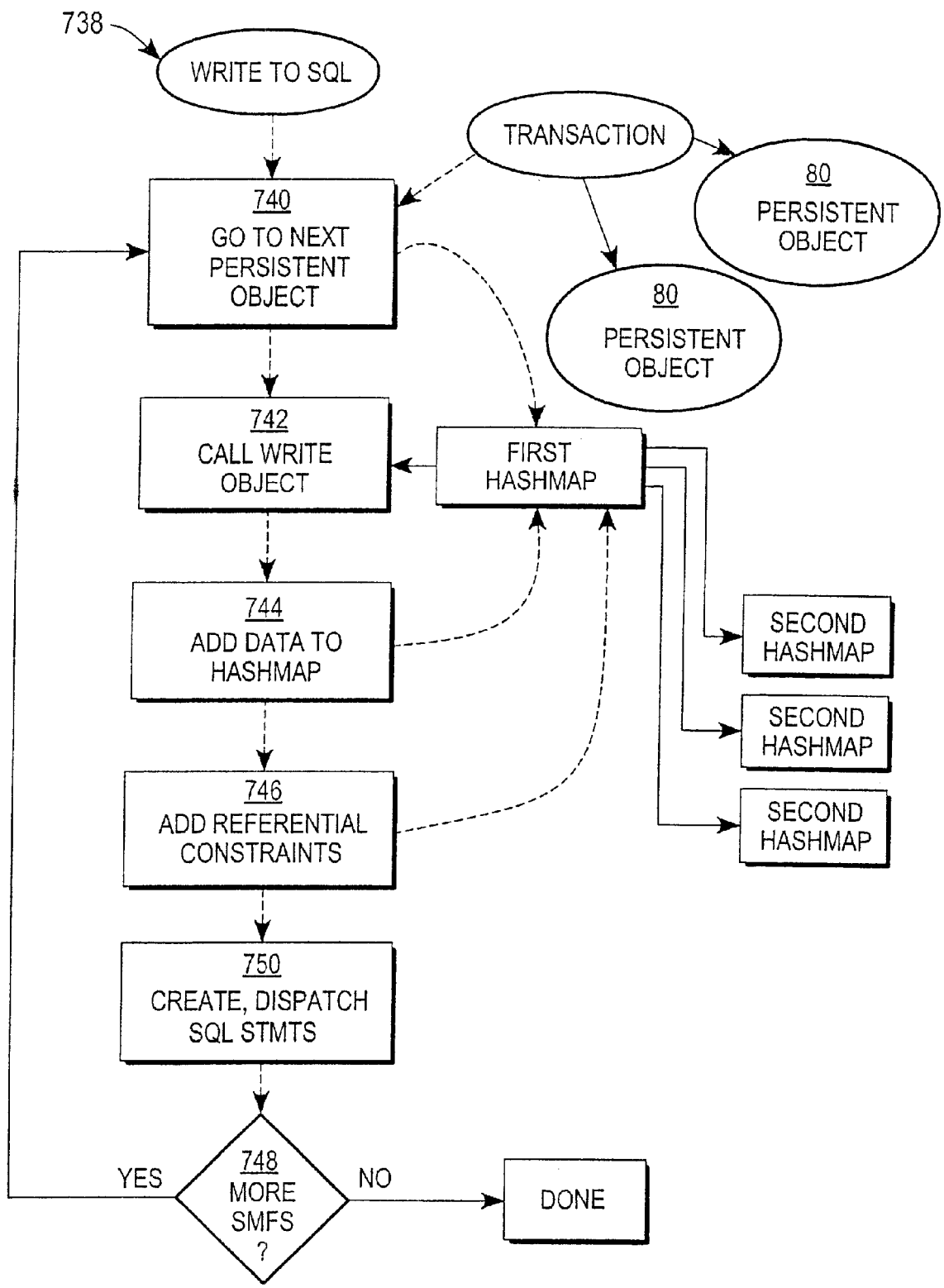
FIG. 7D is a flow diagram of a Write To SQL method.

FIG. 7D is a flow diagram of a preferred embodiment of a writeToSQL method 738. The writeToSQL method 738 deals with all objects, their hierarchy, and their tables in the database 60, and functions to insert new objects, deleting objects that have been marked for deletion, and updating objects.

As indicated by the loop formed by blocks 740 to 748, the writeToSQL method 738 steps through each of the Persistent Objects 80 associated with Transaction 506. For each PersistentObject, a call to the writeObject method 712 is made, and is passed a HashMap, as shown in block 742. In the preferred embodiment, in block 742 the writeObject method is called only when the object is not to be deleted.

During invocation of the Write Object method 712, each Persistent Object adds, to the HashMap, the data to be stored, in the manner described above in connection with the writeObject method 712. Preferably, block 744 involves, for each of the tables into which the object is to be stored, getting metadata of the object, and getting the data that was stored by the Write Object method 712.

As a result, after each Persistent Object 80 is handled, at block 750, a first HashMap containing a set of second HashMaps exists. The first HashMap contains entries consisting of a table name and a reference to a second HashMap, Each second HashMap is contains pairs in the form (column name, object value). Persistent data values are added to the appropriate second HashMaps. Additional second HashMaps are created if necessary. In block 746, referential constraint information is added to each HashMap where indicated by referential constraints 728 of the metadata object 715.

As shown in block 750, based on the information in the first and second HashMaps, one or more SQL statements are constructed and submitted to the database 60. The database 60 executes the SQL statements and updates the database accordingly. As a result, object information is persistently written to the database 60.

In the preferred embodiment, block 750 involves calling an InternalWriteToSQL method and passing it a second HashMap of column/data associations; a table name; the isDeleted flag indicating whether the object is to be deleted; a flag indicating whether the object is to be inserted; and a database connection. If the object is to be deleted, then the InternalWriteToSQL method builds a delete operation in the form of an SQL statement in the form "<primary key> DELETE FROM <table name> WHERE primary key name =DBID."

If the object is NOT to be deleted, the InternalWriteToSQL method tests whether the object is to be inserted. If so, InternalWriteToSQL creates a DBID value and a class DBID value. In both cases, InternalWriteToSQL then steps through the columns of the object that were provided by the WriteObject method in the HashMap structure, and converts each column to an externally representable data type. Preferably, the conversion is carried out by calling a conversion method in the Member method 730.

If the type of column is a Reference to another object, then InternalWriteToSQL retrieves the DBID of the referenced object. The InternalWriteToSQL method then constructs an SQL statement for database UPDATE or INSERT, including appropriate column names or sets and a primary key value. The SQL statement is executed against the database 60.

InternalWwriteToSQL is called as above for each second HashMap.

Figure 7E:
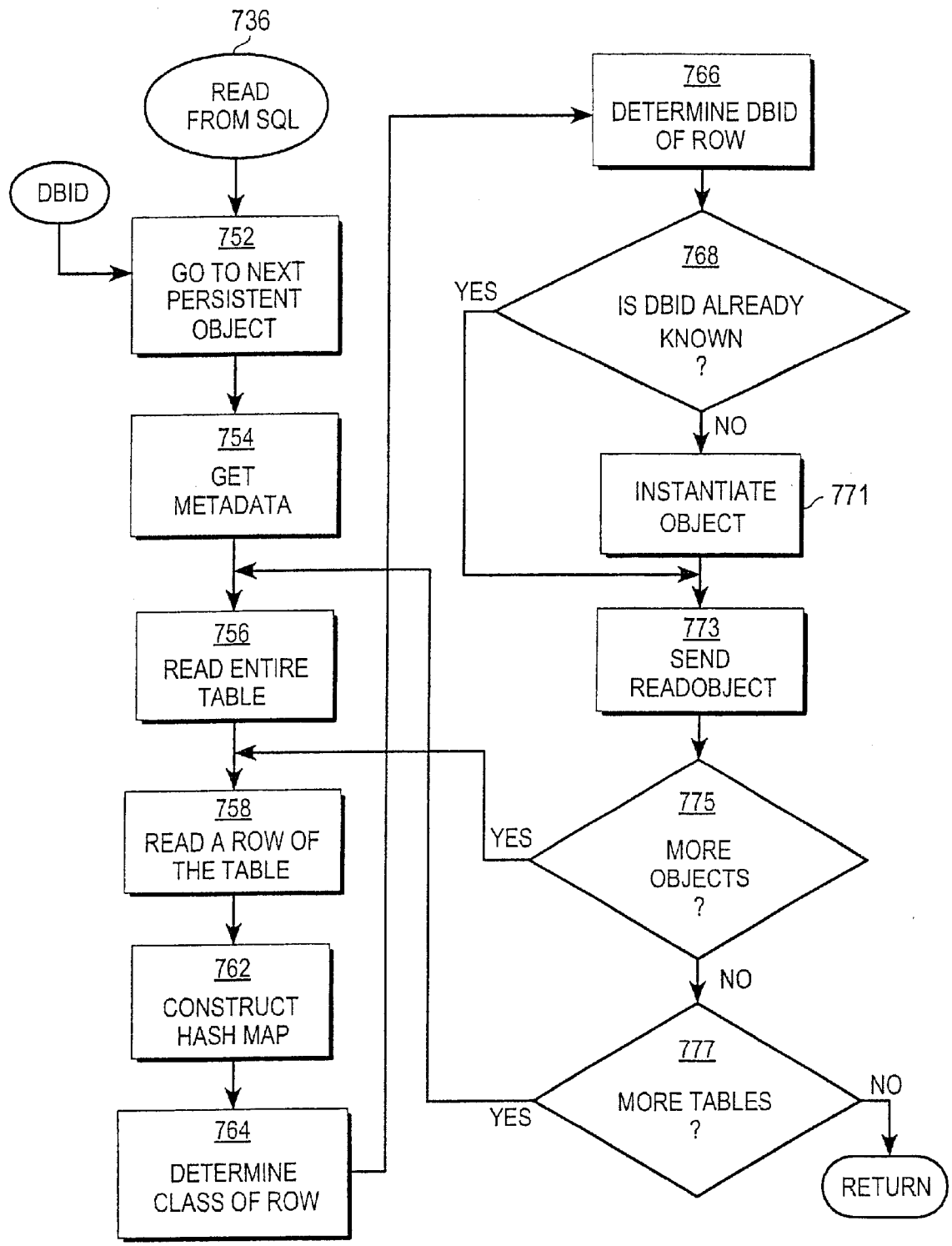
FIG. 7E is a flow diagram of a Read From SQL method.
Figure 8A:
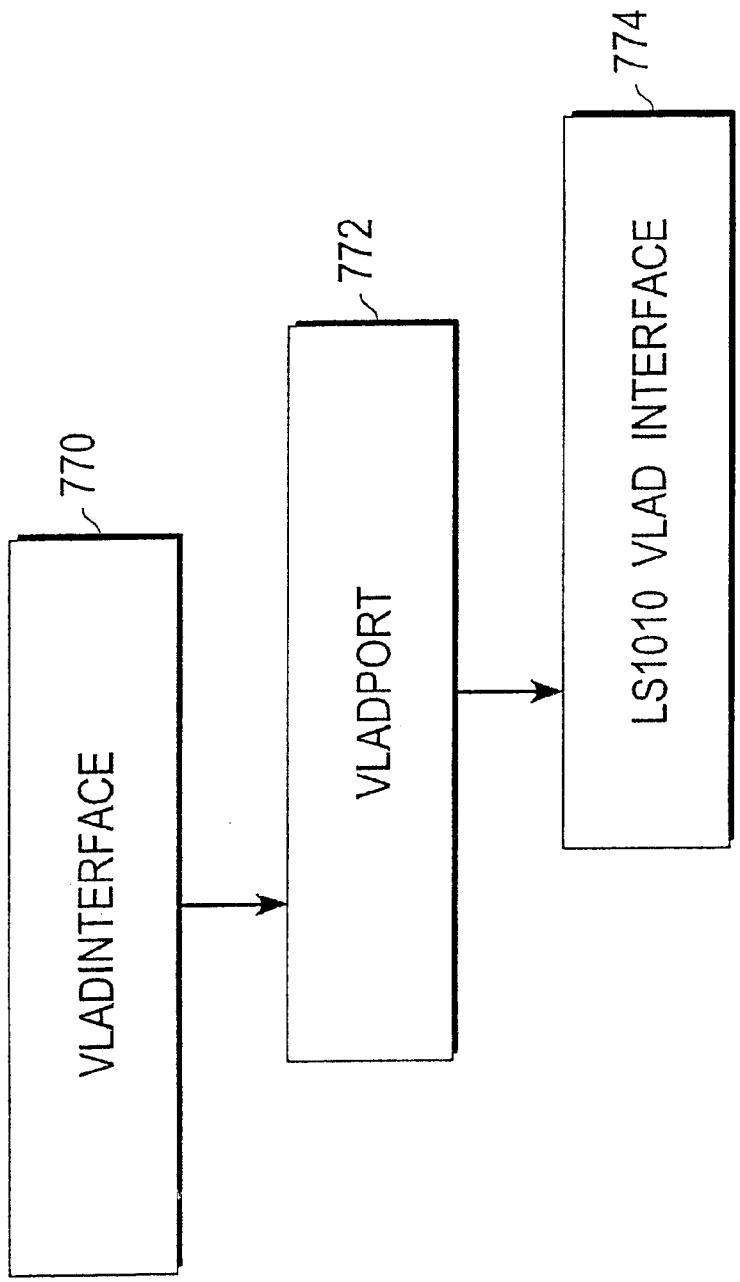
FIG. 8A is a block diagram of objects with an inheritance relationship.
Figure 8B:
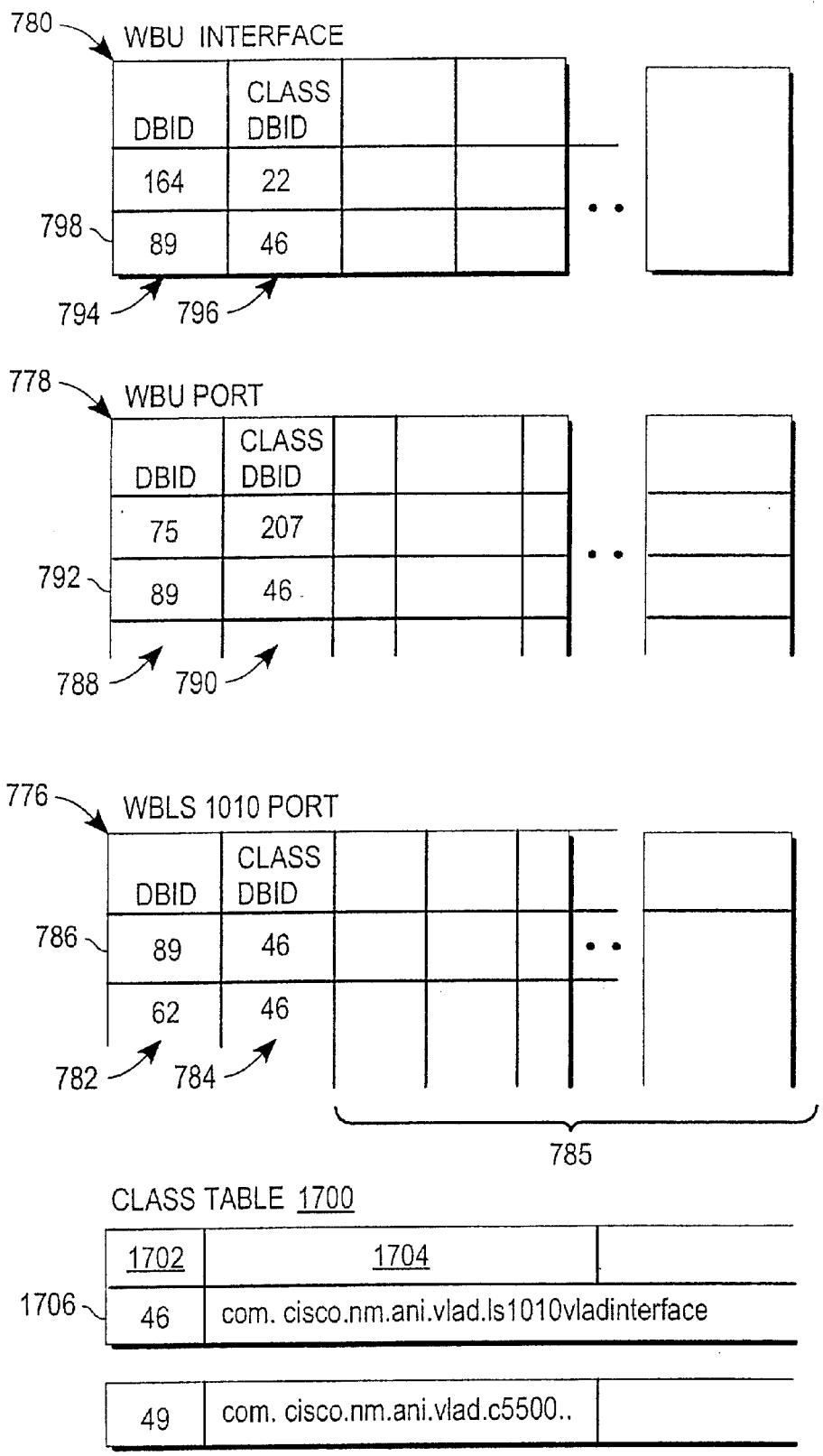
FIG. 8B is a block diagram of a database schema.

FIG. 7E is a flow diagram of a preferred embodiment of the readFromSQL method 736 that carries out database load operations. ReadFromSQL is invoked to read a complete table from the database. The tables are read in order according to their interdependence. Their interdependence is determined via pre-conditions stated per table and established via a partial order computation. Each time ReadFromSQL is invoked, it reads all rows from the table it is given to read from.

As shown by block 754, the process reads metadata defining the table from the database. The process then initiates a complete read of the entire table, as shown by block 756. In one embodiment, the read operation is carried out using an SQL statement similar to the following: "SELECT*FROM <tableToBeRead>"

In a loop formed by blocks 758 to 775, the process reads each row, as shown by block 758. In block 762, using the metadata obtained in block 754, the process constructs a HashMap including column names and values from the row read. In block 764, the class of the row that was read is determined. Preferably, a special field, ClassList, is read which determines the class of the row read. In block 766, a unique identifier associated with the row is determined. In the preferred embodiment, the process reads a special field determined by the metadata of the class determined in block 764. The field contains the unique identifier (dbId) of the row, thereby determining the dbId of the row.

In block 768, the process tests whether the dbId is already known to the system. In the preferred embodiment, a HashMap associated with the class hierarchy of the current class is examined to determine if the dbId is already known. If so, then the process uses the object associated with this dbId in subsequent processing. If the current dbId is unknown, then in block 771, the process instantiates an object having a type matching the class determined in block 764.

In block 773, the method readObject is sent to the instance obtained through the test of block 768. The method invocation includes, as parameters, the name of the table from which the data was taken, and the HashMap containing the column/value pairs prepared in block 762. A side effect of the execution of the readObject method is the conditional creation of an object that may be used later in the resolve phase of the data load.

As shown by block 775, the process tests whether other objects need to be read from the table. If so, control is passed to block 758. Thus, the process iterates the loop until there are no more objects to be read from this table. Similarly, the test of block 777 involves iterating the invocation of readFromSQL for all tables in the database.

After all objects are created as above, any necessary inter-object connections are established. This is accomplished by sending each created object the method resolveObject, including as parameters the conditionally created object of block 773 above.

6.5 SUPPORTED DATA TYPES

In the preferred embodiment, an object of any data type may be designated as a field of a persistent object and stored in the database 60.

In an alternate embodiment, constraints are placed on the types of objects that can be supported as fields of persistent data. For example, in one embodiment, all primitive data types, except "byte" and "short", are supported but are communicated to and from the accessor methods in class wrappers. For example, variables of type "int" are stored in a class named "Integer." This limitation is imposed because of limitations in certain of the implementation technologies used. In particular, HashMaps cannot store primitive, unwrapped data types.

For example, to store an integer and a float variable, an application programmer includes the following code in a Service Module:

int i;
  float f;
  . . .
  hm.add ("columnI", (new Integer(i));
  hm.add ("columnF", (new Float(f));
  . . .

To load these variables, the application programmer places the following code in the Service Module:

int i;
  float f;
  . . .
  i=((Integer) hm.get("columnI")).intValue( );

f=((Float) hm.get("columnF")).floatValue( );
  . . .

6.6 PERSISTENT OBJECT EXAMPLE

In the example Service Module Function set forth in Appendix 1 to this document, a Service Module Function named SMF1 has three items of persistent data, namely integer iii, String sss, and float rrr, which are maintained in the database table "Devices".

7. Parallel Processing

In the preferred embodiment, the ANI 50 has a mechanism that supports parallel execution of processes. The mechanism has three main purposes. First, the mechanism provides a standard way to establish and cause execution of an algorithm on large numbers of distinct sets of data, in parallel. The algorithm is independently initiated and run on each set of data. Second, the mechanism provides a way to carry out parallel execution of dynamically composed algorithms, i.e., blocks of code described by a partial order and having an execution order determined at runtime. Third, the mechanism provides for interaction of the dynamically composed algorithms, executing in parallel, with a database of information that is stored in the form of persistent objects. In this context, "execution of an algorithm on large numbers of distinct sets of data, in parallel" generally means, but is not limited to, connecting to large numbers of network devices 102, gathering data from them independently and in parallel, and at appropriate times running a Service Module Function separately or in parallel with respect to the data.

The mechanism provides several advantages over normal coding. For example, consider a network managed by a network management system that uses Service Module Functions to execute information services on managed devices. It is known that when executing Service Module Function that involves communicating to the devices, the function must often wait while the external devices complete some other function. Running several Service Module Functions or their sub-functions in parallel for these external connection operations permits the functions to take advantage of the waits. For example, one thread can run when another is waiting. Another advantage is the mechanism takes advantage of environments with multiple processors by running functions in parallel on the multiple processors. Therefore, effective time to do a computation is reduced. Use of parallel processing is appropriate, for example, when there are changes to be made to several devices in order to service the command's requirements. For example, a Service Module Function that adds ports of several devices to a VLAN is an appropriate request for parallel processing.

Generally, the parallel processing mechanism provides for determination of an execution order of components of the processes; execution join points at which the parallelism is stopped until parallel execution is again required; and a mechanism by which write access to common objects can be accomplished. Preferably, the parallel processing mechanism comprises three elements. First, there are declarations in code that comprises the components of the processes and that are organized at runtime by a partial order determination mechanism. The declarations identify a parallel processing thread. Second, there is an execution initiation element that initiates execution of the processes periodically, on a fixed schedule, or on demand. Third, there is an execution manager subsystem that manages actual execution of the processes.

FIG. 5A is a block diagram of a preferred embodiment of a parallel processing mechanism. An instance of a parallel execution is established by an EvalGroup class instance 502 that receives, as parameters, a member set 504, a transaction 506, and an evaluation sequence 508, each of which are now described.

The elements of the mechanism carry out parallel processing with respect to one or more sets of execution members. Member set 504 is an ordered set of information that describes "members" of the parallel execution. In this context, "member" refers to a discrete Unit type data set 510a–510c, such as a set of information from a device 102 in a network 100 that is managed using a network management system by a management I/O system. Thus, each member is a candidate data set over which execution can proceed independently.

Members that are identified in member set 504 may have one or more types. Possible types include but are not limited to: "Device" indicating that the member defines properties of a device; "Change" indicating that the member defines changes which may be applied to some system component such as Vlans or Devices; "Topology" indicating that the member defines properties of connections among, for example, devices.

Transaction 506 is a transaction context for the parallel execution. Parallel processing is preferably carried out in a transactional context as follows. A transaction is created or initiated. Parallel processing is carried out. The transaction is then committed and terminated. Use of transaction 506 is preferred to handle changes to the objects to be modified by the Service Module Functions. The use of transactions results in capture of changes, as well as synchronization of independent groups of threads. Preferably, transactions 506 operate under control of a transaction processing mechanism 511 that is described elsewhere herein. In that mechanism, changes made by one thread group do not affect changes made by another thread group. Other transaction context mechanisms are suitable and can be used.

Evaluation sequence 508 is a partial order or meta-description that defines an order of execution of code blocks of a thread. In the preferred embodiment, the evaluation sequence 508 is declared or stored in a Partial Order object and is passed as a parameter to the EvalGroup 502. Preferably, evaluation sequence 508 is an ordered set of Service Module Functions organized into a timeBase oriented fully processed Partial Ordering. Each member of the ordered set identifies a code module or Service Module Function. Associated with the TimeBase value defines when the parallel execution should occur. A partial order evaluator 509 evaluates the partial order, resulting in a final execution order of the Service Module Functions, when parallel execution occurs.

In the preferred embodiment, the combination of a transaction processing mechanism 511 and a persistent object storage mechanism 516 provides a mechanism for tracking changes made to objects in a network management system. The persistent object storage mechanism 516 manages movement of data to and from a persistent object database 60 and the EvalGroup 502. The transaction processing mechanism described herein, and the persistent object storage mechanism described herein, are suitable, but others can be used.

In the preferred embodiment, an execution initiation mechanism 514 initiates parallel execution of a group of processing threads 520. Preferably, a predefined number of threads and queues are established when the ANI 50 is started up; the predefined number is not critical. EvalGroup 502 establishes the relationship between threads of a certain priority and of a certain number, and the parallel evaluation request made represented by the member, transaction, and partial order evaluation sequence. The partial order is then evaluated, and threads are dispatched to evaluate segments of the partial order as appropriate. In one embodiment, the execution initiation mechanism 514 causes such initiation to occur either periodically, on a fixed schedule, or on demand.

The execution manager subsystem or EvalGroup 502 is an object, defined by one or more methods in an object-oriented programming language, that represents a process that is executing in parallel with other processes. An application program running under control of the ANI 50 creates an EvalGroup 502 in one of two ways. In the first approach, an EvalGroup 502 is created by a declaration in the application program having the following format:

EvalGroup(transaction, members, evalsequence)

In this declaration, the parameter "transaction" refers to a previously created transaction object representing a transaction context for the parallel execution identified by the EvalGroup object, for example, transaction 506. The parameter "members" refers to an object that describes one or more data sets to which a process will be applied, for example, member set 504. The parameter "evalSequence" is an object that specifies a partial order of execution of the components of the process. For example, the EvalSequence508 defines a partial order of execution for a plurality of Service Module Functions 512a–512d.

In the first approach, the partial order is evaluated using default "apply" functions of the Service Module Function. In both the first and second approaches, Service Module Functions are evaluated as appropriate for the members passed in. That is, either one Service Module Function instance per SMFContainer, or one instance of the Service Module Function for all members, is evaluated. It is the responsibility of the Service Module Function to know that it is invoked for a single member or for all members.

Figure 5B:
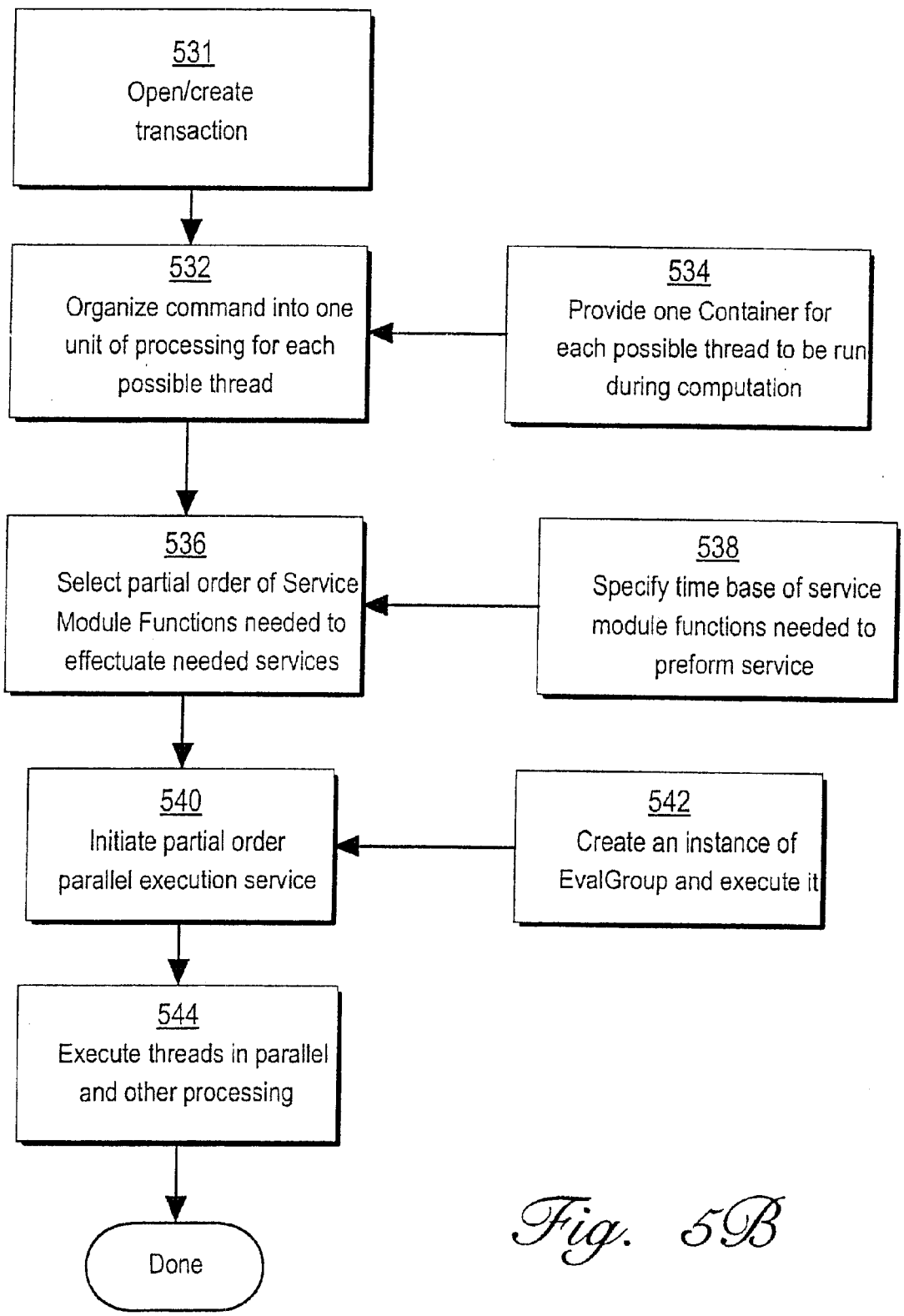
FIG. 5B is a flow diagram of a method of parallel processing.
Figure 56:
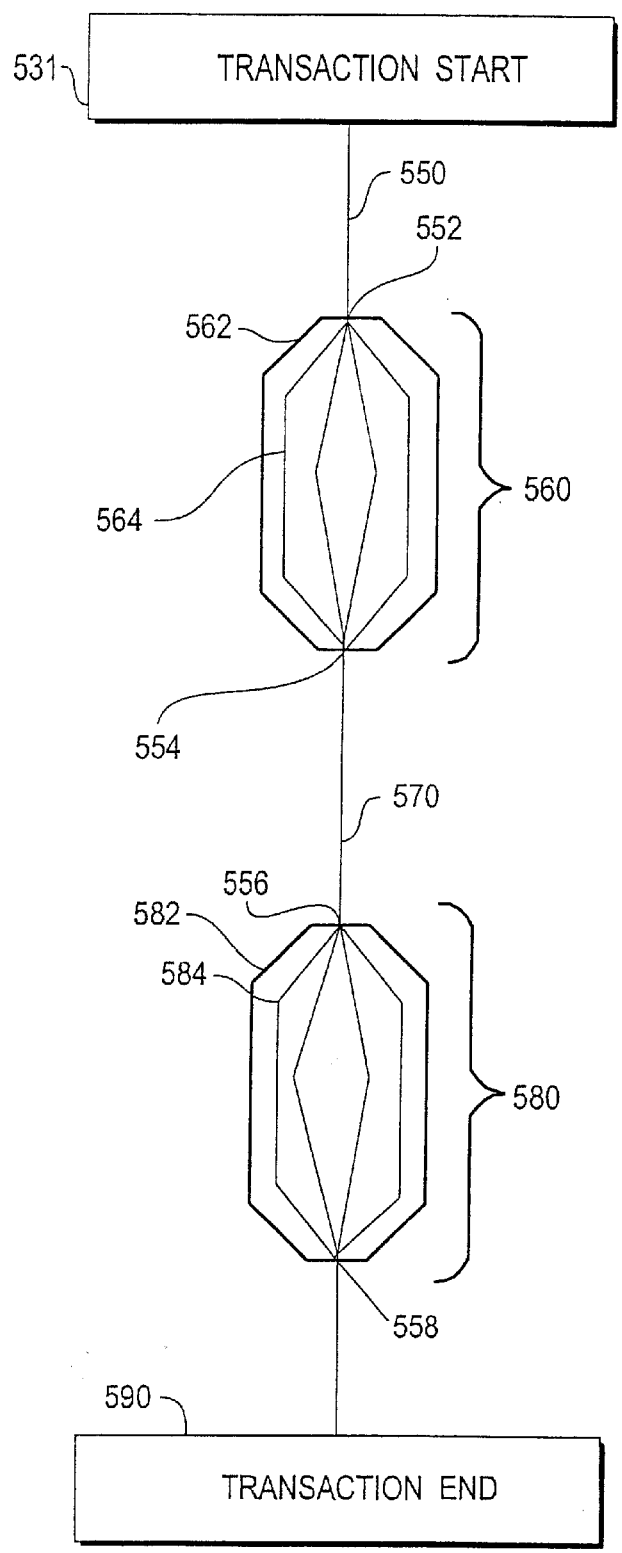

FIG. 5B is a flow diagram of preferred steps involved in parallel thread processing of functions of a Service Module according to the first approach. The steps of FIG. 5B are carried out when computation that is undertaken which requires parallel execution as initiated by one of the possible timeBase initiation techniques (periodic, fixed, demand).

As shown by block 531, a transaction is opened. In one embodiment, block 531 involves explicitly creating or initiating a transaction. In an alternate embodiment, block 531 involves determining whether a transaction currently exists, and creating or initiating a new transaction if none currently exists.

As shown in block 532, a command of the Service Module is organized into several units of processing, one for each possible thread. The organization is accomplished by providing one Container object for each possible thread to be run during the computation, as shown in block 534. Each Container represents a member to which parallel execution is applied, such as unit type data groups 510d–510f. Each Unit type data group 510d–510f is associated with a different data set of some unit type.

In block 536, the timeBase providing the partial order of Service Module Functions needed to effectuate the needed services is selected. As shown in block 538, the configuration or selection is accomplished by specifying the time base of the service module functions needed to perform the service. In block 540, the partial order parallel execution service is initiated. In an embodiment, block 540 involves creating an instance of an EvalGroup object and executing it, as shown in block 542. The creation and use of EvalGroup objects is described elsewhere herein.

In block 544, threads are executed in parallel performing the requested evaluations of the selected timeBase functions. FIG. 5C is a graphical representation of an example of the execution paths of parallel threads during block 544. Block 531 represents the start of a transaction as indicated by block 531 of FIG. 5B. Initially (though not necessarily) a single function or thread 553 executes. When the processing encounters a Service Module Function in the linearized partial order that can execute in parallel, at point 552, several threads 562, 564 execute in parallel. Threads 562, 564 represent parallel execution of an algorithm or set of functions over different sets of data that are obtained, for example, from different devices. The threads 562, 564 occur in a first parallel execution frame 560.

At a later point in time, parallel execution ends at a join point 554. Thereafter, a single thread 570 executes. Later in the execution of the parallel process, a Service Module Function is encountered in the linearized partial order which can execute in parallel, at point 556, parallel execution of threads 582, 584 occurs during a second parallel execution frame 580 until parallel execution terminates at another join point 558. The transaction ends at block 590.

Single tread execution may proceed through several Service Module Functions, each of which must execute in a single thread 550 and 570 (allIsRequired ==TRUE). Such SMFunctions execute in a single thread because they need access to all members over which the evaluation is proceeding, for example, when computing the topology of a network. Multiple threads executing in parallel are permitted to run when one or more SMFunctions indicate that they can run in parallel (allIsRequired==FALSE). For example, multiple threads can run in parallel when a discovery timeBase is gathering data from devices 102 of a network 100. It is appropriate to run in parallel in this case because the SMFunctions must wait for responses from devices 102 to the requests that the SMFunctions make of the devices.

FIG. 5C represents only one exemplary hypothetical case of parallel execution. Any number of threads may branch and converge at any number of join points. There may be more than one join point. Further, members or data sets may be dynamically created as a result of execution and added to the members of an plurality of members or EvalGroup.

In the preferred embodiment, one or more sequences of execution are conditioned on the type of member that is being evaluated. When the execution order of a particular function is determined, operations are organized by member type. In this way, all operations for members of a particular type are executed at one time, followed by operations for a member of another type. For example, all operations relating to Devices are carried out first, in parallel for all Devices in the managed network, and then all operations relating to Topology are carried out in parallel as appropriate.

In an alternate approach, the execution manager subsystem receives an additional "phase" parameter. The value of the phase parameter identifies one of five standard execution phases identified in FIG. 9 (ACQUIRE, SET, VERIFY, INTEGRATE, ROLLBACK ON FAILURE).

Figure 9:
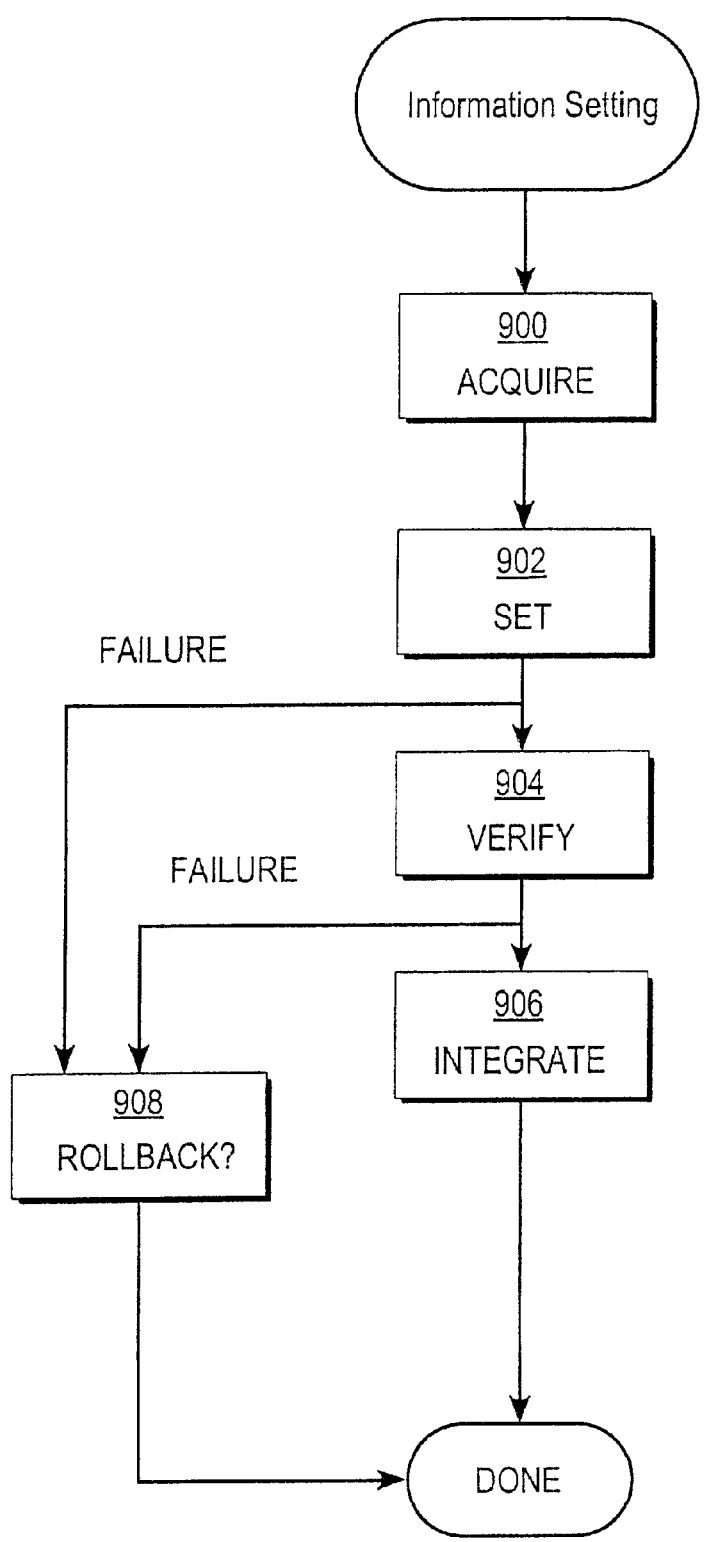
FIG. 9 is a flow diagram of an information setting protocol.

The execution phases are five conceptual phases of operation of a Service Module Function. FIG. 9 is a flow diagram of the preferred five phases. Block 900 represents the Acquire phase. The Acquire phrase involves acquiring the current state of the network object that a Service Module is about to change. The Set phase of block 902 involves changing the state of the network object to the value it is to take. The Verify phrase of block 904 involves re-acquiring the state of the network object and verifying that its value is what it was set to be. The Integrate phase 906 involves integrating the changes made to the network object into the data model.

In Rollback phase 908, if the attempted change fails, the Service Module restores the value of changed network components to the values they have before the operation began. Execution of the foregoing five phases preferably is implemented in a Service Module using the method performEvaluation.

The execution manager subsystem passes the value of the phase parameter through to the service module functions 510d–510f that are executed as part of a dynamic execution sequence. The service module functions 510d–510f are thereby able to conform their behavior or functions to the current execution phase.

In a preferred embodiment of this approach, an EvalGroup 502 is created by a function call of the form EvalGroup eg=EvalGroup(transaction, members, evalSequence); and evoked eg.apply(action);

in which "action" is a value representing the current execution phase. Each time the EvalGroup 502 is executed, the phase parameter value is passed to the apply method of the EvalGroup object. In the preferred embodiment, the phase parameter is called the SMFSetting value. The EvalGroup object then performs the same sequencing of joins and parallel executions as in the first case of parallel execution, with the addition that the method invoked for each of the Service Module Functions executed is determined by the SMFSetting value. Thus, each of the phases is a complete EvalGroup process that may involve multiple objects. The relationship of SMFSetting value to invoked method is as follows:

| PHASE | INVOKED METHOD |
| --- | --- |
| Acquire | acquire(SMFContainer mo) |
| Set | set(SMFContainer mo) |
| Verify | verify(SMFContainer mo) |
| Integrate | integrate(SMFContainer mo) |
| Rollback on Error | rollback(SMFContainer mo) |

Thus, use of the phase parameter enables each service module function to carry out its operations in a way that is compatible with the current phase. Advantageously, external code is not required to check the current phase and modify the behavior of the service module functions.

For example, if the current execution phase were ROLLBACK ON FAILURE, a service module function 510d–510f would act to undo the effects of the SET phase of the computation. This would be done to ensure stability of the devices the face of failure. In contrast, if the phase value were "ACQUIRE", the service module functions 510d–510f would proceed to acquire initial state of the objects they are dealing with (as part of a general model of set).

A general example of the use of EvalGroup is given in the source code of the method ServiceModule.performEvaluation provided in APPENDIX 2. This method implements the five-part setting model. It uses the second form of EvalGroup so that it can select the kind of function being performed."

In another alternate embodiment, an additional parameter is a value representing the resources available to carry out parallel execution. By adjusting the value of the resources parameter, an application program can establish the amount of possible parallelism.

8. Service Modules 8.1 STRUCTURE AND FUNCTIONS

Generally, one or more Service Modules 54a–54n contain and organize substantive functions of the ANI 50. Application programs use Service Modules 54a–54n to execute services provided by the ANI 50. Each service module 54a–54n defines an API, data model, database and abstract functions that implement services.

The service modules 54 are introduced into the ANI 50 using the properties files 56. A new service module is created by an application programmer when a new service is added to the ANI 50. At system start-up, the current configuration of ANI 50 is determined through the definitions provided in the properties files 56, the Service Module Function lists in the Service Modules and metadata contained in each Service Module Function. The properties file provides for each Service Module a unique service module token to service module map that provides the FrontEnd subsystem 200 with a mapping between requests generated by clients to Service Module Functions.

Preferably, a service module 54a derives from the Service Module Frame work 210 and FrontEnd subsystem 200. In the preferred embodiment, each service module within the service modules 54 is defined as a JAVA® package. In an embodiment, the package prefix is cisco.nm.ani.framework, and the service modules extend the class cisco.nm.ani.framework.ServiceModule. Each service module functions according to the request/reply processing described below in the section entitled Interprocess Communications.

As shown in FIG. 2B, each Service Module 54a–54n comprises a Service Module Identification 72, a Service Module IDL 74, a list of one or more Service Module Functions 76a–76n, Persistent Objects 80, and helper classes 82. Each Service Module further comprises mechanisms that carry out ORB services 84, request registration methods 86, and request processing mechanism 88.

The Service Module Identification 72 consists of a token 72a, a package 72b, a classpath 72c, and a class file name 72d of a file containing the class definition. The Service Module token 72a is used by clients to attach to an instance of a service module 54a. By convention, in the preferred embodiment, Service Module tokens 72a are four-character capitalized alphabetic strings. "Core", "Vlad", and "Lane" are examples of Service Module tokens. The Service Module package 72b is a program package, such as a JAVA® package, in which all classes implementing the service module reside. The Service Module classpath 72c is the JAVA® classpath of the service module. Preferably, all service module classpaths have the following form:

com.cisco.nm.ani.<serviceModuleTokenInLowerCase> in which <serviceModuleTokenInLowercase> is the service module token with no uppercase letters. For example, the classpath for the Lane service module is com.cisco.nm.ani.lane.

The Service Module class file name 72d has the form

<serviceModuleToken>ServiceModule in which <serviceModuleToken> is the Service Module token including its exact capitalization. In one embodiment, observing proper capitalization is important, because when a service module is instantiated for a client, the name created is the concatenation of the Service Module token with the keyword "ServiceModule". For example, the name of the Lane service module is LaneServiceModule.

The Service Module IDL 74 defines interfaces to a service module 54a and thereby provides a command syntax. In the preferred embodiment, the Service Module IDL 74 is expressed in the Interface Definition Language (IDL) and is compatible with the Common Object Request Broker Architecture (CORBA). The Service Module IDL 74 is stored in a file which is conventionally called Ani<SMToken>Module.idl, in which <SMToken> is the service module token name. The Service Module IDL 74 may contain any interface definitions needed by a service module 54a.

In the preferred embodiment, each Service Module IDL 74 has an instance variable that returns result sets. Also preferably, each Service Module IDL 74 has a query mechanism that supports returning result set data for queries into the service module 54a. For example, a Service Module IDL has a general handler for queries, which dispatches to a particular query class that returns specific data.

Each Service Module 54a–54n is associated with one or more Service Module Functions 76a–76n, and comprises one or more Persistent Objects and helper classes. Using these mechanisms, Service Modules 54a–54n make use of parallelism, persistent storage, and device adaptation in connection with other ANI sub-systems. For example, parallelism is supported by the EvalGroup method that is described further herein. Persistent storage is supported by the Persistent Object mechanism described herein. Device adaptation is supported by Container objects and Device Mappers.

The Service Module Functions 76a–76n may cause changes to be made to information in the database 60 relating to managed devices 102 in the network 100 or any other data. The ANI 50 provides a mechanism to ensure consistent change to persistent device information and any other persistent information. In an embodiment, all Service Module Functions 76a–76n that perform information-setting functions extend a class SettingSMFunction. Generally, such Service Module Functions implement the interface com.cisco.nm.ani.framework.ChangeIf to carry the set of changes and state that they are to perform.

In the preferred embodiment, each Service Module communicates, to the ANI 50, its Service Module Function list 76 using a method SMFunctions, which returns an array of strings. Each string is the class path of a Service Module Function 76a–76n. At startup, the ANI 50 instantiates each Service Module Function 76a–76n, registering it for device mapping and for any persistent storage operations it or its helper objects may require.

Each Service Module can communicate to the ANI 50 a list of persistent objects 80. Persistent objects 80 are classes that are used to provide persistent storage, and which are not Service Module Functions. Preferably, each Service Module has a method persistentObjectList, which returns an array of strings, in which each string is a classpath of a helper class 82. At startup, ANI instantiates each helper class 82, registering it for persistent storage operations it may require.

Each service module has an interface class that provides ORB services 84. Generally, each ORB interface class implements interfaces that identify the method and object that invokes the ORB interface. In the preferred embodiment, an interface class AniServiceControlIf provides an interface to set client information, and AniUserContextIf provides interface to acquire client information.

Each interface defined in the Service Module IDL 74 has a corresponding method defined in the ORB services 84. The corresponding method provides the functions of requestor authentication, service module instantiation, and service invocation. The requestor authentication function involves calling methods that create a Request Registry entry. As a side effect, the Request Registry entry validates the user's permission to execute the requested service function over the objects the user is requesting service for if any.

For each service request that actually requires the use of a Service Module 54, an instance of the Service Module is created. After the instance is created, the method that implements the desired service is invoked. Generally, services that require no data model manipulation are provided directly in the ORB service 84. Services that require data model access are generally performed in the service module itself. The service module instance runs on the thread of the requestor until it completes. When the instance completes its work, it returns to the requestor. The service function may be complete at that time, or the service function may proceed asynchronously to the requestor's processing.

The requestor registration methods 86 involve verifying that a requesting client is authorized to invoke a particular service of the Service Module 54a. When a client connects to a Service Module, the client passes login information, as described elsewhere herein. The Service Module invokes a Registry.request method and passes it parameters. If service is denied for any reason, an exception occurs. Authentication checking is performed in the ORB interface module implementation of the method interface, as described above. A typical prefix to a method of this kind is as follows:

RegistryEntry request=Registry.request(reqId, getClient( ), getLoginInfo( ), <ServiceModuleMethodName>);

in which <ServiceModuleMethodName> is the name of the method of the service module. The name includes the Service Module token, followed by a dot followed by the method name.

Each Service Module declares that it raises an Error Exception and a Service Denied exception. The Error Exception arises if there is an unhandled error or exception that occurs during Service Module processing. The Service Denied exception arises if, for any reason, the current client is not permitted access to the Service Module.

An instance of a Service Module 54 is created each time a client requests a reference to the Service Module. When a client sends a method to the Service Module instance held by the client, CORBA runs, on its listener thread, the appropriate Service Module Function 76a–76n, passing it the parameters of the sent method. There are multiple threads in the ANI 50 on which such requests are run. Thus, multiple requests can proceed in parallel in the ANI 50.

The request processing mechanism 88 involves request identifier handling and request authentication. Each request that a client sends to a service must include a unique integer request identifier that is generated by the client. Each Service Module 54a–54n returns a request identifier value to a client when the Service Module provides an asynchronous response to a client request, so that the client can identify a particular asynchronous response. Asynchronous responses include confirmations, completion notifications, error notifications, etc.

In the preferred embodiment, the request processing mechanism 88 comprises components that carry out the following functions: error checking of the request, initial error reporting, and confirmation handling 90; object set computation92; transaction processing 94; synchronous reply to request 96; optional parallel processing of the request 98; optional asynchronous notifications 91; database update and event distribution 93; optional final notification of asynchronous completion 95; and optional rollback of network and database effects 97 if the operation fails.

Error checking 90 is provided because the ANI 50 services clients of different types. Some services provided by different clients overlap. If each client performed its own error check, at least with respect to the service which the Service Module 54a is providing, then the error checking would have to be implemented for each client. In the preferred embodiment, error checking 90 is performed in each Service Module 54a–54n, so that clients do not have to duplicate the checks. Additionally, when performing a particular function from one or another of the clients, the user always receives consistent processing of errors. In the same manner, each client implements, as part of its standard client interface, methods to handle confirmations. The Service Module generates confirmations and the client merely displays them. The confirmation mechanism is described in detail herein.

The request processing mechanism 88 includes an object set computation mechanism 92. When Service Modules 54 processes a request, the Service Module determines the objects that are to be read or to be modified as part of the request. When a client indicates specific objects, identifiers of the objects within the database 60 must be passed. Service Modules 54 support object set computation by providing a collection method that collects a set of objects over which computation is to proceed.

8.2 TRANSACTION PROCESSING IN SERVICE MODULES

When a Service Module 54a–54n complete processing a service, the current transaction is used to direct the updating of the database and the generation of events describing the changes that have been made to the data model. If a function provided by a Service Module 54a can be completed without performing any device communication, then the Service Module method returns a completion result as part of its normal processing. If it must perform device communication, then when the basic method completes, it must reply to the client with an "accepted" reply.

Transaction processing is generally required when a Service Module 54*a* updates the database 60 or distributes events. In particular, when a Service Module 54*a* is configured to change an object in the database 60, the Service Module 54*a* must enclose the changes to the data model in a transaction.

Optionally, parallel processing 98 of the components of a request is accomplished, in a Service Module 54*a* setting context, by using the "perform Evaluation" method. Also optionally, a Service Module 54*a* provides asynchronous notifications 91 to a client. For example, a Service Module 54*a* can call one or more methods to provide a progress report, in which the service module notifies its client of progress. As another example, a service module can call one or more methods to provide a completion notification to a client. Another option is that a service module may notify its client of completion of the asynchronous processing of its request.

8.3 PERSISTENT OBJECTS

Each Service Module 54*a*–54*n* may also declare one or more persistent object storage methods, preferably using the mechanisms described herein in the section entitled "Persistent Object Storage."

8.4 HELPER CLASSES

Helper classes are classes used to store data temporarily or persistently in support of the operations of Service Modules and Service Module Functions. Helper classes that must persist from one run of ANI to the next run of ANI must be sub-classes of PersistentObject and must provide the required metadata for their management. Helper classes that do not need to persist have no particular restrictions on their structure or organization.

8.5 GENERAL QUERY HANDLER FOR A SERVICE MODULE

Each Service Module 54*a*–54*n* may also have a general query handler mechanism that enables a Service Module 54*a* to create queries to the data model, by having a class that implements data traversal and returns a result set. Generally, the components of a query handler are an interface definition (IDL) and a query method.

An interface definition for the query handler is stored in an IDL file that defines other interfaces associated with the service module. An example of an interface definition for a query handler is:

```
AniDataModule::AniCPResultStatus vsmDBQuery(in
    long reqId, in string queryName, in dbIdSeq params)
    raises(AniCoreModule::UnknownQuery,
    AniCoreModule::InSufficientArgs);
```

In this example, AniDataModule::AniCPResultStatus is the return type. This type is capable of transporting a result set. The method name is vsmDBQuery.

The three parameters are: the request identifier (reqId) supplied by the client which must be returned as part of any synchronous or asynchronous result returned; queryName names the query. queryName is usually a component of the name of the class that is used to actually perform the query. For example, a query implementing class in the VladServiceModule is VladDBgetCommunityQuery. The queryName for this query is: "db_getCommunity" The general framework strips the "db_" and prefixes "VladDB" and suffixes "Query" to the modified name to yield the name of the implementing class.

Note two exceptions which vsmDBQuery may raise: AniCoreModule::UnknownQuery and AniCoreModule::InSufficientArgs. The first is raised in case a queryName is passed which, when translated, does not yield the name of a class; the second is raised if the number of arguments passed does not match the declaration in the query class.

The second component of a query handler is the query method. For example, in the above example, a method vsmDBQuery is provided, which CORBA method invocation calls. It is the basic interface that registers the request calling Registry.request; creating an instance of VladServiceModule [describe other functions].

Ancillary Services of the Ani

1. Interprocess Communication Procedures

In the preferred embodiment, the ANI 50 uses an object request broker (ORB) 206 for communication between processes. For example, the ANI uses CORBA for interprocess communication. CORBA is generally described in numerous other publications, such as R. Orfali et al., "The Essential Distributed Objects Survival Guide" (New York: John Wiley & Sons, 1996). All object interfaces are defined in the Interface Definition Language (IDL). All processes implement the interfaces. In the preferred embodiment, ANI 50 comprises predefined interfaces called DataModule, CoreModule, and ClientModule. There are other interfaces that are specific to Service Modules.

The DataModule interface provides common structure and enumeration definitions for the rest of the interfaces. Main definitions are GroupConfirmationQry and GroupConfirmationReply, which support the confirmation process, and CPResultStatus, which carries the result set and status replies.

The CoreModule interface connects core services of ANI 50 to clients of the ANI. A client must establish a session with ANI before making use of these services. These services include a ServiceLogin service that creates an instance of a Service Module and returns a handle to it. This permits the client to make use of Service Module services.

The ClientModule provides a groupConfirmation service that is sent to request that the client display a set of confirmations to the client's user. The Client Module also includes a progressReport service that is sent periodically while an asynchronous activity is proceeding for the client. Preferably, the Client Module has an operationCompleted service that is sent when an asynchronous activity completes. Generally, asynchronous activities are followed by the generation of events indicating changes that the activity caused. Completion notification is used to clean up client state used to track outstanding requests. Events are used to signal change in the data model components in which the client has interest.

2. Event Processing

In the preferred embodiment, the ANI 50 communicates changes to clients using events. Generally, the event mechanism involves ANI side event generation, ANI side event distribution, client side registration, and client side event reception.

Events are generated in one of three ways. Events are generated during transaction commit, automatically by the ANI 50; during transaction commit as a result of service action to create a particular event or events; and when a Service Module expressly generates an event.

Events generated automatically by the ANI 50 are generated as a result of changes to objects which changes are captured in the scope of a transaction. When the transaction is committed, the changes are made persistent, and events are generated. There are three kinds of automatically generated events: Object added; object modified; object deleted. A single event is created for all objects of a given class (table in the database) of a single kind. Thus, if there were 300 Port objects modified in a particular transaction, only a single event would be generated indicating modification to Port objects. That event would contain 300 unique database identifier values, one for each of the objects modified.

Events generated by a service are either gathered and delivered at the end of the transaction in which they occur, or they are transmitted when the service creates them. In either case, the service module includes code that provides for event generation. In one approach, the service module creates an event class, generates the event object, and passes it to the transaction using a function call of the form myTransaction.addEvent(yourEvent). In an alternative approach, the service module creates an event class, generates the event object, and passes it to the transaction using a function call of the form Transaction.sendOneEvent (yourEvent). In the preceding examples, myTransaction is an instance of transaction under whose control you are performing object modifications.

Events are distributed by the ANI 50 either when a client generates the event or at Transaction commit time. When events are distributed at Transaction commit time, all events are deferred until after all database updates for the transaction are complete. When events are distributed, those events created by the service are distributed first; those events automatically generated are distributed next; finally, a transaction termination event is distributed.

3. Confirmation of Operations in the Ani

It is often necessary to ask a human user associated with a client for confirmation of the operation the user requested. Traditionally, confirmation is provided by a graphical user interface (GUI) generated by the network management system 40. The confirmation is generated when the GUI examines the request, based on information about the problem domain, and determines that the requested change should be confirmed. For example, if a user asks to delete a device 102 from the network 100, the user is asked to confirm the deletion.

However, on occasion the data required to compute the needed confirmation of a requested operation is not available to the client. To make the data available often requires that the client store a large amount of information, which is undesirable in the typical network environment because it requires the client to have a large amount of available storage, and consumes network bandwidth. In the preferred embodiment, ANI is the principal repository for network information needed by its clients. Thus, all the data necessary to compute confirmations for any change request is available in ANI. Preferably, rather than attempt to deliver all the necessary data to the client, ANI computes necessary confirmations for a set of changes, and delivers that information to the client. Confirmations are then presented to the user in a standard manner.

ANI and its clients cooperate to compute the confirmations required of a user when the user requests that changes be made. For example, if a user wants to disable trunking on a link connecting two switches, it is possible that the resulting network would be partitioned for VLANs other than the single VLAN left on the link. If it is determined that such a partitioning would take place, then it is appropriate to inform the user and let the user decide if the user wants to proceed.

In general, ANI Service Modules perform computations that determine whether such a partitioning would take place. The computations are performed when the service module analyzes the client command. The service module communicates the confirmations required to the client for presentation to the user. This is done using the class AniConfirmation.

In the preferred embodiment, the service module analyzes a request. While analyzing, the service module decides what confirmations are required and to what components of the request they apply. For example, when a user requests that several ports be moved to some vlan, there may be one or more confirmations per port to be moved: "should port xxx be moved from vlan yyy to vlan zzz", "port xxx is a trunk port and may not be moved in this way", etc. For each confirmation, the service module must provide a type, a user-supplied category, an integer identifier, an optional message identifier, and a message/parameter list.

The type value specifies the type of confirmation box that this confirmation causes to be raised. The category value is an integer used to group confirmation entries. If a "yes to all" or "no to all" type of confirmation is used, then if either is selected all confirmations with this category are answered with the provided answer. The integer identifier is used by the service module to describe in clear text the confirmation. The message identifier indexes into the message file for the message format. If a message identifier is provided, the message/parameter list field is interpreted as a parameter list to the message format. If the message identifier is null or not provided, then this is the confirmation message itself.

One such set of information is required for each confirmation to be asked the user. All confirmation messages include a cancel. A cancel applies to all confirmations in the confirmation group.

A user may have no more than one confirmation group outstanding at a time. This implies that clients that receive a confirmation message must handle the confirmations in a modal manner. That is, clients should not permit the user to do anything, except deal with the confirmations, from the time that the client issues the request for confirmation construction of the service module until all confirmations are complete. The client must be structured, however, so that it can deal with failures of the ANI 50, such as timeouts waiting on the confirmation, etc.

In the preferred embodiment, confirmation is implemented in one or more program classes. For example, classes that implement confirmation are AniConfirmationEntry, which carries individual confirmations; AniConfirmationGroup, which carries the set of confirmations; AniCPResultStatus, which is used to communicate the confirmations from/to ANI, and AniQueryResultSet, which implements the AniConfirmationGroup.

Figure 4B:
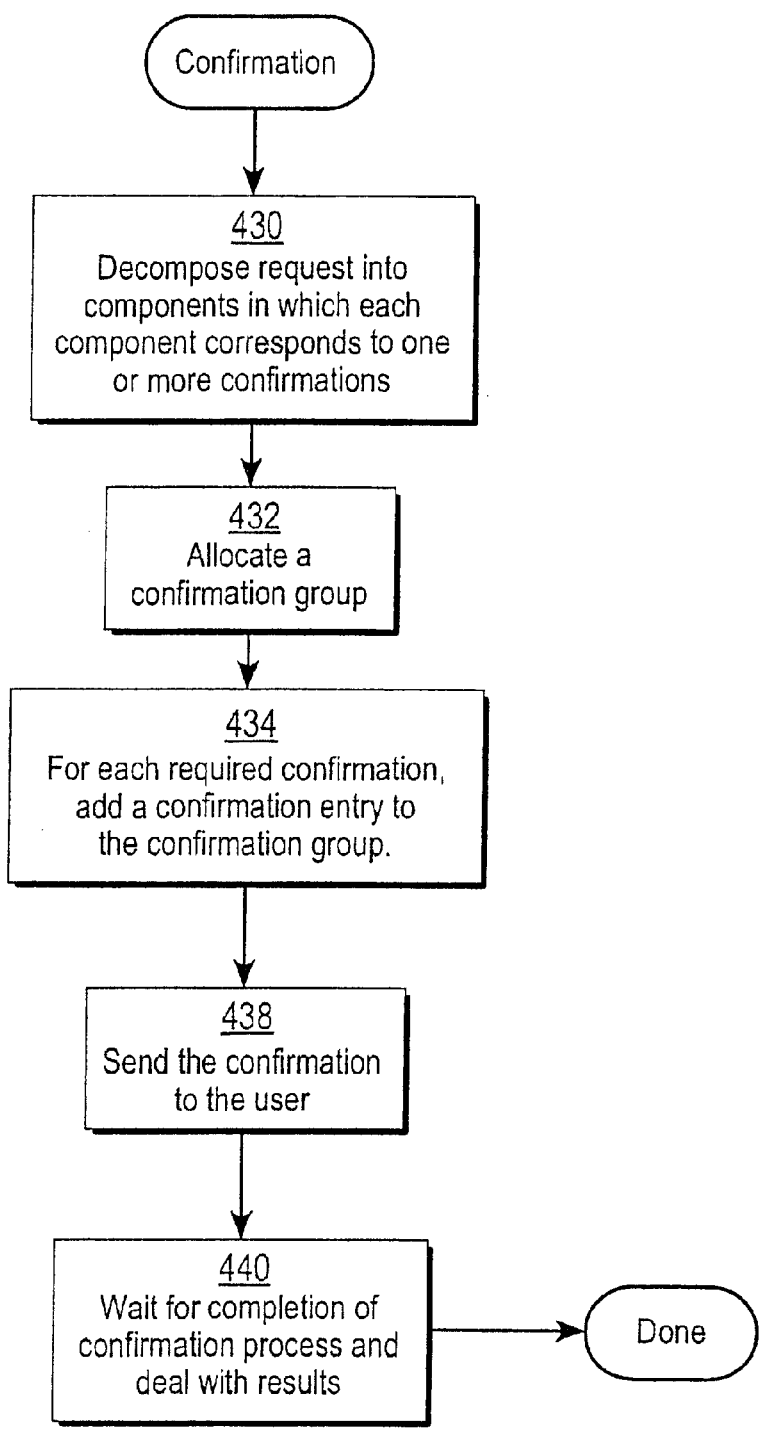
FIG. 4B is a flow diagram of a message confirmation method.

A service module constructs a confirmation in partial response to a query from a client. FIG. 4B is a flow diagram of a preferred process of carrying out confirmation. As shown in block 430, the request is decomposed into component parts, in which each component corresponds to one or more confirmations. The decomposition step is necessary because several components may be confirmed by a single confirmation or a single component may require several confirmations. In block 432, a confirmation group is allocated. In block 434, for each required confirmation, a confirmation entry is added to the confirmation group. In block 438, the confirmation is sent to the user. In block 440, ANI waits for the client to respond to the confirmation request. Further, in block 440 the nature of the confirmation is analyzed. If the entire request is cancelled, that is noted. If only certain elements of the request are denied, that is noted. Whatever is left of the initial request prior to confirmation is then processed.

Exemplary confirmation types are set forth in Table 1. In particular, Table 1 includes a Type column that corresponds to values of the type parameter, and a Meaning column that sets forth a shorthand description of the corresponding type of confirmation dialog that is displayed to a user.

TABLE 1

CONFIRMATION TYPES

| TYPE | MEANING |
| --- | --- |
| 1 | Yes/No/Cancel |
| 2 | Yes/YesToAll/No/NoToAll/Cancel |
| 3 | Yes/YesToAll/No/Cancel |
| 4 | Yes/No/NoToAll/Cancel |

4. Query Model

In general, ANI provides data to its clients using a Query Service Module that provides two general classes of service: a database isolation layer, and general query evaluation. Preferably, the Query Service Module is based on the JDBC interface promoted by Sun Corporation. ANI provides a number of services that enable a client to acquire and understand the data the client needs to fulfill its function.

The database isolation layer provides abstracted operations over ANI's data model. Operations include query type operations. For example, a query might be "getAllPortsTheseDevicesTheseVLANs" which might return the set of VLAN/port(definitions) appropriate to the query.

General Query Evaluation is provided to enable a client to submit queries to the database for evaluation. The General Query Evaluation mechanism is important because not all data needed by ANI clients will be provided by the database Isolation Layer alone. Client queries are expressed as standard SQL select statements.

5. Transactions

The preferred embodiment includes a transaction processing mechanism that manages changes to data modifications. Transactions provide several following services. For example, transactions collect objects that are modified during the transaction's lifetime within the process being managed. Transactions synchronize access to objects being modified between transactions. Transactions provide for database update of modified objects. Transactions provide for event generation describing changes made during a transaction.

The general steps in using transactions are as follows. First, a transaction is created. Second, the thread(s) making changes to the transaction is(are) associated with the transaction. Third, changes are made, making sure that markDirty( ) is used as required. Next, the thread(s) is(are) removed from association with the transaction. Last, the transaction is committed.

In the preferred embodiment, a transaction is created by a function call to a library function. Before an application program starts a process that will be changing objects in a data model, the application program must create a transaction to capture those changes. Preferably, a transaction is created using the following code fragment:

Transaction transaction=new Transaction( );

In response, the Transaction( ) method creates a new variable, transaction, of data type Transaction. The application program uses the variable "transaction" anywhere that the program needs to make use of the transaction.

The foregoing code segment, and other code examples in this document, are shown as source code that conforms to the JAVA® programming language. Any other suitable programming language may be used.

In the application program, processing threads are added to a transaction using a registration process. Each thread that the application program uses to modify objects of the data model that are to be tracked by a transaction must register with that transaction. A thread registers with a transaction by executing the following code:

transaction.register( );

where "transaction" is the variable referencing the transaction. When the above message is sent, the current thread is added to the transaction.

The preferred embodiment also includes a function for announcing to other parts of the preferred mechanism that a change has been carried out. In the preferred embodiment, the changes are announced using a markDirty( ) function. Generally, an application program adds objects to a transaction when the program needs changes to the objects to be noted and properly handled. For example, if an application program changes the VLAN with which a user port is associated, the program must mark the port and the VLAN as "dirty", because both of them have changed. If port is a variable containing the reference to the port, then the following will cause the port to be marked dirty:

port.markDirty( );

The foregoing method is called by a registered thread. The Persistent Object mechanism has methods and functions that support this operation. In particular, there is a set of overloaded functions called bind which are used in the following format:

target=bind(target, source);

which compares target and source values. If the target and source values are different, then markDirty( ) is called for the object in which the above code is executed. If they are not different then markDirty( ) is not called.

When a thread is done working for a transaction, the thread is removed from the transaction using the following code:

transaction.unregister( );

where "transaction" indicates the transaction from which this thread is to be unregistered.

Once an application has completed the changes to the objects of a process, and the application is ready to commit its changes, the application uses the transaction commit method. The format of the message is:

transaction.commit( );

When the transaction commit function is performed, all changes to objects collected are written to the database, all events are collected from the application to be transmitted at commit time, and all events indicating changes to objects in the data model are transmitted.

In the preferred embodiment, applications make use of a parallel processing mechanism to provide parallel execution as appropriate, for example of network interactions. In the preferred embodiment, the parallel processing mechanism is called the "EvalGroup" mechanism. When an application uses the EvalGroup mechanism, a transaction is taken as a parameter to an EvalGroup group constructor. The EvalGroup registers and unregisters all threads executing code of the application.

In the preferred embodiment, the transaction processing functions of the ANI include modified object collection, object use synchronization, and object use deadlock detection and notification.

A transaction is created at the beginning of a phase of a service during which objects of a data model are to be modified. The objects are persistent objects. When that phase completes, usually when changes to the network and changes to the data model are done, the transaction is committed. While a service is changing the state of a data model, by creating new objects, marking objects dirty, etc., the transaction adds objects marked dirty to itself, and waits for availability of objects that need to be changed. In this process, the transaction may notify the service that a deadlock has occurred.

Object-Oriented Programming

The preferred embodiment is implemented in an object-oriented programming language, and many of the preferred structures have been developed in the context of object-oriented programming systems. It is assumed that the reader is familiar with fundamental principles of object-oriented programming in general and the JAVA® language in particular, including the nature and use of classes, subclasses, methods, messages, inheritance, and polymorphism, etc. Such principles are not described in detail in this document to avoid obscuring the invention. A general reference is Arnold & Gosling, "The Java Programming Language" (Addison-Wesley 1997). A standard reference work on object-oriented programming is B. Meyer, "Object-oriented Software Construction."

In the preferred embodiment, the mechanisms are implemented in the form of an object class library or dynamically linked library (DLL).

Development Environment

In the preferred environment, the ANI 50 is usable at runtime to control network devices 102 in a managed network 100. In addition, the ANI 50 is usable during an application development stage in which an application program is prepared and compiled using source code of the ANI mechanisms.

In the preferred embodiment, the ANI development environment comprises the Java Development Kit (JDK) Release 1.1, which is commercially available from Sun Microsystems, Inc. and can be downloaded using the World Wide Web by searching at http://www.javasoft.com:80/products/jdk/1.1/index.html. The development environment also comprises Java Generic Library (JGL) Release 1.1, which is commercially available from Objectspace. JGL 1.1 can be downloaded from http://www.objectspace.com/.

The ANI development environment also comprises an integrated development environment tool, such as Symantec's Visual Café® for JAVA®, Release 1.0c or later. Also preferably, the development environment has access to source code for the network management system 40. The development environment also comprises a CORBA-compliant object request broker, such as the Visibroker 2.5 ORB that is commercially available from Visigenics, http://www.visigenics.com/.

The development environment also requires a database 60, such as a database server that is compatible with SQL. In the preferred embodiment, the database 60 is the SQL Anywhere Database, Release 5.0 or above. The database 60 is accessible from the JAVA® language programs that form the ANI using an ODBC driver.

For ANI to be operational, certain mechanisms or software modules must be accessible in the development environment for compilation into ANI, or into the network management system 40, or to be called from ANI or the network management system. The mechanisms include backend discovery and service modules; a network management system user interface and topology display; a function library that implements SNMP functions; a Real Time Poller; miscellaneous utilities, such as a Daemon Manager interface, ExportClient, and EventChannel wrapper. In the preferred embodiment, the foregoing mechanisms include a JRAD tooltips library, the JGL container/collection package from ObjectSpace, the Visigenic CORBA middleware, the Tom Sawyer topology layout package, and GUI widgets from KLGroup. One of ordinary skill in the art will recognize that integration of these elements requires various shell scripts, installation and configuration, and other setup work.

In the preferred embodiment, fundamental ANI configuration parameters are stored in a JAVA® properties file named ani.properties. For example, the ani.properties file identifies the current machine that is serving as an ANI server using an AniName property.

Hardware Overview

Figure 10:
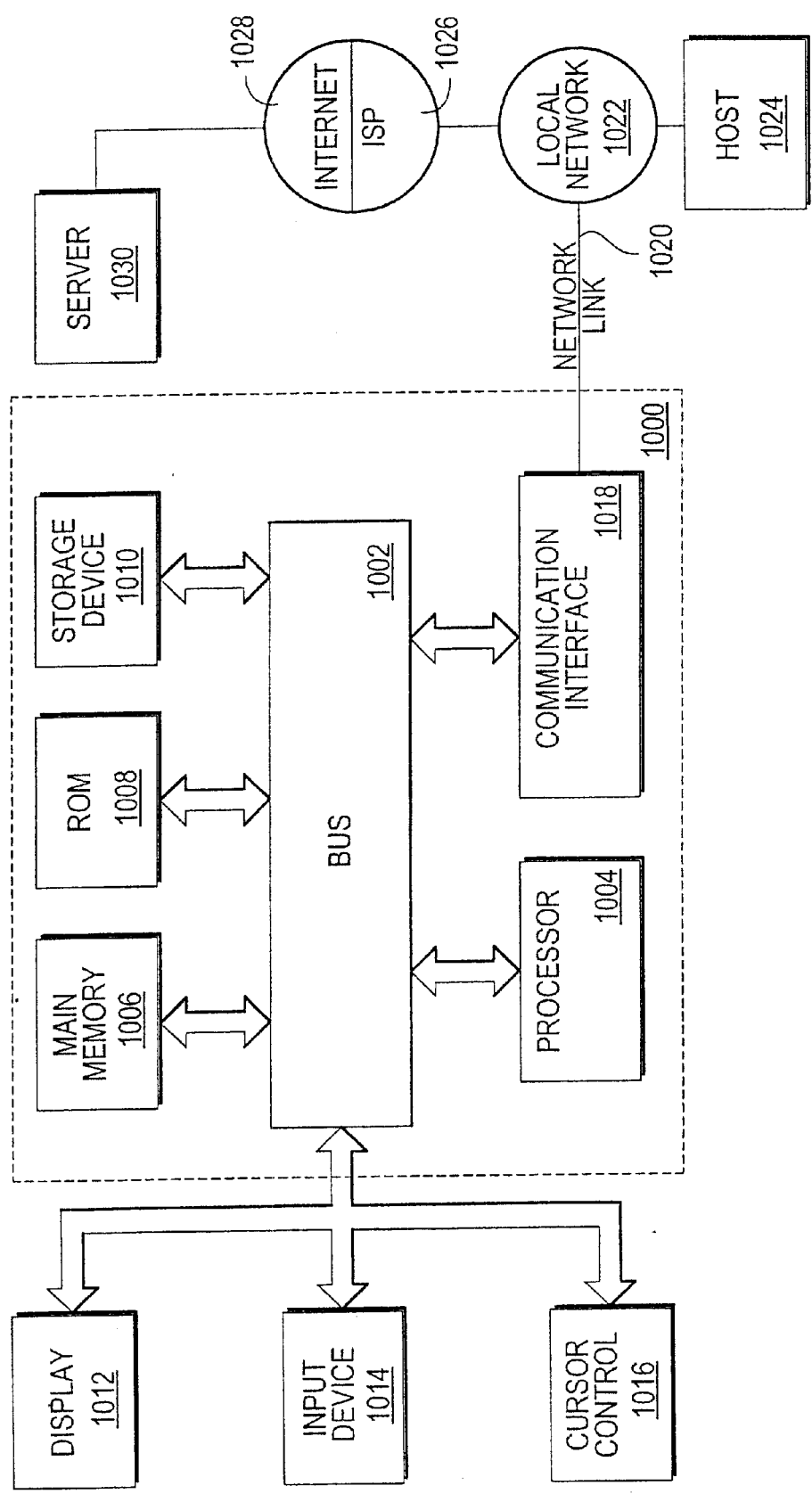
FIG. 10 is a block diagram of a computer system on which aspects of the invention may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Functions of embodiments of the invention are is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector can receive the data carried in the infrared signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. One such downloaded application provides the functions of the preferred embodiment as described herein.

The received code may be executed by processor 1004 as it is received, and/or stored in storage device 1010, or other non-volatile storage for later execution. In this manner, computer system 1000 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

-121-

APPENDIX 1

EXAMPLE OF SERVICE MODULE WITH PERSISTENT OBJECTS

```
import COM.cisco.nm.ani.framework.*;
import COM.cisco.nm.ani.util.*;

public class POExample extends (something that extends PersistentObject)
{
    /*********************BEGIN EXAMPLE-RELATED STUFF*******************/
        // The following are example related things we want to store
    public POExample(Module module, int slot)
    {
        _module = module;
        _slot = slot;
    }

// Module is an object that we refer to.
    protected Module _module;
    // this is an integer, can not be null
    protected int _slot;
    // this is an integer that can be null
    protected int _status;

/********************END EXAMPLE-RELATED STUFF*********************/

/******************BEGIN INHERITANCE PARTICIPANTS ONLY**************/

// if you are participating in an inheritance heirarchy, you must
    // add the following method, this includes the root class and any
    // associated descendents
    public MetaPOMetaData metaMetaData() {
        MetaPOMetaData mpomd = super.metaMetaData();
        mpomd.add(_MyMetaData);
        return mpomd;
    }

/******************END INHERITANCE PARTICIPANTS ONLY***************/

/**************************BEGIN EVERYONE**************************/

// EVERYONE must implement the following
    /**
     * set our backpointers to the object instance that we refer to
     */
    public void resolveObject(String table, Object binding) {
        /*
         * here we resolve the backpointer to our container
         * in this case it is a Module to which this person belongs
         */
        if (table.equals(_POExampleMetaData.table())) {
            try {
                Array resolveArray = (Array)binding;
                // familyDbId is our foreign key
                int moduleDbId = ((Integer)resolveArray.at(0)).intValue();
                _module = Module.findByDbId(moduleDbId);
            } catch (Exception e) {}
        } else {
            super.resolveObject(table, binding);
```

50325-015 (WGM 269)

-122-

```
            }
        }

/**
         * integrate the values for the columns of the table read.  Add
         * to the temporary HashMap, out: an array with a N elements
         * containing the dbId of the N references (foreign key) objects
         * that we refer to
         */
        public Object readObject(String table, HashMap hm) {
            if (table.equals(_POExampleMetaData.table())) {
                // this class only has one foreign key.  If you have more
                // Array resolveArray = new Array(3); e.g. for 3
                Array resolveArray = new Array(1);

// primary key, cannot be null
                Integer temp;
                temp = (Integer) hm.get("myDbId");
                setDbId(temp.intValue());
                // we must add ourselves to our _DbIdMap, so that others
                // can find us later via our DbId
                _DbIdMap.put(temp, this);

// foreign key, cannot be null
                resolveArray.put(0, (Integer)hm.get("moduleDbId"));

// columns that are not supposed to be null
                _slot = ((Integer)hm.get("slot")).intValue();

// columns that can be null
                if ((temp = (Integer)hm.get("status")) != null) {
                    _status = temp.intValue();
                }

_comment = (String)hm.get("comment");

return resolveArray; // or return null if you don't have a resolveArray
            } else {
                return super.readObject(table, hm);
            }
        } public void writeObject(HashMap hm)
        {
            SmallAssociation sa = new SmallAssociation(_POExampleMetaData.size());
            super.writeObject(hm);
            sa.add("moduleDbId", _module);
            sa.add("slot", new Integer(_slot));
            sa.add("comment", "Who are you?");
            sa.add("status", new Integer(_status));

hm.add(_POExampleMetaData.table(), sa);
        }
        public POMetaData metaData() {
            return _POExampleMetaData;
        }

// Everyone must have the following static variables
        // YOU MUST provide separate names for the POMetaData
        // for each Class because we need it for scaffolding
```

50325-015 (WGM 269)

```
        protected static POMetaData _POExampleMetaData =
            new POMetaData(_Class, "WbuPOExample");

5      protected static HashMap _DbIdMap = new HashMap();

// Everyone must have the following static initializer
        static {
            // My Primary Key
10          POMember member = new POMember ("myDbId",
                                            POMemberType.INTEGER,
                                            "Primary Key");
            member.makePrimaryKey();
            _POExampleMetaData.addMember(member);
15
            // My Foreign Keys
            _POExampleMetaData.addMember("moduleDbId", POMemberType.REFERENCE,
                    "reference to a foreign key",false);

20          // My Columns Not Null
            _POExampleMetaData.addMember("slot", POMemberType.INTEGER,
                    "Age - not null",false);

// My Columns Can Be Null
25          _POExampleMetaData.addMember("comment", POMemberType.VARCHAR,
                    "Comment - allow null, length 64", true, 64);
            _POExampleMetaData.addMember("status", POMemberType.INTEGER,
                    "Status - allow null", true);
            _POExampleMetaData.setComment("Table of " + _Class);
30
        }
        /*****************************END EVERYONE***************************/
    }
```

50325-015 (WGM 269)

-124-

APPENDIX 2 -- PARALLEL PROCESSING EXAMPLE

```
protected boolean performEvaluation(HashMap smfcs, String timeBase, String
operation)
{
    boolean returnStatus = true;

/*
     * now, execute the parallel set process
     */
    OrderedSet members = new OrderedSet();
    for (Enumeration e = smfcs.elements();
         e.hasMoreElements();) {
        members.add(e.nextElement());
    }

Sequence evalSequence =
      ((AniTimeBase)AniTimeBase.instances().get(timeBase)).
                 evalSequence();
    EvalGroup eg = null;
    Transaction transaction = new Transaction();
    // String operation = request().method();
    try {
        // Instantiate EvalGroup for change
        eg = new EvalGroup(transaction, members, evalSequence);
        if (request().sendNotifications()) {
            request().client().progressReport(request().reqId(),
"PRFormat",MessageHandling.setParameters(operation,"Started"),5);
        }
        // first acquire the current state
        eg.apply(new EvalSMFAcquire());
        if (request().sendNotifications()) {
           request().client().progressReport(request().reqId(),
"PRFormat",MessageHandling.setParameters(operation,"Acquire_done"),20);
        }

// next, make the state changes
        eg.apply(new EvalSMFSet());
        if (request().sendNotifications()) {
            request().client().progressReport(request().reqId(),
"PRFormat",MessageHandling.setParameters(operation,"Set_done"),70);
        }

// next, verify that the changes were made
        eg.apply(new EvalSMFVerify());
        if (request().sendNotifications()) {
            request().client().progressReport(request().reqId(),
"PRFormat",MessageHandling.setParameters(operation,"Verify_done"),90);
        }

// Finally, integrate the changes back into
        //          the data model and initiate database write
        eg.apply(new EvalSMFIntegrate());
    } catch (Exception etae) {
        // this is thrown when there is a
        // failure which is either abort of
        // rollback.  If it is roll back,
```

-125-

```
                // then roll back here
                //... determine if rollback ...
                // Please Note: a reverse of the PO is required
                // for the rollback.  This is specified via the
                // rollback functor.
                try {
                    Vector msg = MessageHandling.splitMessage(eg.errorMessage());
                    request().client().operationCompleted(request().reqId(),
        WrapResult.failed((String)msg.elementAt(0),(String)msg.elementAt(1)));
                    eg.apply(new EvalSMFRollback());
                    returnStatus = false;
                } catch (Exception excp) {
                    LogMsg.error(this, "Failed to return status to client");
                    returnStatus = false;
                }
            } finally {
                transaction.commit();
            } try {
                if (!processEvaluationErrors(members)) {
                    request().client().operationCompleted(request().reqId(),
                        WrapResult.ok());
                }
            } catch (Exception excp) {
                LogMsg.error(this, "Failed to return status to client because: "
    + excp.toString());
                returnStatus = false;
            } return returnStatus;
        }

/* $Id: EvalFailedException.java,v 1.1.1.1 1998/02/14 01:00:45 davidn Exp $
 *---------------------------------------------------------------
 * $File$
 *
 * $Month$ $Year$, $User$
 *
 * Copyright (c) $Year$ by Cisco Systems, Inc.
 * All rights reserved.
 *
 * Authors:  $User$
 *
 * $Endlog$
 */ package com.cisco.nm.ani.frontend;

/*
    This exception is used by a SMF to terminate execution
    of a minor thread.
*/ public class EvalFailedException extends Exception
{
    public EvalFailedException()
    {
        super();
```

50325-015 (WGM 269)

-126-

```
    }
    /**
     * Constructs a EvalFailedException with the specified detail message.
     * A detail message is a String that describes this particular exception.
     * @param s the detail message
     */
    public EvalFailedException(String msg) {
            super(msg);
    }
}
/* $Id: EvalFunctorIf.java,v 1.2 1998/03/27 03:27:46 rjsmith Exp $
 *----------------------------------------------------------------
 * $File$
 *
 * $Month$ $Year$, $User$
 *
 * Copyright (c) $Year$ by Cisco Systems, Inc.
 * All rights reserved.
 *
 * Authors:  $User$
 *
 * $Endlog$
 */

/**
 * The interface EvalFunctor defines an interface for execution of
 * either an allRequired() or !allRequired() SMFunction.
 */ package com.cisco.nm.ani.frontend;

import com.objectspace.jgl.HashSet;
import com.cisco.nm.ani.framework.*;

public interface EvalFunctorIf
{
    public boolean evalIsReversed();
    public HashSet apply(SMFunction f, SMFContainer c)
        throws EvalFailedException, EvalTerminateAndRemoveException,
            EvalTerminateAllException, AniLockException;
    public HashSet apply(SMFunction f)
        throws EvalTerminateAllException, AniLockException;
}
/* $Id: EvalGroup.java,v 1.6 1998/03/27 03:27:46 rjsmith Exp $
 *----------------------------------------------------------------
 * $File$
 *
 * $Month$ $Year$, $User$
 *
 * Copyright (c) $Year$ by Cisco Systems, Inc.
 * All rights reserved.
 *
 * Authors:  $User$
 *
 * $Endlog$
 */ package com.cisco.nm.ani.frontend;

import java.util.Enumeration;
import com.cisco.nm.ani.framework.Transaction;
```

50325-015 (WGM 269)

-127-

```
    import com.cisco.nm.ani.framework.SMFContainer;
    import com.cisco.nm.ani.framework.SMFunction;
    import com.cisco.nm.ani.framework.SMFDefinition;
    import com.cisco.nm.ani.framework.AniLockException;
5   import com.cisco.nm.ani.framework.EvalSMFApply;

import com.cisco.nm.ani.util.*;

import com.objectspace.jgl.*;
10
    /**
     * <pre>
     * The class EvalGroup represents a hetrogenous set of "unit" instances
     * to be evaluated as a traversal of partial order service module functions.
15   * <p>
     * Evaluation is broken into two phases, a major walk of functions which do not
     * require instances, and a minor walk of functions which are applied against
     * members of the EvalGrouop.
     * <p>
20   * A minor walk begins when an SMFunction is encountered where
     * allIsRequired()==false, and continues until an SMFunction is
     * encountered where allIsRequired()==true, at which point the
     * major walk continues.
     * <p>
25   *     Usage:   new EvalGroup(membersSet, _rootNode).apply()
     * </pre>
     *
     * @author Brad Schoening
     * @see EvalPair
30   * @see EvalScheduler
     */ public class EvalGroup
    {
35
        /**
         *  Create a new EvalGroup with the specified members and root
         *  service module function.
         */
40
        public EvalGroup(Transaction transaction,
            OrderedSet members,
            Sequence evalSequence)
        {
45          _transaction = transaction;
            _members = members;
            _evalSequence = evalSequence;
        }

50      public String errorMessage()
        {
            return _errorMessage;
        }

55      public void setError(Exception ex)
        {
            if(_errorMessage == null)
                _errorMessage = StringUtils.exceptionString(ex);
            else
60              _errorMessage = _errorMessage + "\n" + StringUtils.exceptionString(ex);
        }
```

-128-

```
public void terminate()
{
    _fault = true;
}
public boolean isActive()
{
    return !_fault;
}
public synchronized void removeMember(SMFContainer obj)
{
    _members.remove(obj);
}

/**
 * Register the specified SMFunction as having failed for the
 * specified object.
 *<br>
 * Note that this is used for minor nodes which execute over
 * a specific SMFContainer.
 */
public synchronized void addFailed(SMFDefinition def, SMFContainer obj)
{
    LogMsg.debug(this, "Step failed - " + def);

// Lazy initialization - If object to failure list map is null,
    // then create it.
    if (_objectToFailList == null) {
        _objectToFailList = new HashMap();
    }

// Get failure list for the specified object.  If none, then
    // create one.
    HashSet failList = (HashSet)_objectToFailList.get(obj);
    if (failList == null) {
        failList = new HashSet();
        _objectToFailList.add(obj, failList);
    }

// Add smf to the list of minor node smfs that have failed for
    // this object.
    failList.add(def);
}

/**
 * Return true if the specified SMFunction has failed for the
 * specified object.
 *<br>
 * This is used during minor node traversal to determine whether
 * or not a precondition node has failed.
 *<br>
 * This checks the minor node failure list for the specified object.
 * It is not necessary to check major nodes, since those terminate
 * the entire evaluation when they fail.
 *<br>
 * Note that only minor nodes should be checked here.
 */
public synchronized boolean hasFailed(SMFDefinition def,
    SMFContainer obj) {
    // Lazy initialization - If the collection is not initialized,
    // then nothing has failed.
    if (_objectToFailList == null) {
```

50325-015 (WGM 269)

-129-

```
            return false;
        }

// Get failure list for minor nodes associated with the specified
        // object.
        HashSet failList = (HashSet)_objectToFailList.get(obj);

return ((failList != null) && (failList.get(def) != null));
    }
    /**
     * Return true if any prerequisites of the specified SMFunction
     * have failed for the specified object.
     *<br>
     * This is used during minor node traversal to determine whether
     * or not a precondition node has failed.
     *<br>
     * This checks the minor node failure list for the specified object.
     * It is not necessary to check major nodes, since those terminate
     * the entire evaluation when they fail.
     *<br>
     * Note that only minor nodes should be checked here.
     */
    public synchronized boolean prerequisitesHaveFailed(
        SMFDefinition def, SMFContainer obj) {
        // Check how many prerequisites.  Most nodes will have zero
        // or one, so don't enumerate if it isn't necessary.
        if (def.numPrerequisites() == 1) {
            return hasFailed(def.firstPrerequisite(), obj);
        } else if (def.numPrerequisites() > 1) {
            Enumeration e = def.prerequisiteElements();
            while (e.hasMoreElements()) {
                SMFDefinition prereq = (SMFDefinition)e.nextElement();
                if (hasFailed(prereq, obj)) {
                    return true;
                } // Prerequisite has failed
            }     // For each prerequisite
        }         // More than one prerequisite // Nothing failed
        return false;
    } public void initializeEvalState(boolean evalIsReversed)
    {
        // Set initial error/terminate state
        _fault        = false;
        _errorMessage = null;

// No SMFunctions have failed yet
        _objectToFailList = null;

// Set initial evaluation position
        _evalIsReversed = evalIsReversed;
        _evalPosition   = evalIsReversed ? (_evalSequence.size()-1) : 0;
    } public Sequence evalSequence()
    {
        return _evalSequence;
    }
```

50325-015 (WGM 269)

-130-

```
public int evalPosition()
{
    return _evalPosition;
} public boolean evalIsReversed()
{
    return _evalIsReversed;
} public SMFunction getAllRequiredSMF(SMFDefinition def)
        throws InstantiationException, IllegalAccessException {
    // See whether or not we already have an instance.  If yes, then
    // get it.  Otherwise, create a new one.
    SMFunction smf = (SMFunction)_allRequiredSMFs.get(def);
    if (smf == null) {
        smf = (SMFunction)def.smfClass().newInstance();
        _allRequiredSMFs.add(def, smf);
    } // Need to create new "all required" instance of SMF return smf;
}

/**
 * Walk a major partial order sequence, performing each SMF
 * on the given Unit instance.  If a SMF operates on a Unit,
 * we find all members of that type and kick off execution
 * of the minor partial order traversal on these members.
 */ public synchronized void apply() throws EvalTerminateAllException
{
    // Default is to apply with the "apply" functor
    apply(new EvalSMFApply());
} public synchronized void apply(EvalFunctorIf functor)
        throws EvalTerminateAllException
{
    // Set initial evaluation state
    initializeEvalState(functor.evalIsReversed());

// Register for transaction so objects created in major
    // apply() steps get written.
    registerThread();
    try {
        while (hasMoreEvalNodes()) {
            SMFDefinition def = currentEvalNode();

// If the current node is not "all is required", then that
            // kicks off a minor partial order traversal which is
            // executed across multiple parallel evaluation threads.
            //
            // Here, wait for that to finish, and then find the next
            // major node to execute.
            //
            // Otherwise, if the current node is "all is required",
            // then just evaluate it, and move on to the next node.
            if (!def.isAllRequired()) {
                OrderedSet units = membersOfType(def.unit());
```

-131-

```
            Enumeration iterator = units.elements();
            _pairCount = units.size();
            while (iterator.hasMoreElements()) {
                SMFContainer mo = (SMFContainer)iterator.nextElement();
                EvalScheduler.instance().add(
                    new EvalPair(this, mo, functor));
            }
            while (_pairCount > 0) {
                try {
                    wait();    // each EvalPair signals when completed
                } catch (InterruptedException ex) {
                    LogMsg.trace(this, "Wait interrupted");
                }
            }

// Done with minor node traversal, so find the next major
            // node.
            nextMajorNode();
        } else {
            LogMsg.trace(this, "ALL: " + def.name());
            SMFunction smf = getAllRequiredSMF(def);
            HashSet set = functor.apply(smf);
            LogMsg.trace(this, "apply done");
            if (set != null) {
                for (Enumeration iter = set.elements();
                     iter.hasMoreElements();) {
                    _members.add(iter.nextElement());
                }
            }

// Done with major node, so go to the next evaluation node.
            nextEvalNode();
        }    // allIsRequired
    }    // While more major nodes
} catch (AniLockException ex) {
    // Lock exception in this major node
    LogMsg.trace(this, ex.toString());
    setError(ex);
    terminate();
} catch (EvalTerminateAllException ex) {
    // catch terminate all notification by SMF
    LogMsg.trace(this, ex.toString());
    setError(ex);
    terminate();
} catch (Exception ex) {
    LogMsg.error(this, ex.toString());
    ex.printStackTrace();
} finally {
    // Deregister from transaction
    unregisterThread();
}

// If terminated due to error, then throw exception.
if (_fault) {
    throw new EvalTerminateAllException();
}
} protected void unregisterThread()
{
    if (_transaction != null)
```

50325-015 (WGM 269)

-132-

```
        _transaction.unregister();
    }
    protected void registerThread()
    {
        if (_transaction != null)
            _transaction.register();
    }

/**
     * Adds a new instance to the member set
     * and initializes evaluation to begin at the current node.
     */
    protected synchronized void addMembers(HashSet items,
        EvalFunctorIf functor)
    {
        for (Enumeration iterator = items.elements();
            iterator.hasMoreElements();) {

_pairCount = _pairCount + 1;

SMFContainer obj = (SMFContainer)iterator.nextElement();
            _members.add(obj);
            EvalScheduler.instance().add(
                new EvalPair(this, obj, functor));
        }
    } protected boolean hasMoreEvalNodes()
    {
        return ((_evalPosition >= 0) &&
                (_evalPosition < _evalSequence.size()));
    } protected SMFDefinition currentEvalNode()
    {
        return (SMFDefinition)_evalSequence.at(_evalPosition);
    } protected void nextEvalNode()
    {
        // Advance one function in current direction
        _evalPosition += ((_evalIsReversed) ? -1 : 1);
    } protected void nextMajorNode()
    {
        if (_evalIsReversed) {
            // Search forward for major node, or until no more nodes
            while (hasMoreEvalNodes() && !currentEvalNode().isAllRequired()) {
                _evalPosition--;
            }   // Until major node is found
        } else {
            // Search backward for major node, or until no more nodes
            while (hasMoreEvalNodes() && !currentEvalNode().isAllRequired()) {
                _evalPosition++;
            }   // Until major node is found
        }   // Reverse evaluation
    }

/**
     * EvalPairs call signal() when they complete.  When there
```

50325-015 (WGM 269)

-133-

```
 *  are no more EvalPairs, we notify the main thread.
 */
protected synchronized void signal()
{
    _pairCount--;
    if (_pairCount == 0)
        notify();
}

/**
 * Answer the subset of members matching the specified type.
 * Members are currently stored in a hash set instead of
 * being organized by type.  This should be re-implemented
 * using an efficient data structure.
 */
protected OrderedSet membersOfType(String unitName)
{
    OrderedSet selected = new OrderedSet();
    Enumeration e = _members.elements();
    while (e.hasMoreElements()) {
        SMFContainer mo = (SMFContainer) e.nextElement();
        if ( mo.type().equals(unitName) )
            selected.add(mo);
    }
    return selected;
}

/**
 * true if an EvalTerminateAllException
 * occurred during evaluation of the group
 */
protected boolean _fault = false;

/**
 * Can be set to indicate errors that occurred during processing
 * of the EvalGroup.
 */
protected String _errorMessage = null;

/** walk order position */
protected int _evalPosition;
protected boolean _evalIsReversed;
protected Sequence _evalSequence = null;

/** group members */
protected OrderedSet _members;

/** a counter used for waiting on minor nodes */
protected int _pairCount = 0;

/**
 * a transaction in which this evaluation is occurring.
 * Threads which execute steps of this evaluation join this
 * transaction.
 */
protected Transaction _transaction;

/**
 * contains a collection of SMFDefinitions for failed SMFunctions
 * for each object.  This is used for minor nodes only
 */
```

```
        protected HashMap _objectToFailList = null;

/**
         * contains a collection of isAllRequired() SMFunctions that
         * are instantiated as part of this evaluation.
         */
        protected HashMap _allRequiredSMFs = new HashMap();
    }
    /* $Id: EvalPair.java,v 1.5 1998/03/27 03:27:46 rjsmith Exp $
     *-----------------------------------------------------------------
     * $File$
     *
     * $Month$ $Year$, $User$
     *
     * Copyright (c) $Year$ by Cisco Systems, Inc.
     * All rights reserved.
     *
     * Authors: $User$
     *
     * $Endlog$
     */ package com.cisco.nm.ani.frontend;

import com.cisco.nm.ani.util.LogMsg;
    import com.cisco.nm.ani.framework.SMFContainer;
    import com.cisco.nm.ani.framework.SMFunction;
    import com.cisco.nm.ani.framework.SMFDefinition;
    import com.cisco.nm.ani.framework.AniLockException;

import com.objectspace.jgl.*;

/**
     * Class EvalPair represents functions scheduled for execution by
     * an independent thread to perform.
     *
     * @author Brad Schoening
     */
    public class EvalPair
    {
        public EvalPair(EvalGroup group, SMFContainer obj, EvalFunctorIf functor)
        {
            // assert(obj != null)

_arg = obj;
            _functor = functor;
            _group = group;
            _evalSequence   = group.evalSequence();
            _evalPosition   = group.evalPosition();
            _evalIsReversed = group.evalIsReversed();
        }
        public boolean isActive()
        {
            return _group.isActive();
        }
        /**
         * Walk a minor partial order sequence, performing each SMF
         * on the given Unit instance.  If a SMF generates a new instance,
         * these are added to my group which will begin their execution
```

-135-

```
       * at the current major node.
       */
      public void apply()
      {
 5       try {
             _group.registerThread();

// For each minor node, until the next major node
             // or until the end of the sequence, execute the node.
10           while (moreMinorNodes() && _group.isActive()) {
                 SMFDefinition def = currentEvalNode();

// Check prerequisites to make sure that none have
                 // failed.
15               if (_group.prerequisitesHaveFailed(def, _arg)) {
                         // If prerequisites have failed, then add this node
                         // as also having failed, and skip it.
                         LogMsg.debug(this, "Prerequisites have failed for " + def);
                         _group.addFailed(def, _arg);
20               } else {
                     // Get an instance of the current SMFunction within
                     // the SMFContainer over which this is operating.
                     SMFunction f = _arg.getFunction(def);

25                   // Execute the function.
                     try {
                         HashSet results = _functor.apply(f,_arg);

// Add additional SMFContainers to participate in
30                       // the current minor traversal, if any.
                         if (results != null) {
                             _group.addMembers(results, _functor);
                         }
                     } catch (EvalFailedException exx) {
35                       // catch and log a failed exception
                         LogMsg.trace(this, exx.toString());
                         _group.addFailed(def, _arg);
                     } catch (AniLockException exx) {
                         // catch and log a failed exception
40                       LogMsg.trace(this, exx.toString());
                         _group.addFailed(def, _arg);
                     } // Catch exceptions
                 }     // No prerequisites have failed 45               // Go to the next evaluation node.
                 nextEvalNode();
             }
         } catch (EvalTerminateAndRemoveException ex) {
             // catch duplicate notification by VladSMFGetDeviceId>>validate
50           // or VladSMFGetDeviceDomain()>>checkDomainName()
             LogMsg.trace(this, ex.toString());
             _group.removeMember(_arg);

// Mark object deleted.  If this fails because of a lock
55           // problem, then issue an error message, and keep going.
             // The chances of a lock failing here are actually pretty
             // slim, so I think this will work okay.
             //
             // RJS - What to do here???  Is this right, or should we
60           // terminate the entire evaluation?
             try {
```

50325-015 (WGM 269)

-136-

```
                _arg.markDeleted();
            } catch (AniLockException lockex) {
                LogMsg.error(this, lockex.toString());
            }
        } catch (EvalTerminateAllException ex) {
            // catch terminate all notification by SMF
            LogMsg.trace(this, ex.toString());
            _group.setError(ex);
            _group.terminate();
        } catch (Exception ex) {
            LogMsg.error(this, ex.toString());
            ex.printStackTrace();
        } finally {
            _group.unregisterThread();
            _group.signal();
        }
    } protected boolean moreMinorNodes()
    {
        return ((_evalPosition >= 0) &&
                (_evalPosition < _evalSequence.size()) &&
                !currentEvalNode().isAllRequired());
    } protected SMFDefinition currentEvalNode()
    {
        return (SMFDefinition)_evalSequence.at(_evalPosition);
    } protected void nextEvalNode()
    {
        // Advance one function in current direction
        _evalPosition += ((_evalIsReversed) ? -1 : 1);
    } protected EvalFunctorIf _functor;
    /** evaluation argument */
    protected SMFContainer _arg;

/** current position in walk order */
    protected Sequence _evalSequence;
    protected int _evalPosition;
    protected boolean _evalIsReversed;

/** an eval group */
    protected EvalGroup _group;
} package com.cisco.nm.ani.frontend;

import com.cisco.nm.ani.util.ErrorMessage;

public class EvalRetryException extends EvalSetOperationException
{
    public EvalRetryException(int retryCount,int retryInterval,ErrorMessage error)
    {
        super(error);
        _retryCount = retryCount;
        _retryInterval = retryInterval;
    }
```

50325-015 (WGM 269)

```
            protected int _retryCount = 0;
            protected int _retryInterval = 0;

public EvalRetryException(int retryCount, int retryInterval) {
 5              super(new ErrorMessage("retry"));
                _retryCount = retryCount;
                _retryInterval = retryInterval;
            }

10          public int retryCount() {
                return _retryCount;
            }
            public int retryInterval() {
                return _retryInterval;
15          }
        }
        /* $Id: EvalScheduler.java,v 1.2 1998/03/13 02:31:46 davidn Exp $
         *----------------------------------------------------------------
         * $File$
20       *
         * $Month$ $Year$, $User$
         *
         * Copyright (c) $Year$ by Cisco Systems, Inc.
         * All rights reserved.
25       *
         * Authors:  $User$
         *
         * $Endlog$
         */
30      package com.cisco.nm.ani.frontend;

import java.text.NumberFormat;
        import java.util.Enumeration;
35
        import com.cisco.nm.ani.framework.SMFContainer;
        import com.cisco.nm.ani.framework.SMFunction;
        import com.cisco.nm.ani.util.LogMsg;

40      import com.objectspace.jgl.*;

/**
         * <pre>
         * Class EvalScheduler is a singleton instance class which manages
45       * threads performing the execution of SMFunctions.
         *
         * Defered execution is modeled as instances of class DevicePair.  Where
         * the DevicePair represents a function to be evaluated with a given
         * argument.  Only functions requiring "Device" arguments should be
50       * scheduled.  Functions which do not require arguments are executed
         * serially.
         * </pre>
         *
         * <b>Copyright</b> Copyright (c) 1997 by Cisco Systems, Inc.
55       * @author Brad Schoening
         * @see com.cisco.nm.ani.frontend.EvalTask
         */
        public class EvalScheduler extends Object
60      {
```

-138-

```
/**
 * Create a single instance of this class.  This method
 * is synchronized to prevent creation of multiple instances.
 */
protected static synchronized void createInstance()
{
    if (_Instance == null) {
        LogMsg.trace(_Class, "Creating new Eval Scheduler");
        _Instance = new EvalScheduler();
    }
}
/**
 * Threads call this method to get new work.  If
 * no work is available, the method will block.
 */
public synchronized EvalPair nextEvalPair()
{
    while (_readyQueue.isEmpty()) {
        try { wait(); } catch (InterruptedException ex) {
            LogMsg.error(this, "unexpected intr " + ex.toString());
        };
    }
    return (EvalPair) _readyQueue.pop();
}
/**
 * Add a new EvalPair to the ready queue.
 * @return void
 */
public synchronized void add(EvalPair pair)
{
    _readyQueue.add(pair);
    notifyAll();
}
/** Internal method to be called only by instance() */
protected EvalScheduler()
{
    _taskSet = new HashSet();
    _readyQueue = new Queue();

createTasks("com.cisco.nm.ani.frontend.EvalTask");
}

/**
 * Answer the single instance of this class.
 */
public static EvalScheduler instance()
{
    if (_Instance == null)
        createInstance();

return _Instance;
}

/** Create the eval tasks. */
private synchronized void createTasks(String className)
{
```

50325-015 (WGM 269)

```
        // Look up properties
        String discoveryThreads = AniProperties.getProperty("Discovery.threads",
"1");
        int taskSetSize = new Integer(discoveryThreads).intValue();
        if (taskSetSize <= 0 && taskSetSize > 100) {
            LogMsg.error(this, "Ignoring invalid config param for DiscoveryThreads");
            taskSetSize = 1;
        }
        String discoveryPriority = AniProperties.getProperty("Discovery.priority",
                new Integer(Thread.NORM_PRIORITY).toString());
        int priority = new Integer(discoveryPriority).intValue();
        if (priority < Thread.MIN_PRIORITY && priority > Thread.NORM_PRIORITY) {
            LogMsg.error(this, "Ignoring invalid config param for
Discovery.priority");
            priority = Thread.NORM_PRIORITY;
        }

// create new threads
        _group = new ThreadGroup("EvalScheduler");
        Class taskClass = null;
        try {
            taskClass = Class.forName(className);
        } catch (ClassNotFoundException ex) {
            LogMsg.trace(this, "Class not found: " + className);
        };

try {
            NumberFormat nf = NumberFormat.getInstance();
            nf.setMinimumIntegerDigits(2);
            for (int i=1; i <= taskSetSize; i++ ) {
                Thread aThread = new Thread(_group, (Runnable)
taskClass.newInstance(), "EvalTask" + nf.format(i));
                aThread.setPriority(priority);
                aThread.start();
                _taskSet.add(aThread);
            };
        } catch (Exception ex) {
            LogMsg.error(this, "create task failure " + ex);
        };
    } protected ThreadGroup _group;

/** An ordered list of EvalPairs which are ready for execution by an EvalTask */
    protected Queue _readyQueue;

/** A fixed size pool of tasks */
    protected HashSet _taskSet;

/** @return the single instance of this class */
    protected static EvalScheduler _Instance;

final public static Class _Class = EvalScheduler.class;
}
package com.cisco.nm.ani.frontend;

import com.cisco.nm.ani.util.ErrorMessage;
import java.lang.Exception;

public class EvalSetOperationException extends java.lang.Exception
```

```
        {
            public ErrorMessage error()
            {
                return _error;
            }
            ErrorMessage _error;
            public EvalSetOperationException(ErrorMessage error)
            {
                _error = error;
            }
            public String toString()
            {
                return _error.toString();
            }
            public String getMessage()
            {
                return _error.errorString();
            }
        }
/* $Id: EvalSMFApply.java,v 1.3 1998/03/27 03:27:41 rjsmith Exp $
 *----------------------------------------------------------------------
 * $File$
 *
 * $Month$ $Year$, $User$
 *
 * Copyright (c) $Year$ by Cisco Systems, Inc.
 * All rights reserved.
 *
 * Authors:   $User$
 *
 * $Endlog$
 */
package com.cisco.nm.ani.framework;

import com.objectspace.jgl.HashSet;
import com.cisco.nm.ani.frontend.*;

/**
 * provides a first class selector for the Eval
 * mechanism to choose the method used in the
 * evaluated SMF.
 *<br>
 * When you call EvalGroup, you supply a functor
 * (either EvalSMFApply or a subclass).  EvalGroup
 * sends apply to the passed functor.  The functor
 * then sends the appropriate method to the
 * SettingSMFs in the partial order.
 *<br>
 * The classes and their function are the following:
 *<pre>
 *      functor             meaning
 *      ---------------     -------------------------
 *   EvalSMFApply        invoke the apply -- noop
 *   EvalSMFAcquire      acquire base info for change
 *   EvalSMFSet          perform the required change
 *   EvalSMFVerify       check that changes were applied
 *   EvalSMFRollBack     rollback in face of failures.
 *</pre>
 *<br>
 * For example, the following might be used by
 * the VLAD set mechanism:
```

-141-

```
 *<pre>
 *      HashSet members = ...
 *      PartialOrderNode po = ...
 *      EvalGroup eg;
 *      try {
 *          // first acquire the current state
 *          eg = EvalGroup(members, po,
 *                         new EvalSMFAcquire());
 *          eg.apply();
 *          // next, make the state changes
 *          eg = EvalGroup(members, po,
 *                         new EvalSMFSet());
 *          eg.apply();
 *          // Next, verify that the changes were made
 *          eg = EvalGroup(members, po,
 *                         new EvalSMFVerify());
 *          eg.apply();
 *          // Finally, integrate the changes into the data model
 *          //          and initiate save to the database
 *          eg = EvalGroup(members, po,
 *                         new EvalSMFIntegrate());
 *          eg.apply();
 *
 *      } catch (AniSemanticException) {
 *          // this is thrown when there is a
 *          // failure which is either abort of
 *          // rollback.  If it is roll back,
 *          // then roll back here
 *          ... determine if rollback ...
 *          // Please Note: a reverse of the PO is required
 *          // for the rollback.
 *          eg = EvalGroup(members, po.reverse(),
 *                         new EvalSMFRollBack());
 *          eg.apply();
 *      }
 *</pre>
 */
public class EvalSMFApply implements EvalFunctorIf
{
    public static final Class _Class = EvalSMFApply.class;

public boolean evalIsReversed() {
        return false;
    } public HashSet apply(SMFunction ssmf)
        throws EvalTerminateAllException, AniLockException {
        return ssmf.apply();
    } public HashSet apply(SMFunction ssmf, SMFContainer mo)
        throws EvalFailedException, EvalTerminateAndRemoveException,
            EvalTerminateAllException, AniLockException {
        return ssmf.apply(mo);
    }
}
/* $Id: EvalSMFAcquire.java,v 1.3 1998/03/27 03:27:41 rjsmith Exp $
 *----------------------------------------------------------------
 * $File$
```

50325-015 (WGM 269)

```
 *
 * $Month$ $Year$, $User$
 *
 * Copyright (c) $Year$ by Cisco Systems, Inc.
 * All rights reserved.
 *
 * Authors:  $User$
 *
 * $Endlog$
 */
package com.cisco.nm.ani.framework;

import com.objectspace.jgl.HashSet;
import com.cisco.nm.ani.frontend.*;

/**
 * For discussion of Setting Management see EvalSMFApply
 * @see EvalSMFApply
 */
public class EvalSMFAcquire implements EvalFunctorIf
{
    public static final Class _Class = EvalSMFAcquire.class;

public boolean evalIsReversed() {
        return false;
    } public HashSet apply(SMFunction ssmf) {
        // Do nothing.  There is no "isAllRequired()" acquire
        // method as of now.
        return null;
    } public HashSet apply(SMFunction ssmf, SMFContainer mo)
        throws EvalFailedException, EvalTerminateAndRemoveException,
            EvalTerminateAllException, AniLockException {
        return ((SettingSMFunction) ssmf).acquire(mo);
    }
}
/* $Id: EvalSMFIntegrate.java,v 1.3 1998/03/27 03:27:41 rjsmith Exp $
 *---------------------------------------------------------------
 * $File$
 *
 * $Month$ $Year$, $User$
 *
 * Copyright (c) $Year$ by Cisco Systems, Inc.
 * All rights reserved.
 *
 * Authors:  $User$
 *
 * $Endlog$
 */
package com.cisco.nm.ani.framework;

import com.objectspace.jgl.HashSet;
import com.cisco.nm.ani.frontend.*;

/**
 * For discussion of Setting Management see EvalSMFApply
 * @see EvalSMFApply
 */
```

50325-015 (WGM 269)

-143-

```
public class EvalSMFIntegrate implements EvalFunctorIf
{
    public static final Class _Class = EvalSMFIntegrate.class;

public boolean evalIsReversed() {
        return false;
    } public HashSet apply(SMFunction ssmf) {
        // Do nothing.  There is no "isAllRequired()" integrate
        // method as of now.
        return null;
    } public HashSet apply(SMFunction ssmf, SMFContainer mo)
        throws EvalFailedException, EvalTerminateAndRemoveException,
            EvalTerminateAllException, AniLockException {
        return ((SettingSMFunction) ssmf).integrate(mo);
    }
}
/* $Id: EvalSMFRollback.java,v 1.3 1998/03/27 03:27:41 rjsmith Exp $
 *-----------------------------------------------------------------
 * $File$
 *
 * $Month$ $Year$, $User$
 *
 * Copyright (c) $Year$ by Cisco Systems, Inc.
 * All rights reserved.
 *
 * Authors:  $User$
 *
 * $Endlog$
 */
package com.cisco.nm.ani.framework;

import com.objectspace.jgl.HashSet;
import com.cisco.nm.ani.frontend.*;

/**
 * For discussion of Setting Management see EvalSMFApply
 * @see EvalSMFApply
 */
public class EvalSMFRollback implements EvalFunctorIf
{
    public boolean evalIsReversed() {
        return true;
    } public HashSet apply(SMFunction ssmf) {
        // Do nothing.  There is no "isAllRequired()" rollback
        // method as of now.
        return null;
    } public HashSet apply(SMFunction ssmf, SMFContainer mo)
        throws EvalFailedException, EvalTerminateAndRemoveException,
            EvalTerminateAllException, AniLockException {
        return ((SettingSMFunction) ssmf).rollback(mo);
    }
    public static final Class _Class = EvalSMFRollback.class;
```

50325-015 (WGM 269)

}

-144-

What is claimed is:

1. A method of dynamically determining an execution order of a plurality of executable components of a network management system, the method comprising the steps of:

associating one or more time base values with a first executable component of the plurality of executable components, wherein each time base value specifies a time classification during which the first executable component is required to be executed;

associating one or more precondition values with the first executable component, wherein each precondition value represents a category of other executable components of the network management system that are required to execute before the first executable component is executed;

storing a partial order of execution of the plurality of executable components based on the pre-conditions and time base values;

generating a final order of execution of the plurality of executable components based on the partial order.

2. The method recited in claim 1, in which the step of associating a precondition value further comprises the steps of associating, with a first service module function of an asynchronous network interface in a network management system, a name of a second service module function, and a type of the second service module function wherein each second service module function name represents a category of service module functions of the network management system that are required to execute before the first service module function is executed.

3. The method recited in claim 1, in which the step of associating one or more time base values further comprises the steps of associating a time base value indicating that the first executable component is to be executed during periodic processing.

4. The method recited in claim 1, in which the step of associating one or more time base values further comprises the steps of associating a time base value indicating that the first executable component is to be executed at a fixed pre-determined time.

5. The method recited in claim 1, in which the step of associating one or more time base values further comprises the steps of associating a time base value indicating that the first executable component is to be executed upon request by an external process.

6. The method recited in claim 1, in which the step of storing further comprises the steps of storing a directed acyclic graph in a memory, in which the directed acyclic graph comprises a plurality of nodes, each node comprising information representing one of the preconditions.

7. The method recited in claim 6, in which the step of generating a final order of execution further comprises the steps of conducting a breadth-first traversal to each of the plurality of nodes of the directed acyclic graph, and building the final order of execution based on an order in which the nodes are traversed.

8. The method recited in claim 7, in which each node is associated with a level of the graph, and further comprising the steps of deleting references of one of the nodes when such node is referenced more than once in the graph.

9. The method recited in claim 1, further comprising the step of associating, with the first executable component, a unit value that identifies a programmatic object that is operated upon by the first executable component and that is required to be available before the first executable component is executed, and wherein the partial order is additionally based on the unit value.

10. A computer-readable medium carrying one or more sequences of instructions for dynamically determining an execution order of a plurality of executable components of a network management system, wherein execution of the one or more sequences of instructions by one or more processors causes the one or more processors to perform the steps of:

associating, with a first component of the plurality of executable components, one or more time base values, wherein each time base value specifies a time classification during which the first executable component is required to be executed;

associating one or more precondition values with the first executable component, wherein each precondition value represents a category of other executable components of the network management system that are required to execute before the first executable component is executed;

storing a partial order of execution of the plurality of executable components based on the pre-conditions and time base values; and generating a final order of execution of the plurality of executable components based on the partial order.

11. The computer-readable medium recited in claim 10 in which the step of associating a precondition value further comprises the steps of associating, with a first service module function of an asynchronous network interface in a network management system, a name of a second service module function, a name of a second service module function, and a type of the second service module function, wherein each second service module function name represents a category of service module functions of the network management system that are required to execute before the first service module function is executed.

12. The computer-readable medium recited in claim 10, in which the step of associating one or more time base values further comprises the steps of associating a time base value indicating that the first executable component is to be executed during periodic processing.

13. The computer-readable medium recited in claim 10, in which the step of associating one or more time base values further comprises the steps of associating a time base value indicating that the first executable component is to be executed at a fixed pre-determined time.

14. The computer-readable medium recited in claim 10, in which the step of associating one or more time base values further comprises the steps of associating a time base value indicating that the first executable component is to be executed upon request by an external process.

15. An apparatus for dynamically determining an execution order of a plurality of executable components of a network management system, comprising:

means for associating, with a first component of the plurality of executable components, one or more time base values, wherein each time base value specifies a time classification during which the first executable component is required to be executed;

means for associating one or more precondition values with the first executable component, wherein each precondition value represents a category of other executable components of the network management system that are required to execute before the first executable component is executed;

means for storing a partial order of execution of the plurality of executable components based on the pre-conditions and the time base values; and means for generating a final order of execution of the plurality of executable components based on the partial order.

16. A method of dynamically determining an execution order of a plurality of executable computer program components, the method comprising the computer-implemented steps of:

creating and storing, in association with a first component of the plurality of executable computer program components, first information representing one or more pre-conditions to execution of the first component, wherein each precondition value represents a category of other executable components of the network management system that are required to execute before the first executable component is executed;

creating and storing, in association with the first component, one or more time base values, wherein each time base value specifies a time classification during which the first component is required to be executed;

creating and storing a directed acyclic graph in a memory that represents a partial order of execution of the plurality of executable components based on the pre-conditions and the time base values, wherein the directed acyclic graph comprises a plurality of nodes, wherein each node represents one of the preconditions; and generating a final order of execution of the plurality of executable components based on the partial order by conducting a breadth-first traversal to each of the plurality of nodes of the directed acyclic graph and creating second information representing the final order of execution based on an order in which the nodes are traversed.

17. A method as recited in claim 16, in which the step of associating a precondition value further comprises the steps of associating, with a first service module function of an asynchronous network interface in a network management system, an execution time, a name of a second service module function, and a type of the second service module function.

18. A method as recited in claim 16, in which the step of creating and storing one or more time base values further comprises the steps of associating a time base value indicating that the first executable component is to be executed during periodic processing.

19. A method as recited in claim 16, in which the step of creating and storing one or more time base values further comprises the steps of associating a time base value indicating that the first executable component is to be executed at a fixed pre-determined time.

20. A method as recited in claim 16, in which the step of creating and storing one or more time base values further comprises the steps of associating a time of execution value indicating that the first executable component is to be executed upon request by an external process.

21. A method as recited in claim 16, in which each node is associated with a level of the graph, and further comprising the steps of deleting references of one of the nodes when such node is referenced more than once in the graph.

22. A method of dynamically determining an execution order of a plurality of executable computer program components of a network management system, the method comprising the computer-implemented steps of:

creating and storing, in association with each component in the plurality of executable computer program components, a first category value that identifies a category that characterizes such component, and one or more pre-conditions to execution of such component, wherein each of the pre-conditions comprises one or more second categories that each identify a category of the executable computer program components that must execute before such component may execute;

creating and storing, in association with each component in the plurality of components, one or more time base values, wherein each time base value specifies a time classification during which such component is required to be executed;

creating and storing in a memory, a partial order of execution of the plurality of executable components based on the pre-conditions and time base values; and generating a final order of execution of the plurality of executable components based on the partial order by evaluating the first category values and the pre-conditions.

23. A method as recited in claim 22, further comprising the steps of:

creating and storing a directed acyclic graph in a memory that represents the partial order of execution of the plurality of executable components, wherein the directed acyclic graph comprises a plurality of nodes, wherein each node represents one of the preconditions; and generating the final order of execution of the plurality of executable components based on the partial order by conducting a breadth-first traversal to each of the plurality of nodes of the directed acyclic graph and creating information representing the final order of execution based on an order in which the nodes are traversed.

24. A method as recited in claim 22, in which the step of creating and storing a first category value further comprises the steps of associating a time of execution and a category name with the first executable component.

25. A method as recited in claim 22, in which the step of creating and storing a first category value further comprises the steps of associating, with a first service module function of an asynchronous network interface in a network management system, an execution time, a name of a second service module function, and a type of the second service module function.

* * * * *